(12) United States Patent
Kimura et al.

(10) Patent No.: US 7,458,652 B2
(45) Date of Patent: Dec. 2, 2008

(54) DATA TRANSFERRING APPARATUS FOR TRANSFERRING LIQUID EJECTION DATA AND A LIQUID EJECTING APPARATUS

(75) Inventors: Masahiro Kimura, Nagano-ken (JP);
Yasunori Fukumitsu, Nagano-ken (JP);
Yasuhisa Yamamoto, Nagano-ken (JP);
Masahiro Igarashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 406 days.

(21) Appl. No.: 11/408,280

(22) Filed: Apr. 19, 2006

(65) Prior Publication Data
US 2006/0187248 A1 Aug. 24, 2006

Related U.S. Application Data

(62) Division of application No. 10/649,545, filed on Aug. 26, 2003, now Pat. No. 7,083,244.

(30) Foreign Application Priority Data

| Aug. 26, 2002 | (JP) | ............... 2002-245174 |
| Aug. 26, 2002 | (JP) | ............... 2002-245209 |
| Aug. 26, 2002 | (JP) | ............... 2002-245243 |
| Aug. 26, 2002 | (JP) | ............... 2002-245366 |
| Jun. 6, 2003 | (JP) | ............... 2002-162120 |
| Jun. 6, 2003 | (JP) | ............... 2003-162047 |
| Jun. 6, 2003 | (JP) | ............... 2003-162153 |
| Jun. 6, 2003 | (JP) | ............... 2003-162221 |

(51) Int. Cl.
*B41J 29/38* (2006.01)
(52) U.S. Cl. .......................... 347/5; 358/1.16
(58) Field of Classification Search .............. 347/5, 347/15, 43
See application file for complete search history.

(56) References Cited

U.S. PATENT DOCUMENTS 5,365,257 A * 11/1994 Minowa et al. ............. 347/189
2005/0001862 A1* 1/2005 Kimura et al. ................ 347/5

FOREIGN PATENT DOCUMENTS

| EP | 0 768 794 B1 | 12/2002 |
| JP | 3251053 | 12/1993 |

OTHER PUBLICATIONS

European Search Report dated Jan. 4, 2006.

* cited by examiner

*Primary Examiner*—Thinh H Nguyen
(74) *Attorney, Agent, or Firm*—Edwards Angell Palmer & Dodge LLP; John J. Penny, Jr.

(57) ABSTRACT

If data, which is irrelevant to recording data, is stored in a lower address of head word data of the run length compressed recording data stored in a receiving buffer unit, the irrelevant byte data of the lower address of the word data including the head byte data is nullified by masking to be developed by a decode circuit. Otherwise, in regard to a bitmap area of a local memory which is a DMA transfer destination, transfer addresses are individually set by a development processing controller in a DECU per one word of the developed recording data stored in the line buffer in order that data of one line is arranged and stored in a vertical direction, or data of one line is stored in image 1 and image 2 in turn. Otherwise, in regard to the development processing controller, when the recording data developed by the decode circuit is stored in the line buffer, it is stored from a first byte in a state where a 0-th byte of the line buffer is vacant.

14 Claims, 36 Drawing Sheets

INKJET TYPE RECORDING APPARATUS

OPERATION CONDITION
MAIN MEMORY SIDE : STARTING ADDRESS OF RUN LENGTH DATA IS AN EVEN ADDRESS
LOCAL MEMORY SIDE : STARTING ADDRESS OF IMAGE DATA IS AN EVEN ADDRESS
NUMBER OF 1 LINE BUFFER : 16 BYTES

FIG. 8

DECU

| TRANSFER S13 | 12 13 | | | | | | | | | |
|---|---|---|---|---|---|---|---|---|---|---|
| FACE A | 20 20 | 20 20 | 12 13 | | | | | | | |
| FACE B | | | | | | | | | | |
| TRANSFER S14 | 14 15 | | | | | | | | | |
| FACE A | 20 20 | 20 20 | 12 13 | 14 15 | | | | | | |
| FACE B | | | | | | | | | | |
| TRANSFER S15 | 16 17 | | | | | | | | | |
| FACE A | 20 20 | 20 20 | 12 13 | 14 15 | 16 17 | | | | | |
| FACE B | | | | | | | | | | |
| TRANSFER S16 | 18 19 | | | | | | | | | |
| FACE A | 20 20 | 20 20 | 12 13 | 14 15 | 16 17 | 18 19 | | | | |
| FACE B | | | | | | | | | | |
| TRANSFER S17 | 20 FD | | | | | | | | | |
| FACE A | 20 20 | 20 20 | 12 13 | 14 15 | 16 17 | 18 19 | 20 | | | |
| FACE B | | | | | | | | | | |
| TRANSFER S18 | 11 02 | | | | | | | | | |
| FACE A | 20 20 | 20 20 | 12 13 | 14 15 | 16 17 | 18 19 | 20 11 | 11 11 | | |
| FACE B | | | | | | | | | | |

TRANSFER D3 

| TRANSFER S19 | 98 B0 | | | | | | | | | |
|---|---|---|---|---|---|---|---|---|---|---|
| FACE A | | | | | | | | | | |
| FACE B | 11 98 | B0 | | | | | | | | |
| TRANSFER S20 | F2 FC | | | | | | | | | |
| FACE A | | | | | | | | | | |
| FACE B | 11 98 | B0 F2 | | | | | | | | |
| TRANSFER S21 | AB 03 | | | | | | | | | |
| FACE A | | | | | | | | | | |
| FACE B | 11 98 | B0 F2 | AB AB | AB AB | AB | | | | | |
| TRANSFER S22 | FF FE | | | | | | | | | |
| FACE A | | | | | | | | | | |
| FACE B | 11 98 | B0 F2 | AB AB | AB AB | AB FF | FE | | | | |
| TRANSFER S23 | FC FD | | | | | | | | | |
| FACE A | | | | | | | | | | |
| FACE B | 11 98 | B0 F2 | AB AB | AB AB | AB FF | FE FC | FD | | | |
| TRANSFER S24 | FE FF | | | | | | | | | |
| FACE A | | | | | | | | | | |
| FACE B | 11 98 | B0 F2 | AB AB | AB AB | AB FF | FE FC | FD FF | FF FF | | |

TRANSFER D4 

SETTING CONDITION
NO VERTICAL LINE REARRANGEMENT
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

LOCAL MEMORY

| 01 01 | 01 02 | 78 55 | 44 FF |
|---|---|---|---|
| FF FF | FF FF | FF 11 | 11 11 |
| 66 12 | 77 45 | 89 10 | 55 10 |
| 10 10 | 10 10 | 10 20 | 20 20 |
| 20 20 | 20 20 | 12 13 | 14 15 |
| 16 17 | 18 19 | 20 11 | 11 11 |
| 11 98 | B0 F2 | AB AB | AB AB |
| AB FF | FE FC | FD FF | FF FF |

D4 →

SETTING CONDITION
VERTICAL LINE REARRANGEMENT PERFORMED
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

LOCAL MEMORY

| 01 01 | 00 00 | 00 00 | 00 00 | ⋯ | 00 00 |
|---|---|---|---|---|---|
| 01 02 | 00 00 | 00 00 | 00 00 | ⋯ | 00 00 |
| 78 55 | 00 00 | 00 00 | 00 00 | ⋯ | 00 00 |
| 44 FF | 00 00 | 00 00 | 00 00 | ⋯ | 00 00 |
| FF FF | 00 00 | 00 00 | 00 00 | ⋯ | 00 00 |
| FF FF | 00 00 | 00 00 | 00 00 | ⋯ | 00 00 |
| FF 11 | 00 00 | 00 00 | 00 00 | ⋯ | 00 00 |
| 11 11 | 00 00 | 00 00 | 00 00 | ⋯ | 00 00 |

| 01 01 | 66 12 | 00 00 | 00 00 | ⋯ | 00 00 |
|---|---|---|---|---|---|
| 01 02 | 77 45 | 00 00 | 00 00 | ⋯ | 00 00 |
| 78 55 | 89 10 | 00 00 | 00 00 | ⋯ | 00 00 |
| 44 FF | 55 10 | 00 00 | 00 00 | ⋯ | 00 00 |
| FF FF | 10 10 | 00 00 | 00 00 | ⋯ | 00 00 |
| FF FF | 10 10 | 00 00 | 00 00 | ⋯ | 00 00 |
| FF 11 | 10 20 | 00 00 | 00 00 | ⋯ | 00 00 |
| 11 11 | 20 20 | 00 00 | 00 00 | ⋯ | 00 00 |

| 01 01 | 66 12 | 20 20 | 00 00 | ⋯ | 00 00 |
|---|---|---|---|---|---|
| 01 02 | 77 45 | 20 20 | 00 00 | ⋯ | 00 00 |
| 78 55 | 89 10 | 12 13 | 00 00 | ⋯ | 00 00 |
| 44 FF | 55 10 | 14 15 | 00 00 | ⋯ | 00 00 |
| FF FF | 10 10 | 16 17 | 00 00 | ⋯ | 00 00 |
| FF FF | 10 10 | 18 19 | 00 00 | ⋯ | 00 00 |
| FF 11 | 10 20 | 20 11 | 00 00 | ⋯ | 00 00 |
| 11 11 | 20 20 | 11 11 | 00 00 | ⋯ | 00 00 |

| 01 01 | 66 12 | 20 20 | 11 98 | ⋯ | 00 00 |
|---|---|---|---|---|---|
| 01 02 | 77 45 | 20 20 | B0 F2 | ⋯ | 00 00 |
| 78 55 | 89 10 | 12 13 | AB AB | ⋯ | 00 00 |
| 44 FF | 55 10 | 14 15 | AB AB | ⋯ | 00 00 |
| FF FF | 10 10 | 16 17 | AB FF | ⋯ | 00 00 |
| FF FF | 10 10 | 18 19 | FE FC | ⋯ | 00 00 |
| FF 11 | 10 20 | 20 11 | FD FF | ⋯ | 00 00 |
| 11 11 | 20 20 | 11 11 | FF FF | ⋯ | 00 00 |

OPERATION CONDITION
MAIN MEMORY SIDE : STARTING ADDRESS OF RUN LENGTH DATA IS AN ODD ADDRESS
LOCAL MEMORY SIDE : STARTING ADDRESS OF IMAGE DATA IS AN EVEN ADDRESS
NUMBER OF 1 LINE BUFFER : 16 BYTES

FIG. 12

DECU

| TRANSFER S43 | 13 14 | | | | | | | | | |
|---|---|---|---|---|---|---|---|---|---|---|
| FACE A | 20 20 | 20 20 | 12 13 | 14 | | | | | | |
| FACE B | | | | | | | | | | |
| TRANSFER S44 | 15 16 | | | | | | | | | |
| FACE A | 20 20 | 20 20 | 12 13 | 14 15 | 16 | | | | | |
| FACE B | | | | | | | | | | |
| TRANSFER S45 | 17 18 | | | | | | | | | |
| FACE A | 20 20 | 20 20 | 12 13 | 14 15 | 16 17 | 18 | | | | |
| FACE B | | | | | | | | | | |
| TRANSFER S46 | 19 20 | | | | | | | | | |
| FACE A | 20 20 | 20 20 | 12 13 | 14 15 | 16 17 | 18 19 | 20 | | | |
| FACE B | | | | | | | | | | |
| TRANSFER S47 | FD 11 | | | | | | | | | TRANSFER D3 |
| FACE A | 20 20 | 20 20 | 12 13 | 14 15 | 16 17 | 18 19 | 20 11 | 11 11 | | |
| FACE B | 11 | | | | | | | | | |
| TRANSFER S48 | 02 98 | | | | | | | | | |
| FACE A | | | | | | | | | | |
| FACE B | 11 98 | | | | | | | | | |
| TRANSFER S49 | B0 F2 | | | | | | | | | |
| FACE A | | | | | | | | | | |
| FACE B | 11 98 | B0 F2 | | | | | | | | |
| TRANSFER S50 | FC AB | | | | | | | | | |
| FACE A | | | | | | | | | | |
| FACE B | 11 98 | B0 F2 | AB AB | AB AB | AB | | | | | |
| TRANSFER S51 | 03 FF | | | | | | | | | |
| FACE A | | | | | | | | | | |
| FACE B | 11 98 | B0 F2 | AB AB | AB AB | AB FF | | | | | |
| TRANSFER S52 | FE FC | | | | | | | | | |
| FACE A | | | | | | | | | | |
| FACE B | 11 98 | B0 F2 | AB AB | AB AB | AB FF | FE FC | | | | |
| TRANSFER S53 | FD FE | | | | | | | | | |
| FACE A | | | | | | | | | | |
| FACE B | 11 98 | B0 F2 | AB AB | AB AB | AB FF | FE FC | FD | | | |
| TRANSFER S54 | FF 00 | | | | | | | | | TRANSFER D4 |
| FACE A | | | | | | | | | | |
| FACE B | 11 98 | B0 F2 | AB AB | AB AB | AB FF | FE FC | FD FF | FF FF | | |

FIG. 13

OPERATION CONDITION
MAIN MEMORY SIDE : STARTING ADDRESS OF RUN LENGTH DATA IS AN EVEN ADDRESS
LOCAL MEMORY SIDE : STARTING ADDRESS OF IMAGE DATA IS AN EVEN ADDRESS
NUMBER OF 1 LINE BUFFER : 15 BYTES

MAIN MEMORY:
| FE 01 |
| 03 02 |
| 78 55 |
| 44 FB |
| FF FF |
| 11 06 |
| 66 12 |
| 77 45 |
| 89 10 |
| 55 FB |
| 10 FB |
| 20 08 |
| 12 13 |
| 14 15 |
| 16 17 |
| 18 19 |
| 20 FE |
| 11 02 |
| 98 B0 |
| F2 FC |
| AB 03 |
| FF FE |
| FC FD |
| FF FF |

DECU:

| Transfer | Data | Face | c1 | c2 | c3 | c4 | c5 | c6 | c7 | c8 | c9 |
|---|---|---|---|---|---|---|---|---|---|---|---|
| TRANSFER S61 | FE 01 | FACE A | 01 01 | 01 | | | | | | | |
| | | FACE B | | | | | | | | | |
| TRANSFER S62 | 03 02 | FACE A | 01 01 | 01 02 | | | | | | | |
| | | FACE B | | | | | | | | | |
| TRANSFER S63 | 78 55 | FACE A | 01 01 | 01 02 | 78 55 | | | | | | |
| | | FACE B | | | | | | | | | |
| TRANSFER S64 | 44 FB | FACE A | 01 01 | 01 02 | 78 55 | 44 | | | | | |
| | | FACE B | | | | | | | | | |
| TRANSFER S65 | FF FF | FACE A | 01 01 | 01 02 | 78 55 | 44 FF | FF FF | FF FF | FF | | |
| | | FACE B | | | | | | | | | |
| TRANSFER S66 | 11 06 | FACE A | 01 01 | 01 02 | 78 55 | 44 FF | FF FF | FF FF | FF 11 | 11 | | (TRANSFER D1)
| | | FACE B | | | | | | | | | |
| TRANSFER S67 | 66 12 | FACE A | | | | | | | | | |
| | | FACE B | 66 12 | | | | | | | | |
| TRANSFER S68 | 77 45 | FACE A | | | | | | | | | |
| | | FACE B | 66 12 | 77 45 | | | | | | | |
| TRANSFER S69 | 89 10 | FACE A | | | | | | | | | |
| | | FACE B | 66 12 | 77 45 | 89 10 | | | | | | |
| TRANSFER S70 | 55 FB | FACE A | | | | | | | | | |
| | | FACE B | 66 12 | 77 45 | 89 10 | 55 | | | | | |
| TRANSFER S71 | 10 FB | FACE A | | | | | | | | | |
| | | FACE B | 66 12 | 77 45 | 89 10 | 55 10 | 10 10 | 10 10 | 10 | | |
| TRANSFER S72 | 20 08 | FACE A | 20 20 | 20 20 | | | | | | | | (TRANSFER D2)
| | | FACE B | 66 12 | 77 45 | 89 10 | 55 10 | 10 10 | 10 10 | 10 20 | 20 | |

FIG. 14

SETTING CONDITION
VERTICAL LINE REARRANGEMENT PERFORMED
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

LOCAL MEMORY

FIG. 15A D1 ↓

| 01 01 | 00 00 | 00 00 | 00 00 | ⋯ | 00 00 |
|---|---|---|---|---|---|
| 01 02 | 00 00 | 00 00 | 00 00 | ⋯ | 00 00 |
| 78 55 | 00 00 | 00 00 | 00 00 | ⋯ | 00 00 |
| 44 FF | 00 00 | 00 00 | 00 00 | ⋯ | 00 00 |
| FF FF | 00 00 | 00 00 | 00 00 | ⋯ | 00 00 |
| FF FF | 00 00 | 00 00 | 00 00 | ⋯ | 00 00 |
| FF 11 | 00 00 | 00 00 | 00 00 | ⋯ | 00 00 |
| 11 00 | 00 00 | 00 00 | 00 00 | ⋯ | 00 00 |

FIG. 15B D2 ↓

| 01 01 | 66 12 | 00 00 | 00 00 | ⋯ | 00 00 |
|---|---|---|---|---|---|
| 01 02 | 77 45 | 00 00 | 00 00 | ⋯ | 00 00 |
| 78 55 | 89 10 | 00 00 | 00 00 | ⋯ | 00 00 |
| 44 FF | 55 10 | 00 00 | 00 00 | ⋯ | 00 00 |
| FF FF | 10 10 | 00 00 | 00 00 | ⋯ | 00 00 |
| FF FF | 10 10 | 00 00 | 00 00 | ⋯ | 00 00 |
| FF 11 | 10 20 | 00 00 | 00 00 | ⋯ | 00 00 |
| 11 00 | 20 00 | 00 00 | 00 00 | ⋯ | 00 00 |

FIG. 15C D3 ↓

| 01 01 | 66 12 | 20 20 | 00 00 | ⋯ | 00 00 |
|---|---|---|---|---|---|
| 01 02 | 77 45 | 20 20 | 00 00 | ⋯ | 00 00 |
| 78 55 | 89 10 | 12 13 | 00 00 | ⋯ | 00 00 |
| 44 FF | 55 10 | 14 15 | 00 00 | ⋯ | 00 00 |
| FF FF | 10 10 | 16 17 | 00 00 | ⋯ | 00 00 |
| FF FF | 10 10 | 18 19 | 00 00 | ⋯ | 00 00 |
| FF 11 | 10 20 | 20 11 | 00 00 | ⋯ | 00 00 |
| 11 00 | 20 00 | 11 00 | 00 00 | ⋯ | 00 00 |

FIG. 15D D4 ↓

| 01 01 | 66 12 | 20 20 | 11 98 | ⋯ | 00 00 |
|---|---|---|---|---|---|
| 01 02 | 77 45 | 20 20 | B0 F2 | ⋯ | 00 00 |
| 78 55 | 89 10 | 12 13 | AB AB | ⋯ | 00 00 |
| 44 FF | 55 10 | 14 15 | AB AB | ⋯ | 00 00 |
| FF FF | 10 10 | 16 17 | AB FF | ⋯ | 00 00 |
| FF FF | 10 10 | 18 19 | FE FC | ⋯ | 00 00 |
| FF 11 | 10 20 | 20 11 | FD FF | ⋯ | 00 00 |
| 11 00 | 20 00 | 11 00 | FF 00 | ⋯ | 00 00 |

SETTING CONDITION
NO VERTICAL LINE REARRANGEMENT
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

LOCAL MEMORY

| 01 01 | 01 02 | 78 55 | 44 FF |
|---|---|---|---|
| FF FF | FF FF | FF 11 | 11 00 |
| 66 12 | 77 45 | 89 10 | 55 10 |
| 10 10 | 10 10 | 10 20 | 20 00 |
| 20 20 | 20 20 | 12 13 | 14 15 |
| 16 17 | 18 19 | 20 11 | 11 00 |

D4 →
| 11 98 | B0 F2 | AB AB | AB AB |
|---|---|---|---|
| AB FF | FE FC | FD FF | FF 00 |

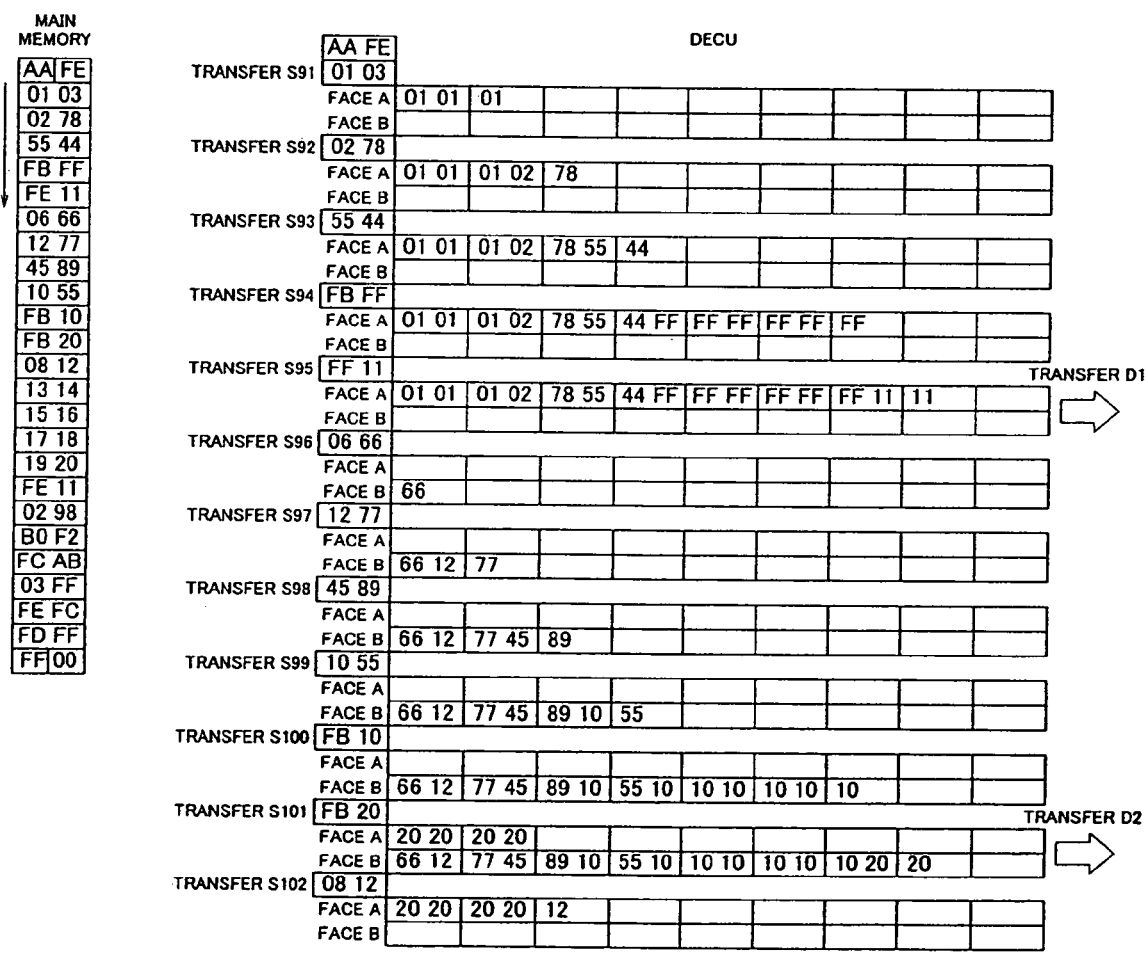

FIG. 18

DECU

| | | | | | | | | | | | |
|---|---|---|---|---|---|---|---|---|---|---|---|
| TRANSFER S103 | 13 14 | | | | | | | | | | |
| | FACE A | 20 20 | 20 20 | 12 13 | 14 | | | | | | |
| | FACE B | | | | | | | | | | |
| TRANSFER S104 | 15 16 | | | | | | | | | | |
| | FACE A | 20 20 | 20 20 | 12 13 | 14 15 | 16 | | | | | |
| | FACE B | | | | | | | | | | |
| TRANSFER S105 | 17 18 | | | | | | | | | | |
| | FACE A | 20 20 | 20 20 | 12 13 | 14 15 | 16 17 | 18 | | | | |
| | FACE B | | | | | | | | | | |
| TRANSFER S106 | 19 20 | | | | | | | | | | |
| | FACE A | 20 20 | 20 20 | 12 13 | 14 15 | 16 17 | 18 19 | 20 | | | |
| | FACE B | | | | | | | | | | |
| TRANSFER S107 | FE 11 | | | | | | | | | | |
| | FACE A | 20 20 | 20 20 | 12 13 | 14 15 | 16 17 | 18 19 | 20 11 | 11 | | |
| | FACE B | 11 | | | | | | | | | |
| TRANSFER S108 | 02 98 | | | | | | | | | | TRANSFER D3 |
| | FACE A | | | | | | | | | | |
| | FACE B | 11 98 | | | | | | | | |  |
| TRANSFER S109 | B0 F2 | | | | | | | | | | |
| | FACE A | | | | | | | | | | |
| | FACE B | 11 98 | B0 F2 | | | | | | | | |
| TRANSFER S110 | FC AB | | | | | | | | | | |
| | FACE A | | | | | | | | | | |
| | FACE B | 11 98 | B0 F2 | AB AB | AB AB | AB | | | | | |
| TRANSFER S111 | 03 FF | | | | | | | | | | |
| | FACE A | | | | | | | | | | |
| | FACE B | 11 98 | B0 F2 | AB AB | AB AB | AB FF | | | | | |
| TRANSFER S112 | FE FC | | | | | | | | | | |
| | FACE A | | | | | | | | | | |
| | FACE B | 11 98 | B0 F2 | AB AB | AB AB | AB FF | FE FC | | | | |
| TRANSFER S113 | FD FF | | | | | | | | | | |
| | FACE A | | | | | | | | | | |
| | FACE B | 11 98 | B0 F2 | AB AB | AB AB | AB FF | FE FC | FD | | | |
| TRANSFER S114 | FF 00 | | | | | | | | | | TRANSFER D4 |
| | FACE A | | | | | | | | | | |
| | FACE B | 11 98 | B0 F2 | AB AB | AB AB | AB FF | FE FC | FD FF | FF | |  |

FIG. 20

DECU

| | | | | | | | | | | | | | |
|---|---|---|---|---|---|---|---|---|---|---|---|---|---|
| TRANSFER S133 | 12 13 | | | | | | | | | | | | |
| | FACE A | 20 | 20 20 | 20 12 | 13 | | | | | | | | |
| | FACE B | | | | | | | | | | | | |
| TRANSFER S134 | 14 15 | | | | | | | | | | | | |
| | FACE A | 20 | 20 20 | 20 12 | 13 14 | 15 | | | | | | | |
| | FACE B | | | | | | | | | | | | |
| TRANSFER S135 | 16 17 | | | | | | | | | | | | |
| | FACE A | 20 | 20 20 | 20 12 | 13 14 | 15 16 | 17 | | | | | | |
| | FACE B | | | | | | | | | | | | |
| TRANSFER S136 | 18 19 | | | | | | | | | | | | |
| | FACE A | 20 | 20 20 | 20 12 | 13 14 | 15 16 | 17 18 | 19 | | | | | |
| | FACE B | | | | | | | | | | | | |
| TRANSFER S137 | 20 FD | | | | | | | | | | | | |
| | FACE A | 20 | 20 20 | 20 12 | 13 14 | 15 16 | 17 18 | 19 20 | | | | | |
| | FACE B | | | | | | | | | | | | |
| TRANSFER S138 | 11 02 | | | | | | | | | | | TRANSFER D3 | |
| | FACE A | 20 | 20 20 | 20 12 | 13 14 | 15 16 | 17 18 | 19 20 | 11 11 | 11 | |  | |
| | FACE B | 11 | | | | | | | | | | | |
| TRANSFER S139 | 98 B0 | | | | | | | | | | | | |
| | FACE A | | | | | | | | | | | | |
| | FACE B | 11 | 98 B0 | | | | | | | | | | |
| TRANSFER S140 | F2 FC | | | | | | | | | | | | |
| | FACE A | | | | | | | | | | | | |
| | FACE B | 11 | 98 B0 | F2 | | | | | | | | | |
| TRANSFER S141 | AB 03 | | | | | | | | | | | | |
| | FACE A | | | | | | | | | | | | |
| | FACE B | 11 | 98 B0 | F2 AB | AB AB | AB AB | | | | | | | |
| TRANSFER S142 | FF FE | | | | | | | | | | | | |
| | FACE A | | | | | | | | | | | | |
| | FACE B | 11 | 98 B0 | F2 AB | AB AB | AB AB | FF FE | | | | | | |
| TRANSFER S143 | FC FD | | | | | | | | | | | | |
| | FACE A | | | | | | | | | | | | |
| | FACE B | 11 | 98 B0 | F2 AB | AB AB | AB AB | FF FE | FC FD | | | | | |
| TRANSFER S144 | FE FF | | | | | | | | | | | TRANSFER D4 | |
| | FACE A | | | | | | | | | | | | |
| | FACE B | 11 | 98 B0 | F2 AB | AB AB | AB AB | FF FE | FC FD | FF FF | FF | |  | |

SETTING CONDITION
VERTICAL LINE REARRANGEMENT PERFORMED
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

LOCAL MEMORY

| 00 | 01 | 00 | 00 | 00 | 00 | 00 | 00 | ... | 00 | 00 |
|----|----|----|----|----|----|----|----|-----|----|----|
| 01 | 01 | 00 | 00 | 00 | 00 | 00 | 00 | ... | 00 | 00 |
| 02 | 78 | 00 | 00 | 00 | 00 | 00 | 00 | ... | 00 | 00 |
| 55 | 44 | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| 11 | 11 | 00 | 00 | 00 | 00 | 00 | 00 | ... | 00 | 00 |
| 11 | 00 | 00 | 00 | 00 | 00 | 00 | 00 | ... | 00 | 00 |

| 00 | 01 | 00 | 66 | 00 | 00 | 00 | 00 | ... | 00 | 00 |
|----|----|----|----|----|----|----|----|-----|----|----|
| 01 | 01 | 12 | 77 | 00 | 00 | 00 | 00 | ... | 00 | 00 |
| 02 | 78 | 45 | 89 | 00 | 00 | 00 | 00 | ... | 00 | 00 |
| 55 | 44 | 10 | 55 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| 11 | 11 | 20 | 20 | 00 | 00 | 00 | 00 | ... | 00 | 00 |
| 11 | 00 | 20 | 00 | 00 | 00 | 00 | 00 | ... | 00 | 00 |

| 00 | 01 | 00 | 66 | 00 | 20 | 00 | 00 | ... | 00 | 00 |
|----|----|----|----|----|----|----|----|-----|----|----|
| 01 | 01 | 12 | 77 | 20 | 20 | 00 | 00 | ... | 00 | 00 |
| 02 | 78 | 45 | 89 | 20 | 12 | 00 | 00 | ... | 00 | 00 |
| 55 | 44 | 10 | 55 | 13 | 14 | 00 | 00 | ... | 00 | 00 |
| FF | FF | 10 | 10 | 15 | 16 | 00 | 00 | ... | 00 | 00 |
| FF | FF | 10 | 10 | 17 | 18 | 00 | 00 | ... | 00 | 00 |
| FF | FF | 10 | 10 | 19 | 20 | 00 | 00 | ... | 00 | 00 |
| 11 | 11 | 20 | 20 | 11 | 11 | 00 | 00 | ... | 00 | 00 |
| 11 | 00 | 20 | 00 | 11 | 00 | 00 | 00 | ... | 00 | 00 |

| 00 | 01 | 00 | 66 | 00 | 20 | 00 | 11 | ... | 00 | 00 |
|----|----|----|----|----|----|----|----|-----|----|----|
| 01 | 01 | 12 | 77 | 20 | 20 | 98 | B0 | ... | 00 | 00 |
| 02 | 78 | 45 | 89 | 20 | 12 | F2 | AB | ... | 00 | 00 |
| 55 | 44 | 10 | 55 | 13 | 14 | AB | AB | ... | 00 | 00 |
| FF | FF | 10 | 10 | 15 | 16 | AB | AB | ... | 00 | 00 |
| FF | FF | 10 | 10 | 17 | 18 | FF | FE | ... | 00 | 00 |
| FF | FF | 10 | 10 | 19 | 20 | FC | FD | ... | 00 | 00 |
| 11 | 11 | 20 | 20 | 11 | 11 | FF | FF | ... | 00 | 00 |
| 11 | 00 | 20 | 20 | 11 | 00 | FF | 00 | ... | 00 | 00 |

FIG. 22

OPERATION CONDITION
MAIN MEMORY SIDE : STARTING ADDRESS OF RUN LENGTH DATA IS AN EVEN ADDRESS
LOCAL MEMORY SIDE : STARTING ADDRESS OF IMAGE DATA IS AN ODD ADDRESS
NUMBER OF 1 LINE BUFFER : 15 BYTES

| MAIN MEMORY | | DECU | | | | | | | | | |
|---|---|---|---|---|---|---|---|---|---|---|---|
| FE 01 | | | | | | | | | | | |
| 03 02 | TRANSFER S151 | FE 01 | | | | | | | | | |
| 78 55 | | FACE A | 01 | 01 01 | | | | | | | |
| 44 FB | | FACE B | | | | | | | | | |
| FF FF | TRANSFER S152 | 03 02 | | | | | | | | | |
| 11 06 | | FACE A | 01 | 01 01 | 02 | | | | | | |
| 66 12 | | FACE B | | | | | | | | | |
| 77 45 | TRANSFER S153 | 78 55 | | | | | | | | | |
| 89 10 | | FACE A | 01 | 01 01 | 02 78 | 55 | | | | | |
| 55 FB | | FACE B | | | | | | | | | |
| 10 FB | TRANSFER S154 | 44 FB | | | | | | | | | |
| 20 08 | | FACE A | 01 | 01 01 | 02 78 | 55 44 | | | | | |
| 12 13 | | FACE B | | | | | | | | | |
| 14 15 | TRANSFER S155 | FF FF | | | | | | | | | |
| 16 17 | | FACE A | 01 | 01 01 | 02 78 | 55 44 | FF FF | FF FF | FF FF | | |
| 18 19 | | FACE B | | | | | | | | | |
| 20 FE | TRANSFER S156 | 11 06 | | | | | | | | | TRANSFER D1 |
| 11 02 | | FACE A | 01 | 01 01 | 02 78 | 55 44 | FF FF | FF FF | FF FF | 11 11 | ⇨ |
| 98 B0 | | FACE B | | | | | | | | | |
| F2 FC | TRANSFER S157 | 66 12 | | | | | | | | | |
| AB 03 | | FACE A | | | | | | | | | |
| FF FE | | FACE B | 66 | 12 | | | | | | | |
| FC FD | TRANSFER S158 | 77 45 | | | | | | | | | |
| FF FF | | FACE A | | | | | | | | | |
| | | FACE B | 66 | 12 77 | 45 | | | | | | |
| | TRANSFER S159 | 89 10 | | | | | | | | | |
| | | FACE A | | | | | | | | | |
| | | FACE B | 66 | 12 77 | 45 89 | 10 | | | | | |
| | TRANSFER S160 | 55 FB | | | | | | | | | |
| | | FACE A | | | | | | | | | |
| | | FACE B | 66 | 12 77 | 45 89 | 10 55 | | | | | |
| | TRANSFER S161 | 10 FB | | | | | | | | | |
| | | FACE A | | | | | | | | | |
| | | FACE B | 66 | 12 77 | 45 89 | 10 55 | 10 10 | 10 10 | 10 10 | | |
| | TRANSFER S162 | 20 08 | | | | | | | | | TRANSFER D2 |
| | | FACE A | 20 | 20 20 | 20 | | | | | | ⇨ |
| | | FACE B | 66 | 12 77 | 45 89 | 10 55 | 10 10 | 10 10 | 10 10 | 20 20 | |

FIG. 23

DECU

| | | | | | | | | | | | |
|---|---|---|---|---|---|---|---|---|---|---|---|
| TRANSFER S163 | 12 13 | | | | | | | | | | |
| | FACE A | 20 | 20 20 | 20 12 | 13 | | | | | | |
| | FACE B | | | | | | | | | | |
| TRANSFER S164 | 14 15 | | | | | | | | | | |
| | FACE A | 20 | 20 20 | 20 12 | 13 14 | 15 | | | | | |
| | FACE B | | | | | | | | | | |
| TRANSFER S165 | 16 17 | | | | | | | | | | |
| | FACE A | 20 | 20 20 | 20 12 | 13 14 | 15 16 | 17 | | | | |
| | FACE B | | | | | | | | | | |
| TRANSFER S166 | 18 19 | | | | | | | | | | |
| | FACE A | 20 | 20 20 | 20 12 | 13 14 | 15 16 | 17 18 | 19 | | | |
| | FACE B | | | | | | | | | | |
| TRANSFER S167 | 20 FE | | | | | | | | | | |
| | FACE A | 20 | 20 20 | 20 12 | 13 14 | 15 16 | 17 18 | 19 20 | | | |
| | FACE B | | | | | | | | | | |
| TRANSFER S168 | 11 02 | | | | | | | | | | TRANSFER D3 |
| | FACE A | 20 | 20 20 | 20 12 | 13 14 | 15 16 | 17 18 | 19 20 | 11 11 | | |
| | FACE B | 11 | | | | | | | | | |
| TRANSFER S169 | 98 B0 | | | | | | | | | | |
| | FACE A | | | | | | | | | | |
| | FACE B | 11 | 98 B0 | | | | | | | | |
| TRANSFER S170 | F2 FC | | | | | | | | | | |
| | FACE A | | | | | | | | | | |
| | FACE B | 11 | 98 B0 | F2 | | | | | | | |
| TRANSFER S171 | AB 03 | | | | | | | | | | |
| | FACE A | | | | | | | | | | |
| | FACE B | 11 | 98 B0 | F2 AB | AB AB | AB AB | | | | | |
| TRANSFER S172 | FF FE | | | | | | | | | | |
| | FACE A | | | | | | | | | | |
| | FACE B | 11 | 98 B0 | F2 AB | AB AB | AB AB | FF FE | | | | |
| TRANSFER S173 | FC FD | | | | | | | | | | |
| | FACE A | | | | | | | | | | |
| | FACE B | 11 | 98 B0 | F2 AB | AB AB | AB AB | FF FE | FC FD | | | |
| TRANSFER S174 | FF FF | | | | | | | | | | TRANSFER D4 |
| | FACE A | | | | | | | | | | |
| | FACE B | 11 | 98 B0 | F2 AB | AB AB | AB AB | FF FE | FC FD | FF FF | | |

SETTING CONDITION
VERTICAL LINE REARRANGEMENT PERFORMED
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

LOCAL MEMORY

| 00 | 01 | 00 | 00 | 00 | 00 | 00 | 00 | ... | 00 | 00 |
|----|----|----|----|----|----|----|----|-----|----|----|
| 01 | 01 | 00 | 00 | 00 | 00 | 00 | 00 | ... | 00 | 00 |
| 02 | 78 | 00 | 00 | 00 | 00 | 00 | 00 | ... | 00 | 00 |
| 55 | 44 | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| 11 | 11 | 00 | 00 | 00 | 00 | 00 | 00 | ... | 00 | 00 |

| 00 | 01 | 00 | 66 | 00 | 00 | 00 | 00 | ... | 00 | 00 |
|----|----|----|----|----|----|----|----|-----|----|----|
| 01 | 01 | 12 | 77 | 00 | 00 | 00 | 00 | ... | 00 | 00 |
| 02 | 78 | 45 | 89 | 00 | 00 | 00 | 00 | ... | 00 | 00 |
| 55 | 44 | 10 | 55 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| FF | FF | 10 | 10 | 00 | 00 | 00 | 00 | ... | 00 | 00 |
| 11 | 11 | 20 | 20 | 00 | 00 | 00 | 00 | ... | 00 | 00 |

| 00 | 01 | 00 | 66 | 00 | 20 | 00 | 00 | ... | 00 | 00 |
|----|----|----|----|----|----|----|----|-----|----|----|
| 01 | 01 | 12 | 77 | 20 | 20 | 00 | 00 | ... | 00 | 00 |
| 02 | 78 | 45 | 89 | 20 | 12 | 00 | 00 | ... | 00 | 00 |
| 55 | 44 | 10 | 55 | 13 | 14 | 00 | 00 | ... | 00 | 00 |
| FF | FF | 10 | 10 | 15 | 16 | 00 | 00 | ... | 00 | 00 |
| FF | FF | 10 | 10 | 17 | 18 | 00 | 00 | ... | 00 | 00 |
| FF | FF | 10 | 10 | 19 | 20 | 00 | 00 | ... | 00 | 00 |
| 11 | 11 | 20 | 20 | 11 | 11 | 00 | 00 | ... | 00 | 00 |

| 00 | 01 | 00 | 66 | 00 | 20 | 00 | 11 | ... | 00 | 00 |
|----|----|----|----|----|----|----|----|-----|----|----|
| 01 | 01 | 12 | 77 | 20 | 20 | 98 | B0 | ... | 00 | 00 |
| 02 | 78 | 45 | 89 | 20 | 12 | F2 | AB | ... | 00 | 00 |
| 55 | 44 | 10 | 55 | 13 | 14 | AB | AB | ... | 00 | 00 |
| FF | FF | 10 | 10 | 15 | 16 | AB | AB | ... | 00 | 00 |
| FF | FF | 10 | 10 | 17 | 18 | FF | FE | ... | 00 | 00 |
| FF | FF | 10 | 10 | 19 | 20 | FC | FD | ... | 00 | 00 |
| 11 | 11 | 20 | 20 | 11 | 11 | FF | FF | ... | 00 | 00 |

FIG. 26

DECU

| | | | | | | | | | | | | |
|---|---|---|---|---|---|---|---|---|---|---|---|---|
| TRANSFER S193 | 13 14 | | | | | | | | | | | |
| | FACE A | 20 | 20 20 | 20 12 | 13 14 | | | | | | | |
| | FACE B | | | | | | | | | | | |
| TRANSFER S194 | 15 16 | | | | | | | | | | | |
| | FACE A | 20 | 20 20 | 20 12 | 13 14 | 15 16 | | | | | | |
| | FACE B | | | | | | | | | | | |
| TRANSFER S195 | 17 18 | | | | | | | | | | | |
| | FACE A | 20 | 20 20 | 20 12 | 13 14 | 15 16 | 17 18 | | | | | |
| | FACE B | | | | | | | | | | | |
| TRANSFER S196 | 19 20 | | | | | | | | | | | |
| | FACE A | 20 | 20 20 | 20 12 | 13 14 | 15 16 | 17 18 | 19 20 | | | | |
| | FACE B | | | | | | | | | | | |
| TRANSFER S197 | FD 11 | | | | | | | | | | | TRANSFER D3 |
| | FACE A | 20 | 20 20 | 20 12 | 13 14 | 15 16 | 17 18 | 19 20 | 11 11 | 11 | | ⇨ |
| | FACE B | 11 | | | | | | | | | | |
| TRANSFER S198 | 02 98 | | | | | | | | | | | |
| | FACE A | | | | | | | | | | | |
| | FACE B | 11 | 98 | | | | | | | | | |
| TRANSFER S199 | B0 F2 | | | | | | | | | | | |
| | FACE A | | | | | | | | | | | |
| | FACE B | 11 | 98 B0 | F2 | | | | | | | | |
| TRANSFER S200 | FC AB | | | | | | | | | | | |
| | FACE A | | | | | | | | | | | |
| | FACE B | 11 | 98 B0 | F2 AB | AB AB | AB AB | | | | | | |
| TRANSFER S201 | 03 FF | | | | | | | | | | | |
| | FACE A | | | | | | | | | | | |
| | FACE B | 11 | 98 B0 | F2 AB | AB AB | AB AB | FF | | | | | |
| TRANSFER S202 | FE FC | | | | | | | | | | | |
| | FACE A | | | | | | | | | | | |
| | FACE B | 11 | 98 B0 | F2 AB | AB AB | AB AB | FF FE | FC | | | | |
| TRANSFER S203 | FD FE | | | | | | | | | | | |
| | FACE A | | | | | | | | | | | |
| | FACE B | 11 | 98 B0 | F2 AB | AB AB | AB AB | FF FE | FC FD | | | | |
| TRANSFER S204 | FF 00 | | | | | | | | | | | TRANSFER D4 |
| | FACE A | | | | | | | | | | | |
| | FACE B | 11 | 98 B0 | F2 AB | AB AB | AB AB | FF FE | FC FD | FF FF | FF | | ⇨ |

OPERATION CONDITION
MAIN MEMORY SIDE : STARTING ADDRESS OF RUN LENGTH DATA IS AN ODD ADDRESS
LOCAL MEMORY SIDE : STARTING ADDRESS OF IMAGE DATA IS AN ODD ADDRESS
NUMBER OF 1 LINE BUFFER : 15 BYTES

FIG. 28

DECU

| | | | | | | | | | | | | |
|---|---|---|---|---|---|---|---|---|---|---|---|---|
| TRANSFER S223 | 13 14 | | | | | | | | | | | |
| | FACE A | 20 | 20 20 | 20 12 | 13 14 | | | | | | |
| | FACE B | | | | | | | | | | |
| TRANSFER S224 | 15 16 | | | | | | | | | | | |
| | FACE A | 20 | 20 20 | 20 12 | 13 14 | 15 16 | | | | | |
| | FACE B | | | | | | | | | | |
| TRANSFER S225 | 17 18 | | | | | | | | | | | |
| | FACE A | 20 | 20 20 | 20 12 | 13 14 | 15 16 | 17 18 | | | | |
| | FACE B | | | | | | | | | | |
| TRANSFER S226 | 19 20 | | | | | | | | | | | |
| | FACE A | 20 | 20 20 | 20 12 | 13 14 | 15 16 | 17 18 | 19 20 | | | |
| | FACE B | | | | | | | | | | |
| TRANSFER S227 | FE 11 | | | | | | | | | | | TRANSFER D3 |
| | FACE A | 20 | 20 20 | 20 12 | 13 14 | 15 16 | 17 18 | 19 20 | 11 11 | | |
| | FACE B | 11 | | | | | | | | | |
| TRANSFER S228 | 02 98 | | | | | | | | | | | |
| | FACE A | | | | | | | | | | |
| | FACE B | 11 | 98 | | | | | | | | |
| TRANSFER S229 | B0 F2 | | | | | | | | | | | |
| | FACE A | | | | | | | | | | |
| | FACE B | 11 | 98 B0 | F2 | | | | | | | |
| TRANSFER S230 | FC AB | | | | | | | | | | | |
| | FACE A | | | | | | | | | | |
| | FACE B | 11 | 98 B0 | F2 AB | AB AB | AB AB | | | | | |
| TRANSFER S231 | 03 FF | | | | | | | | | | | |
| | FACE A | | | | | | | | | | |
| | FACE B | 11 | 98 B0 | F2 AB | AB AB | AB AB | FF | | | | |
| TRANSFER S232 | FE FC | | | | | | | | | | | |
| | FACE A | | | | | | | | | | |
| | FACE B | 11 | 98 B0 | F2 AB | AB AB | AB AB | FF FE | FC | | | |
| TRANSFER S233 | FD FE | | | | | | | | | | | |
| | FACE A | | | | | | | | | | |
| | FACE B | 11 | 98 B0 | F2 AB | AB AB | AB AB | FF FE | FC FD | | | |
| TRANSFER S234 | FF 00 | | | | | | | | | | | TRANSFER D4 |
| | FACE A | | | | | | | | | | |
| | FACE B | 11 | 98 B0 | F2 AB | AB AB | AB AB | FF FE | FC FD | FF FF | | |

SETTING CONDITION
VERTICAL LINE REARRANGEMENT PERFORMED
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

LOCAL MEMORY

FIG. 29A

D1 ↓ IMAGE 1

| 01 01 | 00 00 | 00 00 | 00 00 | ··· | 00 00 |
|---|---|---|---|---|---|
| 01 02 | 00 00 | 00 00 | 00 00 | ··· | 00 00 |
| 78 55 | 00 00 | 00 00 | 00 00 | ··· | 00 00 |
| 44 FF | 00 00 | 00 00 | 00 00 | ··· | 00 00 |
| FF FF | 00 00 | 00 00 | 00 00 | ··· | 00 00 |
| FF FF | 00 00 | 00 00 | 00 00 | ··· | 00 00 |
| FF 11 | 00 00 | 00 00 | 00 00 | ··· | 00 00 |
| 11 11 | 00 00 | 00 00 | 00 00 | ··· | 00 00 |

FIG. 29B

D2 ↓ IMAGE 2

| 66 12 | 00 00 | 00 00 | 00 00 | ··· | 00 00 |
|---|---|---|---|---|---|
| 77 45 | 00 00 | 00 00 | 00 00 | ··· | 00 00 |
| 89 10 | 00 00 | 00 00 | 00 00 | ··· | 00 00 |
| 55 10 | 00 00 | 00 00 | 00 00 | ··· | 00 00 |
| 10 10 | 00 00 | 00 00 | 00 00 | ··· | 00 00 |
| 10 10 | 00 00 | 00 00 | 00 00 | ··· | 00 00 |
| 10 20 | 00 00 | 00 00 | 00 00 | ··· | 00 00 |
| 20 20 | 00 00 | 00 00 | 00 00 | ··· | 00 00 |

FIG. 29C

D3 ↓ IMAGE 1

| 01 01 | 20 20 | 00 00 | 00 00 | ··· | 00 00 |
|---|---|---|---|---|---|
| 01 02 | 20 20 | 00 00 | 00 00 | ··· | 00 00 |
| 78 55 | 12 13 | 00 00 | 00 00 | ··· | 00 00 |
| 44 FF | 14 15 | 00 00 | 00 00 | ··· | 00 00 |
| FF FF | 16 17 | 00 00 | 00 00 | ··· | 00 00 |
| FF FF | 18 19 | 00 00 | 00 00 | ··· | 00 00 |
| FF 11 | 20 11 | 00 00 | 00 00 | ··· | 00 00 |
| 11 11 | 11 11 | 00 00 | 00 00 | ··· | 00 00 |

FIG. 29D

D4 ↓ IMAGE 2

| 66 12 | 11 98 | 00 00 | 00 00 | ··· | 00 00 |
|---|---|---|---|---|---|
| 77 45 | B0 F2 | 00 00 | 00 00 | ··· | 00 00 |
| 89 10 | AB AB | 00 00 | 00 00 | ··· | 00 00 |
| 55 10 | AB AB | 00 00 | 00 00 | ··· | 00 00 |
| 10 10 | AB FF | 00 00 | 00 00 | ··· | 00 00 |
| 10 10 | FE FC | 00 00 | 00 00 | ··· | 00 00 |
| 10 20 | FD FF | 00 00 | 00 00 | ··· | 00 00 |
| 20 20 | FF FF | 00 00 | 00 00 | ··· | 00 00 |

SETTING CONDITION
NO VERTICAL LINE REARRANGEMENT
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

LOCAL MEMORY

FIG. 30A

IMAGE 1

IMAGE 2

IMAGE 1

| 01 01 | 01 02 | 78 55 | 44 FF |
|---|---|---|---|
| FF FF | FF FF | FF 11 | 11 11 |
| 20 20 | 20 20 | 12 13 | 14 15 |
| 16 17 | 18 19 | 20 11 | 11 11 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

D3 → (points to row 3)

FIG. 30D

IMAGE 2

| 66 12 | 77 45 | 89 10 | 55 10 |
|---|---|---|---|
| 10 10 | 10 10 | 10 20 | 20 20 |
| 11 98 | B0 F2 | AB AB | AB AB |
| AB FF | FE FC | FD FF | FF FF |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

D4 → (points to row 3)

SETTING CONDITION
VERTICAL LINE REARRANGEMENT PERFORMED
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

FIG. 31A

LOCAL MEMORY
D1 ↓     IMAGE 1

| 01 01 | 00 00 | 00 00 | 00 00 | ... | 00 00 |
|---|---|---|---|---|---|
| 01 02 | 00 00 | 00 00 | 00 00 | ... | 00 00 |
| 78 55 | 00 00 | 00 00 | 00 00 | ... | 00 00 |
| 44 FF | 00 00 | 00 00 | 00 00 | ... | 00 00 |
| FF FF | 00 00 | 00 00 | 00 00 | ... | 00 00 |
| FF FF | 00 00 | 00 00 | 00 00 | ... | 00 00 |
| FF 11 | 00 00 | 00 00 | 00 00 | ... | 00 00 |
| 11 00 | 00 00 | 00 00 | 00 00 | ... | 00 00 |

FIG. 31B

D2 ↓     IMAGE 2

| 66 12 | 00 00 | 00 00 | 00 00 | ... | 00 00 |
|---|---|---|---|---|---|
| 77 45 | 00 00 | 00 00 | 00 00 | ... | 00 00 |
| 89 10 | 00 00 | 00 00 | 00 00 | ... | 00 00 |
| 55 10 | 00 00 | 00 00 | 00 00 | ... | 00 00 |
| 10 10 | 00 00 | 00 00 | 00 00 | ... | 00 00 |
| 10 10 | 00 00 | 00 00 | 00 00 | ... | 00 00 |
| 10 20 | 00 00 | 00 00 | 00 00 | ... | 00 00 |
| 20 00 | 00 00 | 00 00 | 00 00 | ... | 00 00 |

FIG. 31C

D3 ↓     IMAGE 1

| 01 01 | 20 20 | 00 00 | 00 00 | ... | 00 00 |
|---|---|---|---|---|---|
| 01 02 | 20 20 | 00 00 | 00 00 | ... | 00 00 |
| 78 55 | 12 13 | 00 00 | 00 00 | ... | 00 00 |
| 44 FF | 14 15 | 00 00 | 00 00 | ... | 00 00 |
| FF FF | 16 17 | 00 00 | 00 00 | ... | 00 00 |
| FF FF | 18 19 | 00 00 | 00 00 | ... | 00 00 |
| FF 11 | 20 11 | 00 00 | 00 00 | ... | 00 00 |
| 11 00 | 11 00 | 00 00 | 00 00 | ... | 00 00 |

FIG. 31D

D4 ↓     IMAGE 2

| 66 12 | 11 98 | 00 00 | 00 00 | ... | 00 00 |
|---|---|---|---|---|---|
| 77 45 | B0 F2 | 00 00 | 00 00 | ... | 00 00 |
| 89 10 | AB AB | 00 00 | 00 00 | ... | 00 00 |
| 55 10 | AB AB | 00 00 | 00 00 | ... | 00 00 |
| 10 10 | AB FF | 00 00 | 00 00 | ... | 00 00 |
| 10 10 | FE FC | 00 00 | 00 00 | ... | 00 00 |
| 10 20 | FD FF | 00 00 | 00 00 | ... | 00 00 |
| 20 00 | FF 00 | 00 00 | 00 00 | ... | 00 00 |

SETTING CONDITION
NO VERTICAL LINE REARRANGEMENT
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

FIG. 32A

LOCAL MEMORY  IMAGE 1

IMAGE 2

IMAGE 1

| 01 01 | 01 02 | 78 55 | 44 FF |
|-------|-------|-------|-------|
| FF FF | FF FF | FF 11 | 11 00 |

IMAGE 2

| 66 12 | 77 45 | 89 10 | 55 10 |
|-------|-------|-------|-------|
| 10 10 | 10 10 | 10 20 | 20 00 |

D4 →
| 11 98 | B0 F2 | AB AB | AB AB |
|-------|-------|-------|-------|
| AB FF | FE FC | FD FF | FF 00 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

SETTING CONDITION
VERTICAL LINE REARRANGEMENT PERFORMED
TOTAL NUMBER OF DEVELOPED BYTES : 64 BYTES(16 × 4)
NUMBER OF BYTES IN 1 LINE : 16 BYTES
NUMBER OF DEVELOPED LINES : 4 LINES

FIG. 33A

LOCAL MEMORY
D1 ↓ IMAGE 1

| | | | | | | | | | |
|--|--|--|--|--|--|--|--|--|--|
| 00 | 01 | 00 | 00 | 00 | 00 | 00 | 00 | ··· | 00 00 |
| 01 | 01 | 00 | 00 | 00 | 00 | 00 | 00 | ··· | 00 00 |
| 02 | 78 | 00 | 00 | 00 | 00 | 00 | 00 | ··· | 00 00 |
| 55 | 44 | 00 | 00 | 00 | 00 | 00 | 00 | ··· | 00 00 |
| FF | FF | 00 | 00 | 00 | 00 | 00 | 00 | ··· | 00 00 |
| FF | FF | 00 | 00 | 00 | 00 | 00 | 00 | ··· | 00 00 |
| FF | FF | 00 | 00 | 00 | 00 | 00 | 00 | ··· | 00 00 |
| 11 | 11 | 00 | 00 | 00 | 00 | 00 | 00 | ··· | 00 00 |
| 11 | 00 | 00 | 00 | 00 | 00 | 00 | 00 | ··· | 00 00 |

FIG. 33B

D2 ↓ IMAGE 2

| | | | | | | | | | |
|--|--|--|--|--|--|--|--|--|--|
| 00 | 66 | 00 | 00 | 00 | 00 | 00 | 00 | ··· | 00 00 |
| 12 | 77 | 00 | 00 | 00 | 00 | 00 | 00 | ··· | 00 00 |
| 45 | 89 | 00 | 00 | 00 | 00 | 00 | 00 | ··· | 00 00 |
| 10 | 55 | 00 | 00 | 00 | 00 | 00 | 00 | ··· | 00 00 |
| 10 | 10 | 00 | 00 | 00 | 00 | 00 | 00 | ··· | 00 00 |
| 10 | 10 | 00 | 00 | 00 | 00 | 00 | 00 | ··· | 00 00 |
| 10 | 10 | 00 | 00 | 00 | 00 | 00 | 00 | ··· | 00 00 |
| 20 | 20 | 00 | 00 | 00 | 00 | 00 | 00 | ··· | 00 00 |
| 20 | 00 | 00 | 00 | 00 | 00 | 00 | 00 | ··· | 00 00 |

FIG. 33C

D3 ↓ IMAGE 1

| | | | | | | | | | |
|--|--|--|--|--|--|--|--|--|--|
| 00 | 01 | 00 | 20 | 00 | 00 | 00 | 00 | ··· | 00 00 |
| 01 | 01 | 20 | 20 | 00 | 00 | 00 | 00 | ··· | 00 00 |
| 02 | 78 | 20 | 12 | 00 | 00 | 00 | 00 | ··· | 00 00 |
| 55 | 44 | 13 | 14 | 00 | 00 | 00 | 00 | ··· | 00 00 |
| FF | FF | 15 | 16 | 00 | 00 | 00 | 00 | ··· | 00 00 |
| FF | FF | 17 | 18 | 00 | 00 | 00 | 00 | ··· | 00 00 |
| FF | FF | 19 | 20 | 00 | 00 | 00 | 00 | ··· | 00 00 |
| 11 | 11 | 11 | 11 | 00 | 00 | 00 | 00 | ··· | 00 00 |
| 11 | 00 | 11 | 00 | 00 | 00 | 00 | 00 | ··· | 00 00 |

FIG. 33D

D4 ↓ IMAGE 2

| | | | | | | | | | |
|--|--|--|--|--|--|--|--|--|--|
| 00 | 66 | 00 | 11 | 00 | 00 | 00 | 00 | ··· | 00 00 |
| 12 | 77 | 98 | B0 | 00 | 00 | 00 | 00 | ··· | 00 00 |
| 45 | 89 | F2 | AB | 00 | 00 | 00 | 00 | ··· | 00 00 |
| 10 | 55 | AB | AB | 00 | 00 | 00 | 00 | ··· | 00 00 |
| 10 | 10 | AB | AB | 00 | 00 | 00 | 00 | ··· | 00 00 |
| 10 | 10 | FF | FE | 00 | 00 | 00 | 00 | ··· | 00 00 |
| 10 | 10 | FC | FD | 00 | 00 | 00 | 00 | ··· | 00 00 |
| 20 | 20 | FF | FF | 00 | 00 | 00 | 00 | ··· | 00 00 |
| 20 | 00 | FF | 00 | 00 | 00 | 00 | 00 | ··· | 00 00 |

SETTING CONDITION
VERTICAL LINE REARRANGEMENT PERFORMED
TOTAL NUMBER OF DEVELOPED BYTES : 60 BYTES(15 × 4)
NUMBER OF BYTES IN 1 LINE : 15 BYTES
NUMBER OF DEVELOPED LINES : 4 LINES

LOCAL MEMORY

FIG. 34A — D1, IMAGE 1

| 00 | 01 | 00 | 00 | 00 | 00 | 00 | 00 | ... | 00 | 00 |
|----|----|----|----|----|----|----|----|-----|----|----|
| 01 | 01 | 00 | 00 | 00 | 00 | 00 | 00 | ... | 00 | 00 |
| 02 | 78 | 00 | 00 | 00 | 00 | 00 | 00 | ... | 00 | 00 |
| 55 | 44 | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| FF | FF | 00 | 00 | 00 | 00 | 00 | 00 | ... | 00 | 00 |
| 11 | 11 | 00 | 00 | 00 | 00 | 00 | 00 | ... | 00 | 00 |

FIG. 34B — D2, IMAGE 2

| 00 | 66 | 00 | 00 | 00 | 00 | 00 | 00 | ... | 00 | 00 |
|----|----|----|----|----|----|----|----|-----|----|----|
| 12 | 77 | 00 | 00 | 00 | 00 | 00 | 00 | ... | 00 | 00 |
| 45 | 89 | 00 | 00 | 00 | 00 | 00 | 00 | ... | 00 | 00 |
| 10 | 55 | 00 | 00 | 00 | 00 | 00 | 00 | ... | 00 | 00 |
| 10 | 10 | 00 | 00 | 00 | 00 | 00 | 00 | ... | 00 | 00 |
| 10 | 10 | 00 | 00 | 00 | 00 | 00 | 00 | ... | 00 | 00 |
| 10 | 10 | 00 | 00 | 00 | 00 | 00 | 00 | ... | 00 | 00 |
| 20 | 20 | 00 | 00 | 00 | 00 | 00 | 00 | ... | 00 | 00 |

FIG. 34C — D3, IMAGE 1

| 00 | 01 | 00 | 20 | 00 | 00 | 00 | 00 | ... | 00 | 00 |
|----|----|----|----|----|----|----|----|-----|----|----|
| 01 | 01 | 20 | 20 | 00 | 00 | 00 | 00 | ... | 00 | 00 |
| 02 | 78 | 20 | 12 | 00 | 00 | 00 | 00 | ... | 00 | 00 |
| 55 | 44 | 13 | 14 | 00 | 00 | 00 | 00 | ... | 00 | 00 |
| FF | FF | 15 | 16 | 00 | 00 | 00 | 00 | ... | 00 | 00 |
| FF | FF | 17 | 18 | 00 | 00 | 00 | 00 | ... | 00 | 00 |
| FF | FF | 19 | 20 | 00 | 00 | 00 | 00 | ... | 00 | 00 |
| 11 | 11 | 11 | 11 | 00 | 00 | 00 | 00 | ... | 00 | 00 |

FIG. 34D — D4, IMAGE 2

| 00 | 66 | 00 | 11 | 00 | 00 | 00 | 00 | ... | 00 | 00 |
|----|----|----|----|----|----|----|----|-----|----|----|
| 12 | 77 | 98 | B0 | 00 | 00 | 00 | 00 | ... | 00 | 00 |
| 45 | 89 | F2 | AB | 00 | 00 | 00 | 00 | ... | 00 | 00 |
| 10 | 55 | AB | AB | 00 | 00 | 00 | 00 | ... | 00 | 00 |
| 10 | 10 | AB | AB | 00 | 00 | 00 | 00 | ... | 00 | 00 |
| 10 | 10 | FF | FE | 00 | 00 | 00 | 00 | ... | 00 | 00 |
| 10 | 10 | FC | FD | 00 | 00 | 00 | 00 | ... | 00 | 00 |
| 20 | 20 | FF | FF | 00 | 00 | 00 | 00 | ... | 00 | 00 |

FIG. 35
OPERATION CONDITION
MAIN MEMORY SIDE : STARTING ADDRESS OF RUN LENGTH DATA IS AN EVEN ADDRESS
LOCAL MEMORY SIDE : STARTING ADDRESS OF IMAGE DATA IS AN EVEN ADDRESS
NUMBER OF 1 LINE BUFFER : 16 BYTES
DECU
| FACE A | 01 01 | | | | | | | |
|---|---|---|---|---|---|---|---|---|
| FACE B | | | | | | | | |
⋮
| FACE A | 01 01 | 01 02 | 78 55 | 44 FF | FF FF | FF FF | FF 11 | 11 11 | |
|---|---|---|---|---|---|---|---|---|---|
| FACE B | | | | | | | | | |
TRANSFER D1 
⋮
| FACE A | | | | | | | | | |
|---|---|---|---|---|---|---|---|---|---|
| FACE B | 66 12 | 77 45 | 89 10 | 55 10 | 10 10 | 10 10 | 10 20 | 20 20 | |
TRANSFER D2 
⋮
| FACE A | 20 20 | 20 20 | 12 13 | 14 15 | 16 17 | 18 19 | 20 11 | 11 11 | |
|---|---|---|---|---|---|---|---|---|---|
| FACE B | | | | | | | | | |
TRANSFER D3 
⋮
| FACE A | | | | | | | | | |
|---|---|---|---|---|---|---|---|---|---|
| FACE B | 11 98 | B0 F2 | AB AB | AB AB | AB FF | FE FC | FD FF | FF FF | |
TRANSFER D4 

DATA TRANSFERRING APPARATUS FOR TRANSFERRING LIQUID EJECTION DATA AND A LIQUID EJECTING APPARATUS

This is a divisional application of copending U.S. application Ser. No. 10/649,545, filed on Aug. 26, 2003, from which priority is claimed.

The present application claims priority from Japanese Patent Applications Nos. 2002-245174 filed on Aug. 26, 2002, 2002-245209 filed on Aug. 26, 2002, 2002-245243 filed on Aug. 26, 2002, 2002-245366 filed on Aug. 26, 2002, 2003-162047 filed on Jun. 6, 2003, 2003-162120 filed on Jun. 6, 2003, 2003-162153 filed on Jun. 6, 2003 and 2003-162221 filed on Jun. 6, 2003, the contents of which are incorporated herein by reference.

BACKGROUND OF THE INVENTION

1. Field of the Invention

The present invention relates to a data transferring apparatus for transferring liquid ejection data and a liquid ejecting apparatus of liquid ejection data for transferring the liquid ejection data to a liquid ejecting head, in which the liquid ejection data is inputted into the liquid ejecting apparatus which ejects liquid such as ink from the liquid ejecting head onto a medium to be ejected.

2. Description of the Related Art

A liquid ejecting apparatus called an inkjet type printer records image data by ejecting ink droplets from a recording head onto recording papers. The inkjet type printer ejects ink droplets of plural colors from plural nozzle arrays which are provided at the head face of the recording head as developing image data, which has been compressed to be capable of being developed in line, to bitmap images in line and forming the developed bitmap images on the recording side of the recording papers. It forms images on the recording papers by ejecting ink droplets of plural colors to form plural ink dots. Further, the compressed data capable of being developed in line is, for example, the compressed data by the run length compression method which is generally widely known, capable of developing per byte unit sequentially. This inkjet type recording apparatus generally has a data transferring apparatus for receiving image data compressed to be capable of being developed in line inputted from an external apparatus such as a personal computer, developing (extracting) the inputted compressed data in line, performing data processes required for the developed bitmap images and then transferring the data to a register of the recording head. The generally conventional data transferring apparatus is configured, for example, as shown in FIG. 36.

The data transferring apparatus 10 has a system bus SB as a data transfer route. To the system bus SB a microprocessor (MPU) 11, a RAM 12 and a head controlling unit 13 are coupled so as to transfer data, and a recording head 62 is coupled to the head controlling unit 13. The compressed recording data transferred from an information processing apparatus such as a personal computer or a digital camera, which is not shown in drawings, is stored in the RAM 12 via the system bus SB.

The compressed recording data stored in a compressed data storing area of the RAM 12 is transferred to the microprocessor 11 via the system bus SB one byte each in order (a route represented by the symbol A), extracted by a program in accordance with an extraction sequence one byte each in order, then transferred to the RAM 12 via the system bus SB one byte each in order once more (a route represented by the symbol B) and then stored a desired bitmap image area of the RAM 12. When the developed data has been completely stored in the bitmap image area of the RAM 12, the developed data in the bitmap image area of the RAM 12 is transferred to the head controlling unit 13 via the system bus SB one byte each (a route represented by the symbol C) and ink is ejected from each of the nozzle arrays of the recording head 62 onto the recording papers based on these bitmap images. And, as an example of the prior art to speed up the data transfer process, it is well-known that two independent buses, a system bus and a local bus, are provided and two bus controllers are provided between the system bus and the local bus. In regard to the data transferring apparatus, parallel processing is performed, that is, one bus controller accesses a main memory which is coupled to the system bus while the other bus controller accesses the local memory which is coupled to the local bus so that the data transfer process can be speeded up as shown, for example, in Japanese Patent No. 3251053.

To enhance the performance speed of liquid ejection with regard to the data transferring apparatus 10 of the conventional liquid ejecting apparatus configured as described above, in other words, to further increase the recording speed in regard to the inkjet type recording apparatus, there are some obstacles as mentioned below.

First, since the compressed recording data is developed (extracted) by a program one byte each, it is impossible to process a great quantity of compressed data at high speed. If the microprocessor 11, which operates at high speed clock with a high process capacity, is used, speeding up can be achieved, but it causes problems such that cost of the data transferring apparatus 10 gets extremely high if this expensive microprocessor 11 is mounted.

In addition, since both the data transfer to the RAM 12 and the data transfer from the RAM 12 are performed through the microprocessor 11, while the microprocessor 11 executes other data processes or calculations such that the microprocessor 11 fetches programs from the RAM 12, the data transfer might get into a waiting state, and thus the data transfer delay occurs, so that the data transfer at high speed cannot be achieved.

Further, in regard to the prior art disclosed in the Japanese Patent Publication No. 3251053 described above, the compressed recording data is also developed (extracted) by a program one byte each, so that a great amount of compressed data cannot be developed at high speed. Therefore, in regard to the liquid ejecting apparatus such as the recording apparatus which executes recording by developing the compressed recording data transferred from an information processing apparatus and then transferring it to the recording head, the speed of ejecting liquid cannot be enhanced because the process to develop the compressed data is still slow though the data transfer process can be performed at high speed.

SUMMARY OF THE INVENTION

It is the first object of the present invention to achieve development process of compressed data at high speed and the data transfer to the liquid ejecting head at high speed so that it is possible to considerably increase the liquid ejection speed of the liquid ejecting apparatus compared with that of the prior art.

In addition, it is the second object of the present invention to exactly nullify byte data which is not relevant in case the byte data irrelevant to the compressed liquid ejection data is included in and then securely develop only the compressed liquid ejection data from the head data.

Further, it is the third object of the present invention to realize the data transfer to the liquid ejecting head at high speed by performing a process rearranging the developed liquid ejection data for the liquid ejecting head so that it is possible to considerably increase the liquid ejection speed of the liquid ejecting apparatus compared with that of the prior art.

To achieve the objects above, according to the first aspect of the present invention, a data transferring apparatus for transferring liquid ejection data, comprises a decode circuit capable of performing hardware development on liquid ejection data, which is DMA-transferred per word unit from a main memory via a system bus, compressed to be capable of line development, wherein the data transferring apparatus comprises an invalid data mask processing means for nullifying data from head data, as many bytes as a remainder resulting from dividing a value of a data starting address of compressed liquid ejection data by the number of data bytes which the system bus can transfer per one data transfer, with respect to word data including head data of compressed data DMA-transferred from the main memory to the decode circuit.

First, since the data transfer of the compressed liquid ejection data from the main memory used to be performed one byte each in the conventional way is performed per word (two bytes) unit, the data transfer speed can be increased over two times. For example, if the system bus is a 16 bits bus, the compressed liquid ejection data stored in the main memory can be retrieved one word (two bytes) a time, and if the system bus is a 32 bits bus, the compressed liquid ejection data stored in the main memory can be retrieved two words (four bytes) a time.

In addition, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed.

Further, the high-speed data transfer can be achieved by the DMA (Direct Memory Access) transfer. The DMA transfer is such well-known transfer method as once addresses of a transfer source and a transfer destination or the number of transfer are set in a register, then the data transfer can be performed at high speed by hardware without the microprocessor.

However, in the DMA transfer per word unit by a 16-bit bus, an even address cannot help always coming first. Then, for example, if one word (two bytes) each is transferred per one data transfer operation as the system bus is a 16 bits, the data starting address of the compressed liquid ejection data stored in the main memory is an odd address, and thus byte data which is irrelevant to the liquid ejection data exists in the transferred data of one word (two bytes) including the head data of the compressed data. That is, the first byte of the word data (the byte data of the even address) is the byte data irrelevant to the liquid ejection data, and the second byte of the word data (the byte data of the odd address) is the head byte data of the liquid ejection data. For this reason, if the compressed liquid ejection data of which the starting address is an odd address is DMA-transferred from the main memory to the decode circuit per word unit and is hardware-developed, the liquid ejection data in a state where the irrelevant data is at the head of the original liquid ejection data is transferred.

Accordingly, if the irrelevant byte data is included in the transferred data including the head data of the compressed data DMA-transferred from the main memory to the decode circuit, this irrelevant byte data is nullified and then data is hardware-developed. Specifically, the number of bytes that the system bus, which is the data transfer route from the main memory to the decode circuit, can transfer per one data transfer is obtained first. For example, in case of a 16 bits bus, 16 bits/1 byte (8 bits)=2 bytes, in case of a 32 bits bus, 4 bytes and in case of a 64 bits bus then 8 bytes.

And, a remainder resulting from dividing the data starting address of the compressed liquid ejection data by the number of data bytes, which the system bus can transfer per one data transfer, is obtained. That is, if the remainder resulting from dividing the data starting address by the number of data bytes which the system bus can transfer per one data transfer does not exist, the first byte data (odd address) becomes the head byte data of the, and the irrelevant byte data is not included in regard to the transferred data of word unit including the compressed head data. On the other hand, if the remainder exists, the irrelevant byte data of as many bytes as the remainder from the head data is included in regard to the transferred data of word unit including the compressed head data.

Therefore, in regard to the word data including the compressed head data DMA-transferred from the main memory to the decode circuit having the possibility of including the irrelevant byte data, data of as many bytes as the remainder resulting from dividing the data starting address of compressed liquid ejection data DMA-transferred from the main memory to the decode circuit by the number of data bytes which the system bus can transfer per one data transfer is nullified, then hardware-developed by the decode circuit and then stored in the line buffer. Owing to this, since only the irrelevant byte data included in the word data including the compressed head data DMA-transferred from the main memory to the decode circuit is nullified, only the compressed liquid ejection data can developed by the decode circuit.

In this way, according to the data transferring apparatus for transferring liquid ejection data relating to the first aspect of the present invention, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

And, by DMA-transferring the compressed liquid ejection data from the main memory to the decode circuit per word unit, the data transfer can be achieved at further high speed, and in case the irrelevant byte data is included in the compressed liquid ejection data DMA-transferred from the main memory to the decode circuit per word unit, the irrelevant byte data can be exactly nullified by the invalid data mask processing means described above, and then only the compressed liquid ejection data can be securely hardware-developed from the head data.

According to the second aspect of the present invention, a data transferring apparatus for transferring liquid ejection data, comprises a decode circuit capable of performing hardware development on liquid ejection data, which is DMA-transferred per word unit from a main memory via a system bus, compressed to be capable of line development, wherein the data transferring apparatus comprises an invalid data mask processing means for nullifying head data of one byte in case data starting address of compressed data stored in the main memory is an odd address, with respect to word data including head data of compressed data DMA-transferred from the main memory to the decode circuit.

Like the data transferring apparatus for transferring liquid ejection data relating to the first aspect of the present invention, since the data transfer of the compressed liquid ejection data from the main memory used to be performed one byte each in the conventional way is performed per word (two bytes) unit, the data transfer speed can be increased over two times. For example, if the system bus is a 16 bits bus, the compressed liquid ejection data stored in the main memory can be retrieved one word (two bytes) a time, and if the system bus is a 32 bits bus, the compressed liquid ejection data stored in the main memory can be retrieved two words (four bytes) a time.

In addition, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed. Further, the high speed data transfer can be achieved by the DMA transfer.

Here, if the irrelevant byte data is included in the transferred data including the head data of the compressed data DMA-transferred from the main memory to the decode circuit, this irrelevant byte data is nullified and then data is hardware-developed. Specifically, since the compressed liquid ejection data is DMA-transferred from the main memory via the system bus one word each, if the data starting address of the compressed liquid ejection data stored in the main memory is an odd address, the first byte (byte data of an even address) of the word data is the byte data irrelevant to the liquid ejection data, and the second byte of the word data (byte data of an odd address) is the head byte data of the liquid ejection data, in regard to the transferred data of one word (2 bytes) including the head data of the compressed data.

Here, if the data starting address of the compressed liquid ejection data stored in the main memory is an odd address, the first one byte of the word data including the head data of the compressed data DMA-transferred from the main memory to the decode circuit is nullified owing to this, only the compressed liquid ejection data can be developed by the decode circuit while only the irrelevant byte data included in the word data including the head data of the compressed data DMA-transferred from the main memory to the decode circuit is nullified.

Therefore, according to the data transferring apparatus for transferring liquid ejection data relating to the second aspect of the present invention, like the data transferring apparatus for transferring liquid ejection data relating to the first aspect of the present invention, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

And, by DMA-transferring the compressed liquid ejection data from the main memory to the decode circuit one word each, the data transfer can be achieved at further high speed, and in case the irrelevant byte data is included in the compressed liquid ejection data DMA-transferred from the main memory to the decode circuit one word each, their relevant byte data can be exactly nullified by the invalid data mask processing means described above, and then only the compressed liquid ejection data can be securely hardware-developed from the head data.

According to the third aspect of the present invention, in regard to the first and second aspects described above, the data transferring apparatus comprises two independent buses which are the system bus and a local bus, the main memory coupled to the system bus, capable of transferring data, a local memory coupled to the local bus, capable of transferring data and a decode unit coupled to the system bus and local bus in order to transfer data therebetween, comprising the decode circuit a line buffer for storing liquid ejection data developed by the decode circuit per word unit and a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially.

In this way, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Owing to this, according to the data transferring apparatus for transferring liquid ejection data relating to the third aspect of the present invention, added to the first and second aspects described above, since it is possible to realize the development process of compressed data at high speed and the data transfer to the liquid ejecting head at high speed by the two independent buses of the system bus and the local bus and the DMA transfer means capable of transferring data at high speed without a microprocessor and the decode unit comprising the decode circuit, the action and effect that it is possible to considerably increase the liquid ejection speed of the liquid ejecting apparatus compared with that of the prior art can be obtained.

According to the fourth aspect of the present invention, in regard to the third aspect described above, an ASIC comprises registers of the main memory, the decode unit and the liquid ejecting head as a circuit block respectively, and registers of the decode unit and the liquid ejecting head are coupled through an dedicated bus in the ASIC.

In this way, since the main memory, which stores the compressed data, is configured to be the same block as the decode unit in the ASIC, the high speed DMA transfer can be achieved so as to transfer data particularly with one clock. Therefore, the compressed liquid ejection data can be transferred to the decode unit at higher speed. In addition, since the registers of the liquid ejecting head are also included in the same ASIC as a circuit block, and coupled to the decode unit through an dedicated bus in the ASIC, the data transfer of developed liquid ejection data from the local memory to the liquid ejecting head can be performed at higher speed.

Owing to this, according to the data transferring apparatus for transferring liquid ejection data relating to the fourth aspect of the present invention, added to the third aspect described above, the compressed liquid ejection data can be transferred to the decode unit at higher speed, the data transfer of developed liquid ejection data from the local memory to the liquid ejecting head can be performed at higher speed, and thus the action and effect that it is possible to further increase the liquid ejection speed of the liquid ejecting apparatus can be obtained.

According to the fifth aspect of the present invention, in regard to the fourth aspect described above, the line buffer comprises two faces of buffer areas capable of storing developed data of predetermined words, liquid ejection data developed by the decode circuit is sequentially stored in a first face of the buffer areas while liquid ejection data developed by the decode circuit is sequentially stored in a second face of the buffer areas when developed data of predetermined words has been accumulated, and developed data is DMA-transferred to the local memory per predetermined words when developed data of predetermined words has been accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face of the buffer areas, so that it is possible to perform development process of compressed recording data and data transfer process in parallel.

Owing to this, according to the data transferring apparatus for transferring liquid ejection data relating to the fifth aspect of the present invention, added to the fourth aspect described above, the development process of compressed recording data and the data transfer process can be perform in parallel, and thus the action and effect that it is possible to further increase the liquid ejection speed of the liquid ejecting apparatus can be obtained.

According to the sixth aspect of the present invention, in regard to the fifth aspect described above, data transfers with respect to the local bus from the decode circuit to the local memory and from the local memory to a register of the liquid ejecting head are performed in a burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the sixth aspect of the present invention, added to the fifth aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the seventh aspect of the present invention, in regard to the sixth aspect described above, the compressed liquid ejection data is run length compressed data, and the decode circuit can perform hardware development on run length compressed data.

According to the data transferring apparatus for transferring liquid ejection data relating to the seventh aspect of the present invention, by the decode circuit whereby the run length compressed data capable of line development can be hardware-developed, the action and effect in the sixth aspect described above can be achieved.

According to the eighth aspect of the present invention, in regard to the seventh aspect described above, the decode unit comprises a non-development processing means for storing uncompressed liquid ejection data DMA-transferred from the main memory in the line buffer without hardware development by the decode circuit.

According to the data transferring apparatus for transferring liquid ejection data relating to the eighth aspect of the present invention, added to the seventh aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the ninth aspect of the present invention, a liquid ejecting apparatus comprises a data transferring apparatus for transferring liquid ejection data comprising a decode circuit capable of performing hardware development on liquid ejection data, which is DMA-transferred per word unit from a main memory via a system bus, compressed to be capable of line development and an invalid data mask processing means for nullifying data from head data, as many bytes as the remainder resulting from dividing a value of a data starting address of compressed liquid ejection data by the number of data bytes which the system bus can transfer per one data transfer, with respect to word data including head data of compressed data DMA-transferred from the main memory to the decode circuit.

According to the liquid ejecting apparatus relating to the ninth aspect of the present invention, the action and effect in the first aspect described above can be achieved in regard to the liquid ejecting apparatus.

According to the tenth aspect of the present invention, a liquid ejecting apparatus comprises a data transferring apparatus for transferring liquid ejection data comprising a decode circuit capable of performing hardware development on liquid ejection data, which is DMA-transferred per word unit from a main memory via a system bus, compressed to be capable of line development and an invalid data mask processing means for nullifying head data of one byte in case data starting address of compressed data stored in the main memory is an odd address, with respect to word data including head data of compressed data DMA-transferred from the main memory to the decode circuit.

According to the liquid ejecting apparatus relating to the tenth aspect of the present invention, the action and effect in the second aspect described above can be achieved in regard to the liquid ejecting apparatus.

In addition, according to the eleventh aspect of the present invention, a data transferring apparatus for transferring liquid ejection data, comprises a decode unit comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit and a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially, wherein the decode unit comprises a data rearranging means for storing data in an array direction of a bitmap for a liquid ejecting head corresponding to a nozzle array of a liquid ejecting head in the local memory, when data developed in the line buffer is DMA-transferred to a bitmap area of the local memory per word unit.

First, since the data transfer of the compressed liquid ejection data from the main memory used to be performed one byte each in the conventional way is performed per word (two bytes) unit, the data transfer speed can be increased over two times. For example, if the system bus is a 16 bits bus, the compressed liquid ejection data stored in the main memory can be retrieved one word (two bytes) a time, and if the system bus is a 32 bits bus, the compressed liquid ejection data stored in the main memory can be retrieved two words (four bytes) a time.

In addition, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed. Further, the high speed data transfer can be achieved by the DMA transfer.

By the way, for example, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, the data array of the bitmap data to which the compressed recording data has only been developed generally is not suitable for the recording head. That is, although the ink dots are formed by ejecting ink from the recording head based on the recording data to which the compressed recording data has only been developed, the ink dot array according to the recording data cannot be formed. Therefore, after the compressed liquid ejection data is developed, it is necessary to rearrange the data array wherein the developed bitmap data is suitable for the liquid ejecting head, so that the data rearrangement process has been performed by a program after hardware-developed by a conventional program in the conventional way.

However, if the data rearrangement process is performed by a program in the conventional way though hardware-developed by a decode circuit with high speed, after the liquid ejection data developed by the decode circuit is stored in a local memory, the developed liquid ejection data stored in the local memory by a program cannot help being rearranged one at a time, and thus the effect caused by developing the compressed liquid ejection data at high speed consequently gets diminished.

Accordingly, the data rearranging means is provided in the decode unit to store data in an array direction of a bitmap for the liquid ejecting head corresponding to the nozzle array of the liquid ejecting head in the local memory, when the data developed in the line buffer is DMA-transferred to the bitmap area in the local memory per word unit. That is, in regard to the decode unit, after the development process of the compressed liquid ejection data, the developed liquid ejection data stored in the line buffet is DMA-transferred to the local memory by the data rearranging means while rearranged in the array direction of the bitmap for the liquid ejecting head. Therefore, the development process of the compressed liquid ejection data and the data rearrangement of the developed liquid ejection data can be performed at high speed.

owing to this, according to the data transferring apparatus for transferring liquid ejection data relating to the eleventh aspect of the present invention, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

And, by the data rearranging means for DMA-transferring the developed liquid ejection data stored in the line buffer to the local memory while rearranging it in the array direction of the bitmap for the liquid ejecting head, it is possible to maximize the effect that the decode circuit performs hardware development on the compressed liquid ejection data at high speed.

According to the twelfth aspect of the present invention, in regard to the eleventh aspect, the decode unit comprises a data dividing means for storing data in bitmap areas which are different per predetermined words, when data developed in the line buffer is DMA-transferred to a bitmap area of the local memory per word unit.

As described above, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. The nozzle arrays provided on the head face are formed in order that plural nozzle arrays ejecting ink of the same color are arranged to be perpendicular to the scanning direction of the recording head, and the nozzle array of each ink color is arranged in the scanning direction of the recording head while plural nozzle arrays are in parallel.

Here, if the scanning direction of the recording head is the main scanning direction, and the direction perpendicular to the main scanning direction along the head face is the sub scanning direction, the inkjet type recording apparatus performs recording by mutually performing the operation to form the ink dots on the recording papers by ejecting ink from the nozzle arrays while moving back and forth the recording head in the main scanning direction against the recording papers and the operation to relatively moving the recording papers in the sub scanning direction as much as a predetermined amount. And, the resolution of the sub scanning direction in regard to the developed bitmap data is not limited to be the same as that of the sub scanning direction of the recording head, and there may be the bitmap data having the higher resolution than that of the recording head in many cases. That is, if the dot interval of the sub scanning direction in regard to the developed bitmap data is smaller than that of the nozzle array adjacent to the sub scanning direction, the ink dots adjacent to the sub scanning direction cannot be formed at the same time for one main scan. For example, there a case that the resolution of the bitmap data is 360 dpi, and in contrast the resolution of the recording head is 180 dpi which is half of it.

In this case, the ink dots adjacent to the sub scanning direction are formed at the different scanning operations. However, the bitmap data developed by the decode circuit is designed to be the data configuration that the ink dot data formed to be adjacent to the sub scanning direction is continuously arranged, and thus the developed bitmap data as it is cannot be transferred to the recording head to be recorded. For this reason, it is necessary to divide the developed bitmap data in order that the ink dot data adjacent to the sub scanning direction can be stored in the different bitmap area and transferred to the recording head at the different main scan. And, hitherto, after the compressed recording data is developed by a program, the bitmap data is divided by the data process based on a program.

However, if the data division process is performed by a program in the conventional way though hardware-developed by a decode circuit with high speed, after the liquid ejection data developed by the decode circuit is stored in a local memory, the developed liquid ejection data stored in the local memory by a program cannot help being divided and stored in individual bitmap areas one at a time, and thus the effect caused by developing the compressed liquid ejection data at high speed consequently gets diminished.

Accordingly, the data dividing means is provided in the decode unit to store data in bitmap areas which are different per predetermined words, when the data developed in the line buffer is DMA-transferred to the bitmap area of the local memory per word unit. That is, in regard to the decode unit, after the development process of the compressed liquid ejection data, the developed liquid ejection data stored in the line buffer is DMA-transferred to the different bit map areas in the local memory by the data dividing means in order that the ink dots adjacent to the sub scanning direction are formed at the different main scan. Therefore, the development process of the compressed liquid ejection data and the data division of the developed liquid ejection data can be performed at high speed.

Owing to this, according to the data transferring apparatus for transferring liquid ejection data relating to the twelfth aspect of the present invention, added to the eleventh aspect described above, by the data dividing means for DMA-transferring while dividing the developed liquid ejection data stored in the line buffer to the different bitmap areas in the local memory, the action and effect that it is possible to maximize the effect that the decode circuit performs hardware development on the compressed liquid ejection data at high speed can be obtained.

According to the thirteenth aspect of the present invention, in regard to the twelfth aspect, the data dividing means sets the number of bitmap areas to be divided in accordance with a ratio of the resolution of liquid ejection data and the resolution of the liquid ejecting head.

According to the data transferring apparatus for transferring liquid ejection data relating to the thirteenth aspect of the present invention, added to the twelfth aspect described above, by setting the number of bitmap areas to be divided in accordance with the ratio of the resolution of the liquid ejection data and the resolution of the liquid ejecting head, the action and effect in the twelfth aspect described above can be achieved.

According to the fourteenth aspect of the present invention, in regard to the thirteenth aspect, the data transferring apparatus comprises an invalid data mask processing means for nullifying data from head data, as many bytes as the remainder resulting from dividing a value of a data starting address of compressed liquid ejection data by the number of data bytes which the system bus can transfer per one data transfer, with respect to word data including head data of compressed data DMA-transferred from the main memory to the decode circuit.

In the DMA transfer per word unit by a 16 bit bus, an even address cannot help always coming first. Then, for example, if one word (two bytes) each is transferred per one data transfer operation as the system bus is a 16 bits, the data starting address of the compressed liquid ejection data stored in the main memory is an odd address, and thus byte data which is irrelevant to the liquid ejection data exists in the transferred data of one word (two bytes) including the head data of the compressed data. That is, the first byte of the word data (the byte data of the even address) is the byte data irrelevant to the liquid ejection data, and the second byte of the word data (the byte data of the odd address) is the head byte data of the liquid ejection data. For this reason, if the compressed liquid ejection data of which the starting address is an odd address is DMA-transferred from the main memory to the decode circuit per word unit and hardware-developed, the liquid ejection data in a state where the irrelevant data is at the head of the original liquid ejection data is transferred.

Accordingly, if the irrelevant byte data is included in the transferred data including the head data of the compressed data DMA-transferred from the main memory to the decode circuit, this irrelevant byte data is nullified and then data is hardware-developed. Specifically, the number of bytes that the system bus, which is the data transfer route from the main memory to the decode circuit, can transfer per one data transfer is obtained first. For example, in case of a 16 bits bus, 16 bits/1 byte (8 bits)=2 bytes, in case of a 32 bits bus, 4 bytes and in case of a 64 bits bus then 8 bytes.

And, the remainder resulting from dividing the data starting address of the compressed liquid ejection data by the number of data bytes, which the system bus can transfer per one data transfer, is obtained. That is, if the remainder resulting from dividing the data starting address by the number of data bytes which the system bus can transfer per one data transfer does not exist, the first byte data (odd address) becomes the head byte data of the, and the irrelevant byte data is not included in regard to the transferred data of word unit including the compressed head data. On the other hand, if the remainder exists, the irrelevant byte data of as many bytes as the remainder from the head data is included in regard to the transferred data of word unit including the compressed head data.

Therefore, in regard to the word data including the compressed head data DMA-transferred from the main memory to the decode circuit having the possibility of including the irrelevant byte data, data of as many bytes as the remainder resulting from dividing the data starting address of compressed liquid ejection data DMA-transferred from the main memory to the decode circuit by the number of data bytes which the system bus can transfer per one data transfer is nullified, then hardware-developed by the decode circuit and then stored in the line buffer. Owing to this, since only the irrelevant byte data included in the word data including the compressed head data DMA-transferred from the main memory to the decode circuit is nullified, only the compressed liquid ejection data can developed by the decode circuit.

In this way, according to the data transferring apparatus for transferring liquid ejection data relating to the fourteenth aspect of the present invention, added to the thirteenth aspect described above, by DMA-transferring the compressed liquid ejection data from the main memory to the decode circuit per word unit, the data transfer can be achieved at further high speed, and in case the irrelevant byte data is included in the compressed liquid ejection data DMA-transferred from the main memory to the decode circuit per word unit, the action and effect that the irrelevant byte data can be exactly nullified by the invalid data mask processing means described above, and then only the compressed liquid ejection data can be securely hardware-developed from the head data can be obtained.

According to the fifteenth aspect of the present invention, in regard to the thirteenth aspect, the data transferring apparatus comprises an invalid data mask processing means for nullifying head data of one byte in case data starting address of compressed data stored in the main memory is an odd address, with respect to word data including head data of compressed data DMA-transferred from the main memory to the decode circuit.

In this way, if the irrelevant byte data is included in the transferred data including the head data of the compressed data DMA-transferred from the main memory to the decode circuit, this irrelevant byte data is nullified and then data is hardware-developed. Specifically, since the compressed liquid ejection data is DMA-transferred from the main memory via the system bus one word each, if the data starting address of the compressed liquid ejection data stored in the main memory is an odd address, the first byte (byte data of an even address) of the word data is the byte data irrelevant to the liquid ejection data, and the second byte of the word data (byte data of an odd address) is the head byte data of the liquid ejection data, in regard to the transferred data of one word (2 bytes) including the head data of the compressed data.

Here, if the data starting address of the compressed liquid ejection data stored in the main memory is an odd address, the first one byte of the word data including the head data of the compressed data DMA-transferred from the main memory to the decode circuit is nullified owing to this, only the compressed liquid ejection data can be developed by the decode circuit while only the irrelevant byte data included in the word data including the head data of the compressed data DMA-transferred from the main memory to the decode circuit is nullified.

Therefore, according to the data transferring apparatus for transferring liquid ejection data relating to the fifteenth aspect of the present invention, added to the thirteenth aspect described above, by DMA-transferring the compressed liquid ejection data from the main memory to the decode circuit one word each, the data transfer can be achieved at further high speed, and in case the irrelevant byte data is included in the compressed liquid ejection data DMA-transferred from the main memory to the decode circuit one word each, the action and effect that the irrelevant byte data can be exactly nullified by the invalid data mask processing means described above, and only the compressed liquid ejection data can be securely hardware-developed from the head data can be obtained.

According to the sixteenth aspect of the present invention, in regard to the fifteenth aspect, the decode unit comprises a data storage starting position shifting means for storing liquid ejection data developed by the decode circuit from a first byte of the line buffer in a state where a 0-th byte of the line buffer is vacant.

For example, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, when the developed bitmap data is stored in the bitmap area of the local memory and transferred to the recording head, there is a case that the data starting address of the bitmap data needs to be an odd address. Therefore, hitherto, after the compressed recording data is software-developed by a program, the developed bitmap data is transferred in order that the data starting address of the bitmap data can be an odd address by a program. However, if the bitmap data hardware-developed by the decode circuit per word unit is DMA-transferred to the local memory per word unit, the transfer is always performed as an even address comes first.

Accordingly, the data storage starting position shifting means is provided in the decode unit to store the liquid ejection data developed by the decode circuit from the first byte of the line buffer in a state where the 0-th byte of the line buffer is vacant, when storing the bitmap data developed by the decode circuit in the line buffer. That is, in regard to the decode unit, after the development process of the compressed liquid ejection data, when the developed liquid ejection data is stored in the line buffer, it is stored from the first byte of the line buffer in a state where the 0-th byte of the line buffer is vacant, and the developed liquid ejection data stored in the line buffer is DMA-transferred to the bitmap area in the local memory from the 0-th byte of the line buffer.

Since the developed liquid ejection data is stored from the first byte of the line buffer in a state where the 0-th byte of the line buffer is vacant, that is, from an odd byte-th in the line buffer, if DMA-transferred as it is to the bitmap area in the local memory per word unit from the 0-th byte of the line buffer, the vacant data which was stored in the 0-th byte of the line buffer is stored in the first even address area of the bitmap area. And, in the next odd address area, the head data of the developed liquid ejection data stored in the first byte of the line buffer is stored. Therefore, the data starting address of the bitmap data can be an odd address.

Owing to this, according to the data transferring apparatus for transferring liquid ejection data relating to the sixteenth aspect of the present invention, added to the fifteenth aspect described above, when the developed bitmap data is stored in the bitmap area of the local memory and transferred to the recording head, if it is necessary that the data starting address of the bitmap data be an odd address, by the data storage starting position shifting means for storing the liquid ejection data developed by the decode circuit from the first byte of the line buffer in a state where the 0-th byte of the line buffer is vacant when storing the bitmap data developed by the decode circuit in the line buffer, the action and effect that the data starting address of the bitmap data can be an odd address can be obtained.

According to the seventeenth aspect of the present invention, in regard to the sixteenth aspect, the decode unit comprises a data storage ending position shifting means for transferring developed liquid ejection data stored in the line buffer to liquid ejecting head each time developed data of the predetermined words from which one byte has been subtracted is stored in the line buffer.

As described above, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, there is a case that the bytes of the data block of the bitmap area need to be odd bytes, wherein the developed bitmap data is stored in the bitmap area of the local memory and transferred to the recording head. For example, the bytes of the data block of the bitmap area to be transferred to the recording head are generally set to be 16 bytes, however, there is a case that the bytes need to be 15 bytes one byte less under a specific condition, and hitherto, sine the compressed liquid ejection data is software-developed by a program per byte unit, then stored in the bitmap area of the memory one byte each by a program, there is no problem though the bytes of the data block are odd bytes. However, if the bitmap data hardware-developed by the decode circuit per word unit is DMA-transferred to the local memory per word unit, the transfer is always performed per word unit, that is, 2 bytes each. For this reason, the bytes of the data block of the bitmap area set to be 16 bytes cannot be 15 bytes, that is, the last one byte of the data block set to be 16 bytes cannot be a vacant byte.

Accordingly, by the data storage ending position shifting means is provided in the decode unit to transfer the developed liquid ejection data stored in the line buffer to the liquid ejecting head each time developed data of the predetermined words from which one byte has been subtracted is stored in the line buffer, it is possible to configure the data block of odd bytes in the bitmap area of the local memory. That is, when the developed data of predetermined words from which one byte has been subtracted is stored in the line buffer, the data of the last one word has the second half with one vacant byte.

And, since the data stored in the line buffer is DMA-transferred to the bitmap area of the local memory per word unit, the last one byte in regard to the data block of predetermined words in the bitmap area can be vacant, that is, the data block of predetermined words in the bitmap area can be the data block of predetermined words from which one byte has been subtracted. Further, the rest data of one byte developed per word unit, for example, is temporarily stored in a reserve storage area provided in the line buffer, and then stored in the 0-th byte of the line buffer. Alternatively, plural line buffers are provided, and it may be stored in the 0-th byte of a different line buffer as it is.

Owing to this, according to the data transferring apparatus for transferring liquid ejection data relating to the seventeenth aspect of the present invention, added to the sixteenth aspect described above, when the developed bitmap data is stored in the bitmap area of the local memory and transferred to the recording head, if it is necessary that the data block of the bitmap area be the data block of odd bytes, by the data storage ending position shifting means for transferring the developed liquid ejection data stored in the line buffer to the liquid ejecting head each time the developed data of the predetermined words from which one byte has been subtracted is stored in the line buffer, the action and effect that it is possible to configure the data block of odd bytes in the bitmap area of the local memory can be obtained.

According to the eighteenth aspect of the present invention, in regard to the seventeenth aspect, the data transferring apparatus comprises two independent buses which are the system bus and a local bus, the main memory coupled to the system bus, capable of transferring data and the local memory coupled to the local bus, capable of transferring data, and the decode unit is coupled to the system bus and local bus in order to transfer data therebetween.

In this way, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Owing to this, according to the data transferring apparatus for transferring liquid ejection data relating to the eighteenth aspect of the present invention, added to the seventeenth aspect described above, since it is possible to realize the development process of compressed data at high speed and the data transfer to the liquid ejecting head at high speed by the two independent buses of the system bus and the local bus and the OMA transfer means capable of transferring data at high speed without a microprocessor and the decode unit comprising the decode circuit, the action and effect that it is possible to considerably increase the liquid ejection speed of the liquid ejecting apparatus compared with that of the prior art can be obtained.

According to the nineteenth aspect of the present invention, in regard to the eighteenth aspect, an ASIC comprises registers of the main memory, the decode unit and the liquid ejecting head as a circuit block respectively, and registers of the decode unit and the liquid ejecting head are coupled through an dedicated bus in the ASIC.

In this way, since the main memory, which stores the compressed data, is configured to be the same block as the decode unit in the ASIC, the high speed DMA transfer can be achieved so as to transfer data particularly with one clock. Therefore, the compressed liquid ejection data can be transferred to the decode unit at higher speed. In addition, since the registers of the liquid ejecting head are also included in the same ASIC as a circuit block, and coupled to the decode unit through an dedicated bus in the ASIC, the data transfer of developed liquid ejection data from the local memory to the liquid ejecting head can be performed at higher speed.

Owing to this, according to the data transferring apparatus for transferring liquid ejection data relating to the nineteenth aspect of the present invention, added to the eighteenth aspect described above, the compressed liquid ejection data can be transferred to the decode unit at higher speed, the data transfer of developed liquid ejection data from the local memory to the liquid ejecting head can be performed at higher speed, and thus the action and effect that it is possible to further increase the liquid ejection speed of the liquid ejecting apparatus can be obtained.

According to the twentieth aspect of the present invention, in regard to the nineteenth aspect, the line buffer comprises two faces of buffer areas capable of storing developed data of predetermined words, liquid ejection data developed by the decode circuit is sequentially stored in a first face of the buffer areas while liquid ejection data developed by the decode circuit is sequentially stored in a second face of the buffer areas when developed data of predetermined words has been accumulated, and developed data is DMA-transferred to the local memory per predetermined words when developed data of predetermined words has been accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face, so that it is possible to perform development process of compressed recording data and data transfer process in parallel.

Owing to this, according to the data transferring apparatus for transferring liquid ejection data relating to the twentieth aspect of the present invention, added to the nineteenth aspect described above, the development process of compressed recording data and the data transfer process can be perform in parallel, and thus the action and effect that it is possible to further increase the liquid ejection speed of the liquid ejecting apparatus can be obtained.

According to the twenty-first aspect of the present invention, in regard to the twentieth aspect, data transfers with respect to the local bus from the decode circuit to the local memory and from the local memory to a register of the liquid ejecting head are performed in a burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the twenty-first aspect of the present invention, added to the twentieth aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the twenty-second aspect of the present invention, in regard to the twenty-first aspect, the compressed liquid ejection data is run length compressed data, and the decode circuit can perform hardware development on run length compressed data.

According to the data transferring apparatus for transferring liquid ejection data relating to the twenty-second aspect of the present invention, by the decode circuit whereby the run length compressed data capable of line development can be hardware-developed, the action and effect in the twenty-first aspect described above can be achieved.

According to the twenty-third aspect of the present invention, in regard to the twenty-second aspect, the decode unit comprises a non-development processing means for storing uncompressed liquid ejection data DMA-transferred from the main memory in the line buffer without hardware development by the decode circuit.

According to the data transferring apparatus for transferring liquid ejection data relating to the twenty-third aspect of the present invention, added to the twenty-second aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the twenty-fourth aspect of the present invention, a liquid ejecting apparatus comprising a data transferring apparatus for transferring liquid ejection data comprises a decode circuit capable of performing hardware development on liquid ejection data, which is DMA-transferred per word unit from a main memory via a system bus, compressed to be capable of line development, a line buffer for storing liquid ejection data developed by the decode circuit per word unit, a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially and a data rearranging means for storing data in an array direction of a bitmap for a liquid ejecting head corresponding to a nozzle array of a liquid ejecting head in the local memory, when data developed in the line buffer is DMA-transferred to a bitmap area of the local memory per word unit.

According to the liquid ejecting apparatus relating to the twenty-fourth aspect of the present invention, the action and effect in the eleventh aspect described above can be achieved in regard to the liquid ejecting apparatus.

According to the twenty-fifth aspect of the present invention, a data transferring apparatus for transferring liquid ejection data, comprises a decode unit comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit and a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially, wherein the decode unit comprises a data dividing means for storing data in bitmap areas which are different per predetermined words, when data developed in the line buffer is DMA-transferred to a bitmap area of the local memory per word unit.

First, since the data transfer of the compressed liquid ejection data from the main memory used to be performed one byte each in the conventional way is performed per word (two bytes) unit, the data transfer speed can be increased over two times. For example, if the system bus is a 16 bits bus, the compressed liquid ejection data stored in the main memory can be retrieved one word (two bytes) a time, and if the system bus is a 32 bits bus, the compressed liquid ejection data stored in the main memory can be retrieved two words (four bytes) a time.

In addition, the decode circuit performs hardware development on the compressed liquid ejection data on which a conventional program used to perform software development. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed. Further, the high speed data transfer can be achieved by the DMA transfer.

By the way, for example, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. The nozzle arrays provided on the head face are formed in order that plural nozzle arrays ejecting ink of the same color are arranged to be perpendicular to the scanning direction of the recording head, and the nozzle array of each ink color is arranged in the scanning direction of the recording head while plural nozzle arrays are in parallel.

Here, if the scanning direction of the recording head is the main scanning direction, and the direction perpendicular to the main scanning direction along the head face is the sub scanning direction, the inkjet type recording apparatus performs recording by mutually performing the operation to form the ink dots on the recording papers by ejecting ink from the nozzle arrays while moving back and forth the recording head in the main scanning direction against the recording papers and the operation to relatively moving the recording papers in the sub scanning direction as much as a predetermined amount. And, the resolution of the sub scanning direction in regard to the developed bitmap data is not limited to be the same as that of the sub scanning direction of the recording head, and there may be the bitmap data having the higher resolution than that of the recording head in many cases. That is, if the dot interval of the sub scanning direction in regard to the developed bitmap data is smaller than that of the nozzle array adjacent to the sub scanning direction, the ink dots adjacent to the sub scanning direction cannot be formed at the same time for one main scan. For example, there a case that the resolution of the bitmap data is 360 dpi, and in contrast the resolution of the recording head is 180 dpi which is half of it.

In this case, the ink dots adjacent to the sub scanning direction are formed at the different scanning operations. However, the bitmap data developed by the decode circuit is designed to be the data configuration that the ink dot data formed to be adjacent to the sub scanning direction is continuously arranged, and thus the developed bitmap data as it is cannot be transferred to the recording head to be recorded. For this reason, it is necessary to divide the developed bitmap data in order that the ink dot data adjacent to the sub scanning direction can be stored in the different bitmap area and transferred to the recording head at the different main scan. And, hitherto, after the compressed recording data is developed by a program, the bitmap data is divided by the data process based on a program.

However, if the data division process is performed by a program in the conventional way though hardware-developed by a decode circuit with high speed, after the liquid ejection data developed by the decode circuit is stored in a local memory, the developed liquid ejection data stored in the local memory by a program cannot help being divided and stored in individual bitmap areas one at a time, and thus the effect caused by developing the compressed liquid ejection data at high speed consequently gets diminished.

Accordingly, the data dividing means is provided in the decode unit to store data in bitmap areas which are different per predetermined words, when the data developed in the line buffer is DMA-transferred to the bitmap area of the local memory per word unit. That is, in regard to the decode unit, after the development process of the compressed liquid ejection data, the developed liquid ejection data stored in the line buffer is DMA-transferred to the different bitmap areas in the local memory by the data dividing means in order that the ink dots adjacent to the sub scanning direction are formed at the different main scan. Therefore, the development process of the compressed liquid ejection data and the data division of the developed liquid ejection data can be performed at high speed.

Owing to this, according to the data transferring apparatus for transferring liquid ejection data relating to the twenty-fifth aspect of the present invention, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

And, by the data dividing means for DMA-transferring while dividing the developed liquid ejection data stored in the line buffer to the different bitmap areas in the local memory, it is possible to maximize the effect that the decode circuit performs hardware development on the compressed liquid ejection data at high speed.

According to the twenty-sixth aspect of the present invention, in regard to the twenty-fifth aspect, the data dividing means sets the number of bitmap areas to be divided in accordance with a ratio of the resolution of liquid ejection data and the resolution of the liquid ejecting head.

According to the data transferring apparatus for transferring liquid ejection data relating to the twenty-sixth aspect of the present invention, added to the twenty-fifth aspect described above, by setting the number of bitmap areas to be divided in accordance with the ratio of the resolution of the liquid ejection data and the resolution of the liquid ejecting head, the action and effect in the twelfth aspect described above can be achieved.

According to the twenty-seventh aspect of the present invention, in regard to the twenty-sixth aspect, the data transferring apparatus comprises an invalid data mask processing means for nullifying data from head data, as many bytes as the remainder resulting from dividing a value of a data starting address of compressed liquid ejection data by the number of data bytes which the system bus can transfer per one data transfer, with respect to word data including head data of compressed data DMA-transferred from the main memory to the decode circuit.

In the DMA transfer per word unit by a 16 bit bus, an even address cannot help always coming first. Then, for example, if one word (two bytes) each is transferred per one data transfer operation as the system bus is a 16 bits, the data starting address of the compressed liquid ejection data stored in the main memory is an odd address, and thus byte data which is irrelevant to the liquid ejection data exists in the transferred data of one word (two bytes) including the head data of the compressed data. That is, the first byte of the word data (the byte data of the even address) is the byte data irrelevant to the liquid ejection data, and the second byte of the word data (the byte data of the odd address) is the head byte data of the liquid ejection data. For this reason, if the compressed liquid ejection data of which the starting address is an odd address is DMA-transferred from the main memory to the decode circuit per word unit and hardware-developed, the liquid ejection data in a state where the irrelevant data is at the head of the original liquid ejection data is transferred.

Accordingly, if the irrelevant byte data is included in the transferred data including the head data of the compressed data DMA-transferred from the main memory to the decode circuit, this irrelevant byte data is nullified and then data is hardware-developed. Specifically, the number of bytes the system bus which is the data transfer route from the main memory to the decode circuit can transfer per one data transfer is first obtained. For example, in case of a 16 bits bus, 16 bits/1 byte (9 bits)=2 bytes, in case of a 32 bits bus, 4 bytes and in case of a 64 bits bus then 8 bytes.

And, the remainder resulting from dividing the data starting address of the compressed liquid ejection data by the number of data bytes which the system bus can transfer per one data transfer is obtained. That is, if the remainder resulting from dividing the data starting address by the number of data bytes which the system bus can transfer per one data transfer does not exist, the first byte data (odd address) becomes the head byte data of the, and the irrelevant byte data is not included in regard to the transferred data of word unit including the compressed head data. On the other hand, if the remainder exists, the irrelevant byte data of as many bytes as the remainder from the head data is included in regard to the transferred data of word unit including the compressed head data.

Therefore, in regard to the word data including the compressed head data DMA-transferred from the main memory to the decode circuit having the possibility of including the irrelevant byte data, data of as many bytes as the remainder resulting from dividing the data starting address of compressed liquid ejection data DMA-transferred from the main memory to the decode circuit by the number of data bytes which the system bus can transfer per one data transfer is nullified, then hardware-developed by the decode circuit and then stored in the line buffer. Owing to this, since only the irrelevant byte data included in the word data including the compressed head data DMA-transferred from the main memory to the decode circuit is nullified, only the compressed liquid ejection data can developed by the decode circuit.

In this way, according to the data transferring apparatus for transferring liquid ejection data relating to the twenty-seventh aspect of the present invention, added to the twenty-sixth aspect described above, by DMA-transferring the compressed liquid ejection data from the main memory to the decode circuit per word unit, the data transfer can be achieved at further high speed, and in case the irrelevant byte data is included in the compressed liquid ejection data DMA-transferred from the main memory to the decode circuit per word unit, the action and effect that the irrelevant byte data can be exactly nullified by the invalid data mask processing means described above, and then only the compressed liquid ejection data can be securely hardware-developed from the head data can be obtained.

According to the twenty-eighth aspect of the present invention, in regard to the twenty-sixth aspect, the data transferring apparatus comprises an invalid data mask processing means for nullifying head data of one byte in case data starting address of compressed data stored in the main memory is an odd address, with respect to word data including head data of compressed data DMA-transferred from the main memory to the decode circuit.

In this way, if the irrelevant byte data is included in the transferred data including the head data of the compressed data DMA-transferred from the main memory to the decode circuit, this irrelevant byte data is nullified and then data is hardware-developed. Specifically, since the compressed liquid ejection data is DMA-transferred from the main memory via the system bus one word each, if the data starting address of the compressed liquid ejection data stored in the main memory is an odd address, the first byte (byte data of an even address) of the word data is the byte data irrelevant to the liquid ejection data, and the second byte of the word data (byte data of an odd address) is the head byte data of the liquid ejection data, in regard to the transferred data of one word (2 bytes) including the head data of the compressed data.

Here, if the data starting address of the compressed liquid ejection data stored in the main memory is an odd address, the first one byte of the word data including the head data of the compressed data DMA-transferred from the main memory to the decode circuit is nullified. Owing to this, only the compressed liquid ejection data can be developed by the decode circuit while only the irrelevant byte data included in the word data including the head data of the compressed data DMA-transferred from the main memory to the decode circuit is nullified.

Therefore, according to the data transferring apparatus for transferring liquid ejection data relating to the twenty-eighth aspect of the present invention, added to the twenty-sixth aspect described above, by DMA-transferring the compressed liquid ejection data from the main memory to the decode circuit one word each, the data transfer can be achieved at further high speed, and in case the irrelevant byte data is included in the compressed liquid ejection data DMA-transferred from the main memory to the decode circuit one word each, the action and effect that the irrelevant byte data can be exactly nullified by the invalid data mask processing means described above, and only the compressed liquid ejection data can be securely hardware-developed from the head data can be obtained.

According to the twenty-ninth aspect of the present invention, in regard to the twenty-eighth aspect, the decode unit comprises a data storage starting position shifting means for storing liquid ejection data developed by the decode circuit from a first byte of the line buffer in a state where a 0-th byte of the line buffer is vacant.

For example, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, when the developed bitmap data is stored in the bitmap area of the local memory and transferred to the recording head, there is a case that the data starting address of the bitmap data needs to be an odd address. Therefore, hitherto, after the compressed recording data is software-developed by a program, the developed bitmap data is transferred in order that the data starting address of the bitmap data can be an odd address by a program. However, if the bitmap data hardware-developed by the decode circuit per word unit is DMA-transferred to the local memory per word unit, the transfer is always performed as an even address comes first.

Accordingly, the data storage starting position shifting means is provided in the decode unit to store the liquid ejection data developed by the decode circuit from the first byte of the line buffer in a state where the 0-th byte of the line buffer is vacant, when storing the bitmap data developed by the decode circuit in the line buffer. That is, in regard to the decode unit, after the development process of the compressed liquid ejection data, when the developed liquid ejection data is stored in the line buffer, it is stored from the first byte of the line buffer in a state where the 0-th byte of the line buffer is vacant, and the developed liquid ejection data stored in the line buffer is DMA-transferred to the bitmap area in the local memory from the 0-th byte of the line buffer.

Since the developed liquid ejection data is stored from the first byte of the line buffer in a state where the 0-th byte of the line buffer is vacant, that is, from an odd byte-th in the line buffer, if DMA-transferred as it is to the bitmap area in the local memory per word unit from the 0-th byte of the line buffer, the vacant data which was stored in the 0-th byte of the line buffer is stored in the first even address area of the bitmap area. And, in the next odd address area, the head data of the developed liquid ejection data stored in the first byte of the line buffer is stored. Therefore, the data starting address of the bitmap data can be an odd address.

Owing to this, according to the data transferring apparatus for transferring liquid ejection data relating to the twenty-ninth aspect of the present invention, added to the twenty-eighth aspect described above, when the developed bitmap data is stored in the bitmap area of the local memory and transferred to the recording head, if it is necessary that the data starting address of the bitmap data be an odd address, by the data storage starting position shifting means for storing the liquid ejection data developed by the decode circuit from the first byte of the line buffer in a state where the 0-th byte of the line buffer is vacant when storing the bitmap data developed by the decode circuit in the line buffer, the action and effect that the data starting address of the bitmap data can be an odd address can be obtained.

According to the thirtieth aspect of the present invention, in regard to the twenty-ninth aspect, the decode unit comprises a data storage ending position shifting means for transferring developed liquid ejection data stored in the line buffer to liquid ejecting head each time developed data of the predetermined words from which one byte has been subtracted is stored in the line buffer.

As described above, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, there is a case that the bytes of the data block of the bitmap area need to be odd bytes, wherein the developed bitmap data is stored in the bitmap area of the local memory and transferred to the recording head. For example, the bytes of the data block of the bitmap area to be transferred to the recording head are generally set to be 16 bytes, however, there a case that the bytes need to be 15 bytes one byte less under a specific condition, and hitherto, sine the compressed liquid ejection data is software-developed by a program per byte unit, then stored in the bitmap area of the memory one byte each by a program, there is no problem though the bytes of the data block are odd bytes. However, if the bitmap data hardware-developed by the decode circuit per word unit is DMA-transferred to the local memory per word unit, the transfer is always performed per word unit, that is, 2 bytes each. For this reason, the bytes of the data block of the bitmap area set to be 16 bytes cannot be 15 bytes, that is, the last one byte of the data block set to be 16 bytes cannot be a vacant byte.

Accordingly, by the data storage ending position shifting means is provided in the decode unit to transfer the developed liquid ejection data stored in the line buffer to the liquid ejecting head each time developed data of the predetermined words from which one byte has been subtracted is stored in the line buffer, it is possible to configure the data block of odd bytes in the bitmap area of the local memory. That is, when the developed data of predetermined words from which one byte has been subtracted is stored in the line buffer, the data of the last one word has the second half with one vacant byte.

And, since the data stored in the line buffer is DMA-transferred to the bitmap area of the local memory per word unit, the last one byte in regard to the data block of predetermined words in the bitmap area can be vacant, that is, the data block of predetermined words in the bitmap area can be the data block of predetermined words from which one byte has been subtracted. Further, the rest data of one byte developed per word unit, for example, is temporarily stored in a reserve storage area provided in the line buffer, and then stored in the 0-th byte of the line buffer. Alternatively, plural line buffers are provided, and it may be stored in the 0-th byte of a different line buffer as it is.

Owing to this, according to the data transferring apparatus for transferring liquid ejection data relating to the thirtieth aspect of the present invention, added to the twenty-ninth aspect described above, when the developed bitmap data is stored in the bitmap area of the local memory and transferred to the recording head, if it is necessary that the data block of the bitmap area be the data block of odd bytes, by the data storage ending position shifting means for transferring the developed liquid ejection data stored in the line buffer to the liquid ejecting head each time the developed data of the predetermined words from which one byte has been subtracted is stored in the line buffer, the action and effect that it is possible to configure the data block of odd bytes in the bitmap area of the local memory can be obtained.

According to the thirty-first aspect of the present invention, in regard to the thirtieth aspect, the data transferring apparatus comprises two independent buses which are the system bus and a local bus, the main memory coupled to the system bus, capable of transferring data and the local memory coupled to the local bus, capable of transferring data, and the decode unit is coupled to the system bus and local bus in order to transfer data therebetween.

In this way, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Owing to this, according to the data transferring apparatus for transferring liquid ejection data relating to the thirty-first aspect of the present invention, added to the thirtieth aspect described above, since it is possible to realize the development process of compressed data at high speed and the data transfer to the liquid ejecting head at high speed by the two independent buses of the system bus and the local bus and the DMA transfer means capable of transferring data at high speed without a microprocessor and the decode unit comprising the decode circuit, the action and effect that it is possible to considerably increase the liquid ejection speed of the liquid ejecting apparatus compared with that of the prior art can be obtained, According to the thirty-second aspect of the present invention, in regard to the thirty-first aspect, an ASIC comprises registers of the main memory, the decode unit and the liquid ejecting head as a circuit block respectively, and registers of the decode unit and the liquid ejecting head are coupled through an dedicated bus in the ASIC, In this way, since the main memory, which stores the compressed data, is configured to be the same block as the decode unit in the ASIC, the high speed DMA transfer can be achieved so as to transfer data particularly with one clock. Therefore, the compressed liquid ejection data can be transferred to the decode unit at higher speed. In addition, since the registers of the liquid ejecting head are also included in the same ASIC as a circuit block, and coupled to the decode unit through an dedicated bus in the ASIC, the data transfer of developed liquid ejection data from the local memory to the liquid ejecting head can be performed at higher speed.

Owing to this, according to the data transferring apparatus for transferring liquid ejection data relating to the thirty-second aspect of the present invention, added to the thirty-first aspect described above, the compressed liquid ejection data can be transferred to the decode unit at higher speed, the data transfer of developed liquid ejection data from the local memory to the liquid ejecting head can be performed at higher speed, and thus the action and effect that it is possible to further increase the liquid ejection speed of the liquid ejecting apparatus can be obtained.

According to the thirty-third aspect of the present invention, in regard to the thirty-second aspect, the line buffer comprises two faces of buffer areas capable of storing developed data of predetermined words, liquid ejection data developed by the decode circuit is sequentially stored in a first face of the buffer areas while liquid ejection data developed by the decode circuit is sequentially stored in a second face of the buffer areas when developed data of predetermined words has been accumulated, and developed data is DMA-transferred to the local memory per predetermined words when developed data of predetermined words has been accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face, so that it is possible to perform development process of compressed recording data and data transfer process in parallel.

Owing to this, according to the data transferring apparatus for transferring liquid ejection data relating to the thirty-third aspect of the present invention, added to the thirty-second aspect described above, the development process of compressed recording data and the data transfer process can be perform in parallel, and thus the action and effect that it is possible to further increase the liquid ejection speed of the liquid ejecting apparatus can be obtained.

According to the thirty-fourth aspect of the present invention, in regard to the thirty-third aspect, data transfers with respect to the local bus from the decode circuit to the local memory and from the local memory to a register of the liquid electing head are performed in a burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the thirty-fourth aspect of the present invention, added to the thirty-third aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the thirty-fifth aspect of the present invention, in regard to the thirty-fourth aspect, the compressed liquid ejection data is run length compressed data, and the decode circuit can perform hardware development on run length compressed data.

According to the data transferring apparatus for transferring liquid ejection data relating to the thirty-fifth aspect of the present invention, by the decode circuit whereby the run length compressed data capable of line development can be hardware-developed, the action and effect in the thirty-fourth aspect described above can be achieved.

According to the thirty-sixth aspect of the present invention, in regard to the thirty-fifth aspect, the decode unit comprises a non-development processing means for storing uncompressed liquid ejection data DMA-transferred from the main memory in the line buffer without hardware development by the decode circuit.

According to the data transferring apparatus for transferring liquid ejection data relating to the thirty-sixth aspect of the present invention, added to the thirty-fifth aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the thirty-seventh aspect of the present invention, a liquid ejecting apparatus comprising a data transferring apparatus for transferring liquid ejection data comprises a decode circuit capable of performing hardware development on liquid ejection data, which is DMA-transferred per word unit from a main memory via a system bus, compressed to be capable of line development, a line buffer for storing liquid ejection data developed by the decode circuit per word unit, a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially and a data dividing means for storing data in bitmap areas which are different per predetermined words, when data developed in the line buffer is DMA-transferred to a bitmap area of the local memory per word unit.

According to the liquid ejecting apparatus relating to the thirty-seventh aspect of the present invention, the action and effect in the twenty-fifth aspect described above can be achieved in regard to the liquid ejecting apparatus.

According to the thirty-eighth aspect of the present invention, a data transferring apparatus for transferring liquid ejection data, comprises a decode unit comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit and a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially, wherein the decode unit comprises a data storage starting position shifting means for storing liquid ejection data developed by the decode circuit from a first byte of the line buffer in a state where a 0-th byte of the line buffer is vacant.

First, since the data transfer of the compressed liquid ejection data from the main memory used to be performed one byte each in the conventional way is performed per word (two bytes) unit, the data transfer speed can be increased over two times. For example, if the system bus is a 16 bits bus, the compressed liquid ejection data stored in the main memory can be retrieved one word (two bytes) a time, and if the system bus is a 32 bits bus, the compressed liquid ejection data stored in the main memory can be retrieved two words (four bytes) a time.

In addition, the compressed liquid ejection data software-developed by a conventional program is hardware-developed by the decode circuit. That is, by independently performing only the development of the compressed data by the decode circuit which is exclusively used for developing compressed data rather than developing the compressed data by a program of single thread which performs various data processes in consecutive order besides the development process of the compressed data, it is possible to perform the development process of the compressed recording data at high speed. Further, the high speed data transfer can be achieved by the DMA transfer.

By the way, for example, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, when the developed bitmap data is stored in the bitmap area of the local memory and transferred to the recording head, there is a case that the data starting address of the bitmap data needs to be an odd address. Therefore, hitherto, after the compressed recording data is software-developed by a program, the developed bitmap data is transferred in order that the data starting address of the bitmap data can be an odd address by a program. However, if the bitmap data hardware-developed by the decode circuit per word unit is DMA-transferred to the local memory per word unit, the transfer is always performed as an even address comes first.

Accordingly, the data storage starting position shifting means is provided in the decode unit to store the liquid ejection data developed by the decode circuit from the first byte of the line buffer in a state where the 0-th byte of the line buffer is vacant, when storing the bitmap data developed by the decode circuit in the line buffer. That is, in regard to the decode unit, after the development process of the compressed liquid ejection data, when the developed liquid ejection data is stored in the line buffer, it is stored from the first byte of the line buffer in a state where the 0-th byte of the line buffer is vacant, and the developed liquid ejection data stored in the line buffer is DMA-transferred to the bitmap area in the local memory from the 0-th byte of the line buffer.

Since the developed liquid ejection data is stored from the first byte of the line buffer in a state where the 0-th byte of the line buffer is vacant, that is, from an odd byte-th in the line buffer, if DMA-transferred as it is to the bitmap area in the local memory per word unit from the 0-th byte of the line buffer, the vacant data which was stored in the 0-th byte of the line buffer is stored in the first even address area of the bitmap area. And, in the next odd address area, the head data of the developed liquid ejection data stored in the first byte of the line buffer is stored. Therefore, the data starting address of the bitmap data can be an odd address.

Owing to this, according to the data transferring apparatus for transferring liquid ejection data relating to the thirty-eighth aspect of the present invention, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

And, when the developed bitmap data is stored in the bitmap area of the local memory and transferred to the recording head, if it is necessary that the data starting address of the bitmap data be an odd address, by the data storage starting position shifting means for storing the liquid ejection data developed by the decode circuit from the first byte of the line buffer in a state where the 0-th byte of the line buffer is vacant when storing the bitmap data developed by the decode circuit in the line buffer, the action and effect that the data starting address of the bitmap data can be an odd address can be obtained.

According to the thirty-ninth aspect of the present invention, a data transferring apparatus for transferring liquid ejection data, comprises a decode unit comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit and a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially, wherein the decode unit comprises a data storage ending position shifting means for transferring developed liquid ejection data stored in the line buffer to liquid ejecting head each time developed data of the predetermined words from which one byte has been subtracted is stored in the line buffer.

As described above, the inkjet type recording apparatus as a liquid ejecting apparatus performs recording by ejecting ink from the plural nozzle arrays provided on the head face of the recording head as a liquid ejecting head onto the recording papers to form ink dots on the surface of the recording papers, based on the bitmap data to which the compressed recording data has been developed. However, there is a case that the bytes of the data block of the bitmap area need to be odd bytes, wherein the developed bitmap data is stored in the bitmap area of the local memory and transferred to the recording head. For example, the bytes of the data block of the bitmap area to be transferred to the recording head are generally set to be 16 bytes, however, there a case that the bytes need to be 15 bytes one byte less under a specific condition, and hitherto, sine the compressed liquid ejection data is software-developed by a program per byte unit, then stored in the bitmap area of the memory one byte each by a program, there is no problem though the bytes of the data block are odd bytes. However, if the bitmap data hardware-developed by the decode circuit per word unit is DMA-transferred to the local memory per word unit, the transfer is always performed per word unit, that is, 2 bytes each. For this reason, the bytes of the data block of the bitmap area set to be 16 bytes cannot be 15 bytes, that is, the last one byte of the data block set to be 16 bytes cannot be a vacant byte.

Accordingly, by the data storage ending position shifting means is provided in the decode unit to transfer the developed liquid ejection data stored in the line buffer to the liquid ejecting head each time developed data of the predetermined words from which one byte has been subtracted is stored in the line buffer, it is possible to configure the data block of odd bytes in the bitmap area of the local memory. That is, when the developed data of predetermined words from which one byte has been subtracted is stored in the line buffer, the data of the last one word has the second half with one vacant byte.

And, since the data stored in the line buffer is DMA-transferred to the bitmap area of the local memory per word unit, the last one byte in regard to the data block of predetermined words in the bitmap area can be vacant, that is, the data block of predetermined words in the bitmap area can be the data block of predetermined words from which one byte has been subtracted. Further, the rest data of one byte developed per word unit, for example, is temporarily stored in a reserve storage area provided in the line buffer, and then stored in the 0-th byte of the line buffer, Alternatively, plural line buffers are provided, and it may be stored in the 0-th byte of a different line buffer as it is.

Owing to this, according to the data transferring apparatus for transferring liquid ejection data relating to the thirty-ninth aspect of the present invention, like the thirty-eighth aspect of the present invention described above, since it is possible to realize the development process of compressed data at high speed and the data transfer to the liquid ejecting head at high speed by the DMA transfer capable of transferring data at high speed without a microprocessor and the decode unit comprising the decode circuit, the action and effect that it is possible to considerably increase the liquid ejection speed of the liquid ejecting apparatus compared with that of the prior art can be obtained.

According to the fortieth aspect of the present invention, in regard to the thirty-eighth aspect, the decode unit comprises a data storage ending position shifting means for transferring developed liquid ejection data stored in the line buffer to liquid ejecting head each time developed data of the predetermined words from which one byte has been subtracted is stored in the line buffer.

According to the data transferring apparatus for transferring liquid ejection data relating to the fortieth aspect of the present invention, added to the thirty-eighth aspect described above, when the developed bitmap data is stored in the bitmap area of the local memory and transferred to the recording head, if it is necessary that the data block of the bitmap area be the data block of odd bytes, by the data storage ending position shifting means for transferring the developed liquid ejection data stored in the line buffer to the liquid ejecting head each time the developed data of the predetermined words from which one byte has been subtracted is stored in the line buffer, the action and effect that it is possible to configure the data block of odd bytes in the bitmap area of the local memory can be obtained.

According to the forty-first aspect of the present invention, in regard to the fortieth aspect, the data transferring apparatus comprises an invalid data mask processing means for nullifying data from head data, as many bytes as the remainder resulting from dividing a value of a data starting address of compressed liquid ejection data by the number of data bytes which the system bus can transfer per one data transfer, with respect to word data including head data of compressed data DMA-transferred from the main memory to the decode circuit.

In the DMA transfer per word unit by a 16 bit bus, an even address cannot help always coming first. Then, for example, if one word (two bytes) each is transferred per one data transfer operation as the system bus is a 16 bits, the data starting address of the compressed liquid ejection data stored in the main memory is an odd address, and thus byte data which is irrelevant to the liquid ejection data exists in the transferred data of one word (two bytes) including the head data of the compressed data. That is, the first byte of the word data (the byte data of the even address) is the byte data irrelevant to the liquid ejection data, and the second byte of the word data (the byte data of the odd address) is the head byte data of the liquid ejection data. For this reason, if the compressed liquid ejection data of which the starting address is an odd address is DMA-transferred from the main memory to the decode circuit per word unit and hardware-developed, the liquid ejection data in a state where the irrelevant data is at the head of the original liquid ejection data is transferred.

Accordingly, if the irrelevant byte data is included in the transferred data including the head data of the compressed data DMA-transferred from the main memory to the decode circuit, this irrelevant byte data is nullified and then data is hardware-developed. Specifically, the number of bytes the system bus which is the data transfer route from the main memory to the decode circuit can transfer per one data transfer is first obtained. For example, in case of a 16 bits bus, 16 bits/1 byte (8 bits)=2 bytes, in case of a 32 bits bus, 4 bytes and in case of a 64 bits bus then 8 bytes.

And, the remainder resulting from dividing the data starting address of the compressed liquid ejection data by the number of data bytes which the system bus can transfer per one data transfer is obtained. That is, if the remainder resulting from dividing the data starting address by the number of data bytes which the system bus can transfer per one data transfer does not exist, the first byte data (odd address) becomes the head byte data of the, and the irrelevant byte data is not included in regard to the transferred data of word unit including the compressed head data. On the other hand, if the remainder exists, the irrelevant byte data of as many bytes as the remainder from the head data is included in regard to the transferred data of word unit including the compressed head data.

Therefore, in regard to the word data including the compressed head data DMA-transferred from the main memory to the decode circuit having the possibility of including the irrelevant byte data, data of as many bytes as the remainder resulting from dividing the data starting address of compressed liquid ejection data DMA-transferred from the main memory to the decode circuit by the number of data bytes which the system bus can transfer per one data transfer is nullified, then hardware-developed by the decode circuit and then stored in the line buffer owing to this, since only the irrelevant byte data included in the word data including the compressed head data DMA-transferred from the main, memory to the decode circuit is nullified, only the compressed liquid ejection data can developed by the decode circuit.

Owing to this, according to the data transferring apparatus for transferring liquid ejection data relating to the forty-first aspect of the present invention, added to the fortieth aspect described above, by DMA-transferring the compressed liquid ejection data from the main memory to the decode circuit per word unit, the data transfer can be achieved at further high speed, and in case the irrelevant byte data is included in the compressed liquid ejection data DMA-transferred from the main memory to the decode circuit per word unit, the action and effect that the irrelevant byte data can be exactly nullified by the invalid data mask processing means described above, and then only the compressed liquid ejection data can be securely hardware-developed from the head data can be obtained.

According to the forty-second aspect of the present invention, in regard to the fortieth aspect, the data transferring apparatus comprises an invalid data mask processing means for nullifying head data of one byte in case data starting address of compressed data stored in the main memory is an odd address, with respect to word data including head data of compressed data DMA-transferred from the main memory to the decode circuit.

In this way, if the irrelevant byte data is included in the transferred data including the head data of the compressed data DMA-transferred from the main memory to the decode circuit, this irrelevant byte data is nullified and then data is hardware-developed. Specifically, since the compressed liquid ejection data is DMA-transferred from the main memory via the system bus one word each, if the data starting address of the compressed liquid ejection data stored in the main memory is an odd address, the first byte (byte data of an even address) of the word data is the byte data irrelevant to the liquid ejection data, and the second byte of the word data (byte data of an odd address) is the head byte data of the liquid ejection data, in regard to the transferred data of one word (2 bytes) including the head data of the compressed data.

Here, if the data starting address of the compressed liquid ejection data stored in the main memory is an odd address, the first one byte of the word data including the head data of the compressed data DMA-transferred from the main memory to the decode circuit is nullified. Owing to this, only the compressed liquid ejection data can be developed by the decode circuit while only the irrelevant byte data included in the word data including the head data of the compressed data DMA-transferred from the main memory to the decode circuit is nullified.

Therefore, according to the data transferring apparatus for transferring liquid ejection data relating to the forty-second aspect of the present invention, added to the fortieth aspect described above, by DMA-transferring the compressed liquid ejection data from the main memory to the decode circuit one word each, the data transfer can be achieved at further high speed, and in case the irrelevant byte data is included in the compressed liquid ejection data DMA-transferred from the main memory to the decode circuit one word each, the action and effect that the irrelevant byte data can be exactly nullified by the invalid data mask processing means described above, and only the compressed liquid ejection data can be securely hardware-developed from the head data can be obtained.

According to the forty-third aspect of the present invention, in regard to the forty-second aspect, the data transferring apparatus comprises two independent buses which are the system bus and a local bus, the main memory coupled to the system bus, capable of transferring data and the local memory coupled to the local bus, capable of transferring data, and the decode unit is coupled to the system bus and local bus in order to transfer data therebetween.

In this way, by the configuration to have two independent buses of the system bus and the local bus and the local memory which is coupled to the local bus, it is possible to secure the data transfer route of the liquid ejection data from an independent memory to the liquid ejecting head while it is separated from an access route from a microprocessor to a memory. Therefore, it is possible to perform the data transfer from the local memory to a register of the liquid ejecting head through the local bus not synchronized with the system bus. Owing to this, it is prevented that the data transfer from the memory to the liquid ejecting head gets interrupted by the access from the microprocessor to the memory so that the recording performance speed gets low because the data transfer delay of liquid ejection data occurs.

Owing to this, according to the data transferring apparatus for transferring liquid ejection data relating to the forth-third aspect of the present invention, added to the forty-second aspect described above, since it is possible to realize the development process of compressed data at high speed and the data transfer to the liquid ejecting head at high speed by the two independent buses of the system bus and the local bus and the DMA transfer means capable of transferring data at high speed without a microprocessor and the decode unit comprising the decode circuit, the action and effect that it is possible to considerably increase the liquid ejection speed of the liquid ejecting apparatus compared with that of the prior art can be obtained.

According to the forty-fourth aspect of the present invention, in regard to the forty-third aspect, an ASIC comprises registers of the main memory, the decode unit and the liquid ejecting head as a circuit block respectively, and registers of the decode unit and the liquid ejecting head are coupled through an dedicated bus in the ASIC.

In this way, since the main memory, which stores the compressed data, is configured to be the same block as the decode unit in the ASIC, the high speed DMA transfer can be achieved so as to transfer data particularly with one clock. Therefore, the compressed liquid ejection data can be transferred to the decode unit at higher speed. In addition, since the registers of the liquid ejecting head are also included in the same ASIC as a circuit block, and coupled to the decode unit through an dedicated bus in the ASIC, the data transfer of developed liquid ejection data from the local memory to the liquid ejecting head can be performed at higher speed.

Owing to this, according to the data transferring apparatus for transferring liquid ejection data relating to the forty-fourth aspect of the present invention, added to the forty-third aspect described above, the compressed liquid ejection data can be transferred to the decode unit at higher speed, the data transfer of developed liquid ejection data from the local memory to the liquid ejecting head can be performed at higher speed, and thus the action and effect that it is possible to further increase the liquid ejection speed of the liquid ejecting apparatus can be obtained.

According to the forty-fifth aspect of the present invention, in regard to the forty-fourth aspect, the line buffer comprises two faces of buffer areas capable of storing developed data of predetermined words, liquid ejection data developed by the decode circuit is sequentially stored in a first face of the buffer areas while liquid ejection data developed by the decode circuit is sequentially stored in a second face of the buffer areas when developed data of predetermined words has been accumulated, and developed data is DMA-transferred to the local memory per predetermined words when developed data of predetermined words has been accumulated.

In this way, the line buffer has two faces of buffer areas which are capable of storing the developed data of predetermined bytes, and stores the data which has been developed by the decode circuit in a first face of the buffer areas, and when predetermined bytes have been accumulated, the developed data of the first face is transferred per word unit by the DMA transferring means, while the data developed by the decoded circuit can be stored in a second face, so that it is possible to perform development process of compressed recording data and data transfer process in parallel.

Owing to this, according to the data transferring apparatus for transferring liquid ejection data relating to the forty-fifth aspect of the present invention, added to the forty-fourth aspect described above, the development process of compressed recording data and the data transfer process can be perform in parallel, and thus the action and effect that it is possible to further increase the liquid ejection speed of the liquid ejecting apparatus can be obtained.

According to the forty-sixth aspect of the present invention, in regard to the forty-fifth aspect, data transfers with respect to the local bus from the decode circuit to the local memory and from the local memory to a register of the liquid ejecting head are performed in a burst transfer.

The burst transfer is such data transfer method which is a well-known method for speeding up the data transfer as when the continuous data is transferred, the data is transferred while a bus is occupied until all data of a predetermined data block is completely transferred by omitting a part of a sequence such as an address designation so as to increase the data transfer speed. And, since the data transfer to the liquid ejecting head performed via the system bus in the conventional method is per formed via the local bus separated from the system bus, the data transfers from the decode unit to the local memory via the local bus and from the local memory to the register of the liquid ejecting head can be performed in the burst transfer.

That is, in regard to the conventional data transferring apparatus performing the data transfer from the main memory to the liquid ejecting head via the system bus, if the transfer is performed while the bus is occupied until all data of predetermined data blocks is completely transferred to the liquid ejecting head, such problem occurs as the data transfer requested by a microprocessor cannot performed, however, in regard to the local bus independent of the system bus, this problem does not occur, and thus the data transfer to the liquid ejecting head via the local bus can be performed in the burst transfer.

Owing to this, according to the data transferring apparatus for transferring liquid ejection data relating to the forty-sixth aspect of the present invention, added to the forty-fifth aspect described above, the data transfer to the liquid ejecting head via the local bus can be performed in the burst transfer, and thus the action and effect that it is possible to further increase the liquid ejection speed of the liquid ejecting apparatus can be obtained.

In addition, since the system bus and the local are independent each other, and the data transfer to the register of the liquid ejecting head not synchronized with the system bus can be performed by the decode circuit of the decode unit and the line buffer, the action and effect that it is possible to maximize the effect of increasing the liquid ejection speed of the liquid ejecting apparatus can be obtained.

According to the forty-seventh aspect of the present invention, in regard to the forty-sixth aspect, the compressed liquid ejection data is run length compressed data, and the decode circuit can perform hardware development on run length compressed data.

According to the data transferring apparatus for transferring liquid ejection data relating to the forty-seventh aspect of the present invention, by the decode circuit whereby the run length compressed data capable of line development can be hardware-developed, the action and effect in the forty-sixth aspect described above can be achieved.

According to the forty-eighth aspect of the present invention, in regard to the forty-seventh aspect, the decode unit comprises a non-development processing means for storing uncompressed liquid ejection data DMA-transferred from the main memory in the line buffer without hardware development by the decode circuit.

According to the data transferring apparatus for transferring liquid ejection data relating to the forty-eighth aspect of the present invention, added to the forty-seventh aspect described above, if the liquid ejection data stored in the main memory is uncompressed data, a means stores it the line buffer as it is without hardware development by the decode circuit, and thus the action and effect that it is possible to further increase the liquid ejection speed of the liquid ejecting apparatus in regard to the uncompressed liquid ejection data can be obtained.

According to the forty-ninth aspect of the present invention, a liquid ejecting apparatus comprises a data transferring apparatus for transferring liquid ejection data comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit, a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially and a data storage starting position shifting means for storing liquid ejection data developed by the decode circuit from a first byte of the line buffer in a state where a 0-th byte of the line buffer is vacant, According to the liquid ejecting apparatus relating to the forty-ninth aspect of the present invention, the action and effect in the thirty-eighth aspect described above can be achieved in regard to the liquid ejecting apparatus.

According to the fiftieth aspect of the present invention, a liquid ejecting apparatus comprises a data transferring apparatus for transferring liquid ejection data comprising a decode circuit capable of performing hardware development on liquid ejection data, which is DMA-transferred per word unit from a main memory via a system bus, compressed to be capable of line development, a line buffer for storing liquid ejection data developed by the decode circuit per word unit, a DMA-transferring means for DMA-transferring liquid ejection data compressed to be capable of line development from the main memory to the decode circuit, DMA-transferring liquid ejection data developed in the line buffer to the local memory per word unit and DMA-transferring developed liquid ejection data stored in the local memory to a register of an liquid ejecting head sequentially and a data storage ending position shifting means for transferring developed liquid ejection data stored in the line buffer to liquid ejecting head each time developed data of the predetermined words from which one byte has been subtracted is stored in the line buffer.

According to the liquid ejecting apparatus relating to the fiftieth aspect of the present invention, the action and effect in the thirty-ninth aspect described above can be achieved in regard to the liquid ejecting apparatus.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 8 is a diagram showing such flow as compressed recording data is developed.

FIGS. 9A to 9D are diagrams showing the recording data after development.

FIGS. 10A to 10D are diagrams showing the recording data after development.

FIG. 12 is a diagram showing such flow as compressed recording data is developed.

FIG. 13 is a diagram showing such flow as compressed recording data is developed.

FIG. 14 is a diagram showing such flow as compressed recording data is developed.

FIGS. 15A to 15D are diagrams showing the recording data after development.

FIGS. 16A to 16D are diagrams showing the recording data after development.

FIG. 17 is a diagram showing such flow as compressed recording data is developed.

FIG. 18 is a diagram showing such flow as compressed recording data is developed.

FIG. 20 is a diagram showing such flow as compressed recording data is developed.

FIGS. 21A to 21D are diagrams showing the recording data after development.

FIG. 22 is a diagram showing such flow as compressed recording data is developed.

FIG. 23 is a diagram showing such flow as compressed recording data is developed.

FIGS. 24A to 24D are diagrams showing the recording data after development.

FIG. 26 is a diagram showing such flow as compressed recording data is developed.

FIG. 28 is a diagram showing such flow as compressed recording data is developed.

FIGS. 29A to 29D are diagrams showing the recording data after development.

FIGS. 30A to 30D are diagrams showing the recording data after development.

FIGS. 31A to 31D are diagrams showing the recording data after development.

FIGS. 32A to 32D are diagrams showing the recording data after development.

FIGS. 33A to 33D are diagrams showing the recording data after development.

FIGS. 34A to 34D are diagrams showing the recording data after development.

FIG. 35 is a diagram showing the state in which uncompressed data is transferred.

DETAILED DESCRIPTION OF THE INVENTION

Hereinafter, the preferred embodiments of the present invention will now be described based on drawings.

Figure 1:
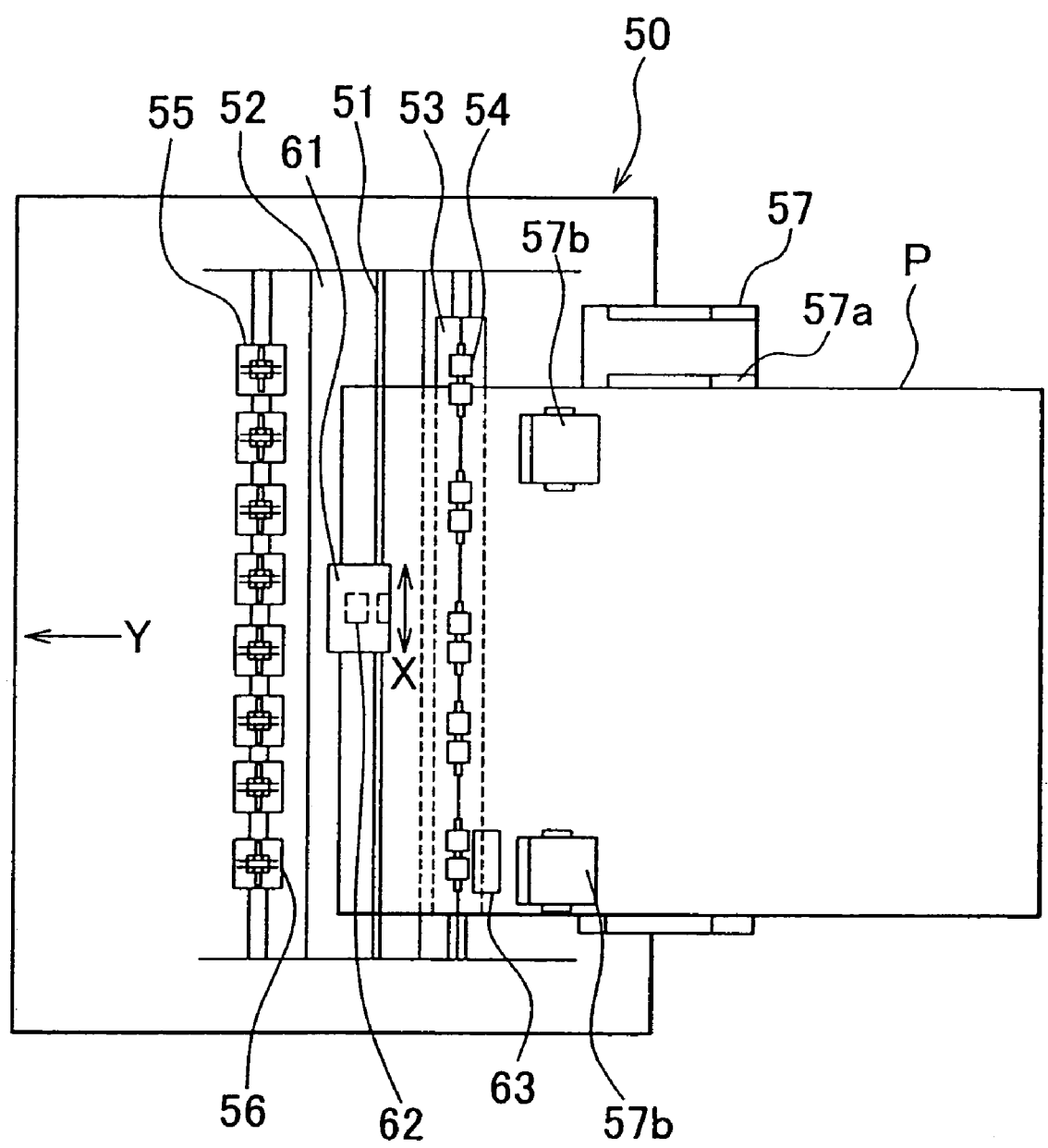
FIG. 1 is a plan view of an inkjet type recording apparatus relating to the present invention.
Figure 2:
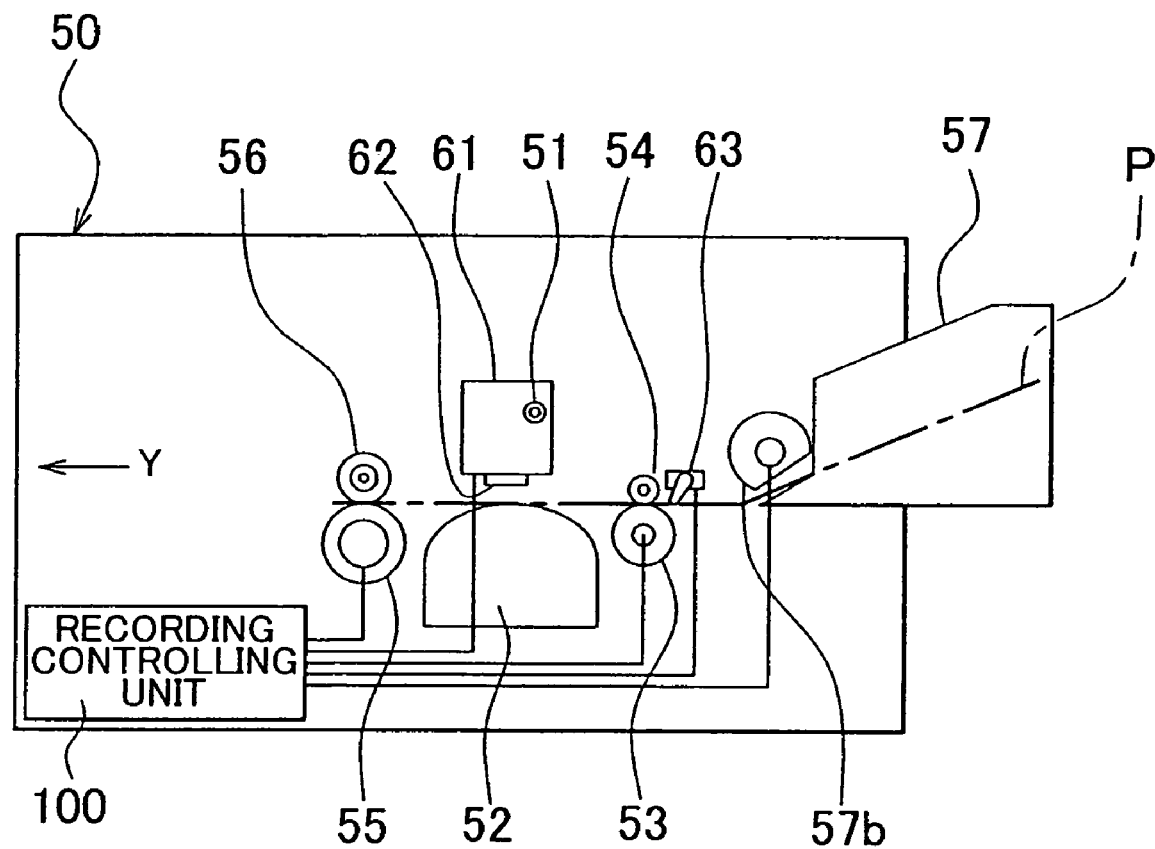
FIG. 2 is a side view of an inkjet type recording apparatus relating to the present invention.

To begin with, a first embodiment of the inkjet type recording apparatus will be described as "liquid ejecting apparatus" relating to the present invention. FIG. 1 is a schematic plan view of an inkjet type recording apparatus relating to the present invention, and FIG. 2 is a side view of the apparatus shown in FIG. 1.

In the inkjet type recording apparatus 50, a carriage 61 is provided to move along a main scanning direction x as a recording means which performs recording on recording papers P, rotatably supported by carriage guide shaft 51. On the carriage 61, a recording head 62 is mounted as a "liquid ejecting head" which performs recording by ejecting ink onto the recording papers P. Opposite to the recording head 62, a platen 52 is provided to control a gap between the head surface of the recording head 62 and the recording papers P. And, recording on the recording papers P is performed by repeating an operation of carrying the recording papers P between the carriage 61 and the platen 52 in a sub scanning direction Y a predetermined amount each and an operation of ejecting ink onto the recording papers P from the recording head 62 while the recording head 62 moves back and forth once in the main scanning direction X.

A paper feeding tray 57 is configured to be capable of feeding the recording papers P such as normal papers or foot papers, and an ASF (Auto Sheet Feeder) is provided in it as a paper feeding means to automatically feed the recording papers P. The ASF is an automatic paper feeding mechanism which has two paper feeding rollers 57b provided in the paper feeding tray 57 and a separating pad not shown in drawings. One of these two paper feeding rollers 57b is arranged at the one side of the paper feeding tray 57 while the other one of the paper feeding rollers 57b is installed at a recording paper guide 57a, and the recording paper guide 57a is provided at the paper feeding tray 57 to be capable of sliding in the longitudinal direction corresponding to the width of the recording papers P. And, by the rotation drive force of the paper feeding roller 57b and the frictional resistance of the separating pad, the plural recording papers P stacked in the paper feeding tray 57 are automatically and accurately fed not all but a piece each during feeding.

As a recording paper carrying means for carrying the recording papers P in the sub scanning direction Y, a driving transfer roller 53 and driven transfer rollers 54 are provided. The driving transfer roller 53 is rotatably controlled by the rotation drive force such as a stepping motor, and by the rotation of the driving transfer roller 53 the recording papers P are carried in the sub scanning direction Y. The driven transfer rollers 54 are provided as plural pieces, and each of them is urged by the driving transfer roller 53 to rotate in contact with the recording papers P as following the carriage of the recording papers P when the recording papers P are carried by the rotation of the driving transfer roller 53. On the surface of the driving transfer roller 53, a film which has high frictional resistance is provided. By the driven transfer rollers 54, the recording papers P pressed onto the surface of the driving transfer roller 53 are firmly in contact with the surface of the driving transfer roller 53 so that they are carried in the sub scanning direction Y by the rotation of the driving transfer roller 53.

And, a paper detector 63 is provided between the paper feeding roller 57b and the driving transfer roller 53 in the well-known art. The paper detector 63 has a lever to which a self-resetting characteristic into an upright position is granted pivotally supported to be rotatable only in the recording paper carriage direction as projecting toward the carriage route of the recording papers P, and is configured as the end of the lever is pushed toward the recording papers P and thus the lever is rotated so that the recording papers P are detected. The paper detector 63 detects the starting end position and the terminal end position of the recording papers P fed by the paper feeding roller 57b, and determines a recording area corresponding to the detected positions to perform recording.

Meanwhile, a driving paper discharge roller 55 and driven paper discharge rollers 56 are provided as a means for discharging the recording papers P which have been recorded. The driving paper discharge roller 55 is rotatably controlled by the rotation drive force such as a stepping motor, and by the rotation of the driving paper discharge roller 55 the recording papers P are carried in the sub scanning direction Y. The driven paper discharge rollers 56 have plural teeth on their circumference, and become a toothed roller in which the end of each tooth is sharp in an acute angle to be in contact with the recording surface of a recording paper P at point. Each of the plural driven paper discharge rollers 56 is urged by the driving paper discharge roller 55 to rotate in contact with the recording papers P as following the discharge of the recording papers P when the recording papers P are carried by the rotation of the driving paper discharge roller 55.

And, the rotation driving motor not shown in drawings which rotatably drives the paper feeding roller 57b or the driving transfer roller 53 and the driving paper discharge roller 55 and the carriage driving motor not shown in drawings which drives the carriage 61 in the main scanning direction are controlled by the recording controlling unit 100. In addition, the recording head is also controlled by the recording controlling unit 100 to eject ink onto the surface of the recording papers P.

Figure 3:
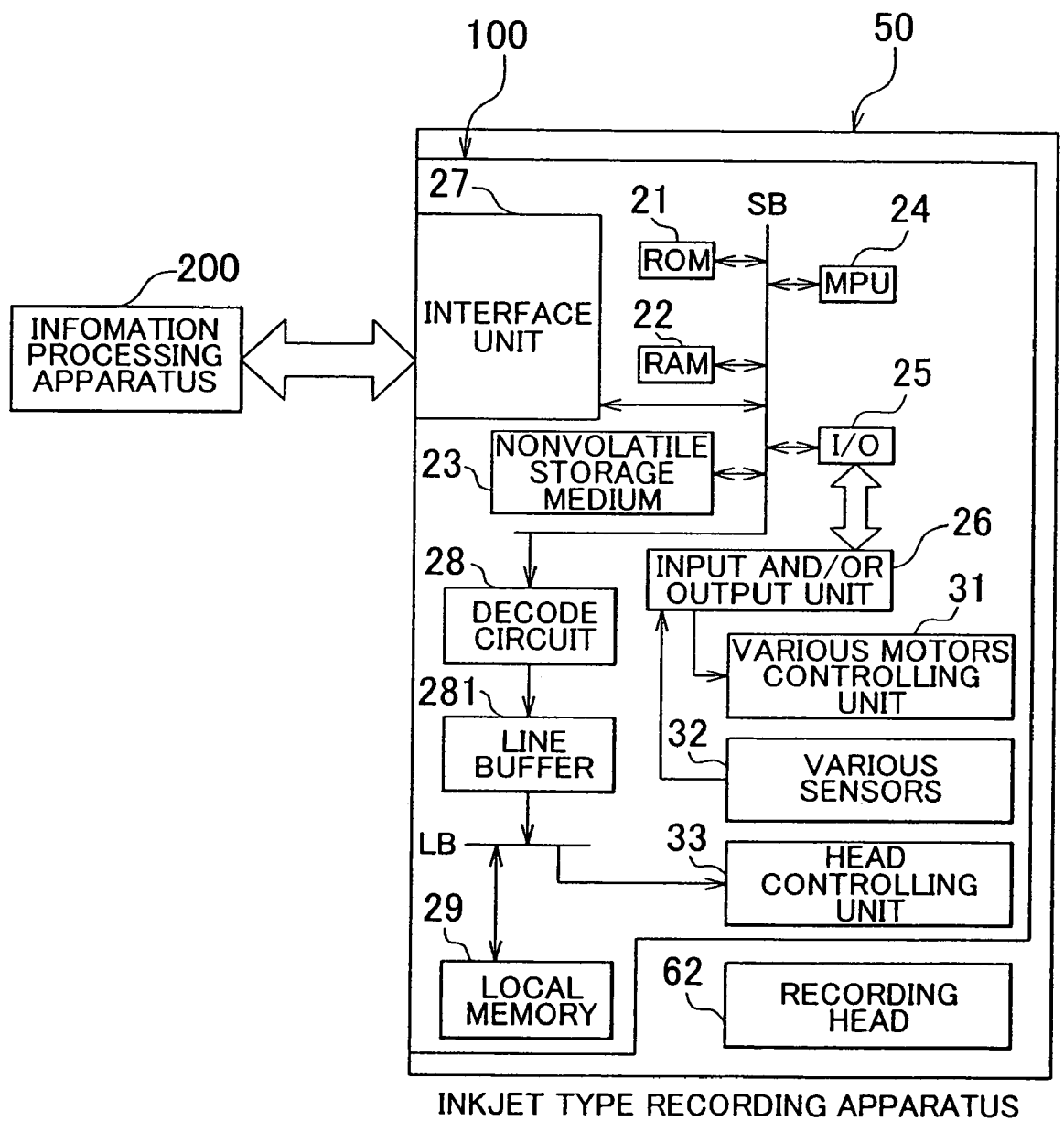
FIG. 3 is a flowchart of the inkjet type recording apparatus relating to the present invention.

FIG. 3 is a schematic flowchart of the inkjet type recording apparatus 50 relating to the present invention.

The inkjet type recording apparatus 50 has a recording controlling unit 100 for controlling carious recording processes. The recording controlling unit 100 has two independent buses, namely, a system bus SB and a local bus LB. To the system bus SB a MPU (microprocessor) 24, a ROM 21, a RAM 22, a nonvolatile storage medium 23, I/O 25 and a decode circuit 28 are coupled so as to be capable of transferring data. In the MPU 24 various calculation processes are performed. In the ROM 21, software/program and data needed for calculation processes of the MPU 24 are stored beforehand. The RAM 22 is used as a temporarily storing area for the software/program or a working area for the MPU 24. And, in the nonvolatile storage medium 23 such as a flash memory some data resulting from the calculation processes of the MPU 24 is stored, and it is designed to hold the data even if the power of the inkjet type recording apparatus 50 is turned off.

Further, the recording controlling unit 100 is configured to be coupled to an information processing apparatus 200 such as a personal computer via an interface unit 27 which has an interface function with external apparatuses, and to be capable of processing input and output of various kinds of information or data via the system bus SB with the information processing apparatus 200. And, I/O 25 performs output control to a various motors controlling unit 31 via an input and/or output unit 26 based on the calculation process result of the MPU 24, and allows input information to be inputted from various sensors 32. The various motors controlling unit 31 is a drive control circuit which controls various motors of the inkjet type recording apparatus 50, and is controlled by the recording controlling unit 100. And, the various sensors 32 detect various kinds of condition information of the inkjet type recording apparatus 50 and output them to the I/O 25 via the input and/or output unit 26.

During performing recording, the information processing apparatus 200 plays a host part to output recording data (liquid ejection data) compressed by the information processing apparatus 200, and the inkjet type recording apparatus 50 receives the compressed recording data from the interface unit 27 via the system bus SB. The decode circuit 28 develops the compressed recording data and then stores the developed recording data in a local memory 29 via the local bus LB. The developed recording data stored in the local memory 29 is transferred again from a register in a head controlling unit 33 to the recording head 62 via the local bus LB. The head controlling unit 33 controls the recording head 62 to eject ink of various colors onto he recording papers P from the plural nozzle arrays provided on the head side of the recording head 62.

In this way, by two independent buses, namely, the system bus SB and the local bus LB and the decode circuit 28 developing the compressed data, it is possible to realize the development process of the compressed data at high speed and the data transfer to the recording head 62 at high speed so that it is possible to increase the liquid ejection speed of the inkjet type recording apparatus 50 considerably compared with that of the prior art. In the end, by not developing the compressed data by a program of single thread which performs various data processes in consecutive order besides the development process of the compressed data in regard to the MPU 24 in the conventional way but independently performing only the development of the compressed data by the decode circuit 28 which is exclusively used for developing compressed data, it is possible to perform the development process of the compressed recording data at high speed.

In addition, by the configuration to have two independent buses of the system bus SB and the local bus LB and the local memory 29 which is coupled to the local bus LB, it is possible to secure the data transfer route of recording data (local bus LB) to the recording head 62 which is separated from the system bus SB which is coupled to the MPU 24. Therefore, it is possible to perform the data transfer from the local memory 29 to the register of the recording head 62 through the local bus LB not synchronized with the system bus SB. Owing to this, it is prevented that the data transfer to the recording head 62 gets interrupted by the access from the MPU 24 to the 22 so that the recording performance speed gets low because the data transfer delay of recording data occurs.

Further, in the present embodiment, a line buffer 281 is provided to store data after development per word unit between the decode circuit 28 and the local bus LB. The recording data developed in the decode circuit 28 is temporarily stored once in line buffer 281. The developed recording data stored in the line buffer 281 is transferred to the local memory 29 via the local bus LB two words each. In this way, the line buffer 281 may provided to store data after development per word unit between the decode circuit 28 and the local bus LB. By providing the line buffer 281 to store data after development per word unit, developing the compressed data, which used to be developed by the conventional program per one byte, per word unit (2 bytes), storing the data in the line buffer 281 and transferring the data to the local memory 29 per word unit, the amount of compressed data which is developed and transferred at a time gets twice that of the conventional way, and thus it is possible to perform the development process of compressed data at higher speed, which is desirable.

Figure 4:
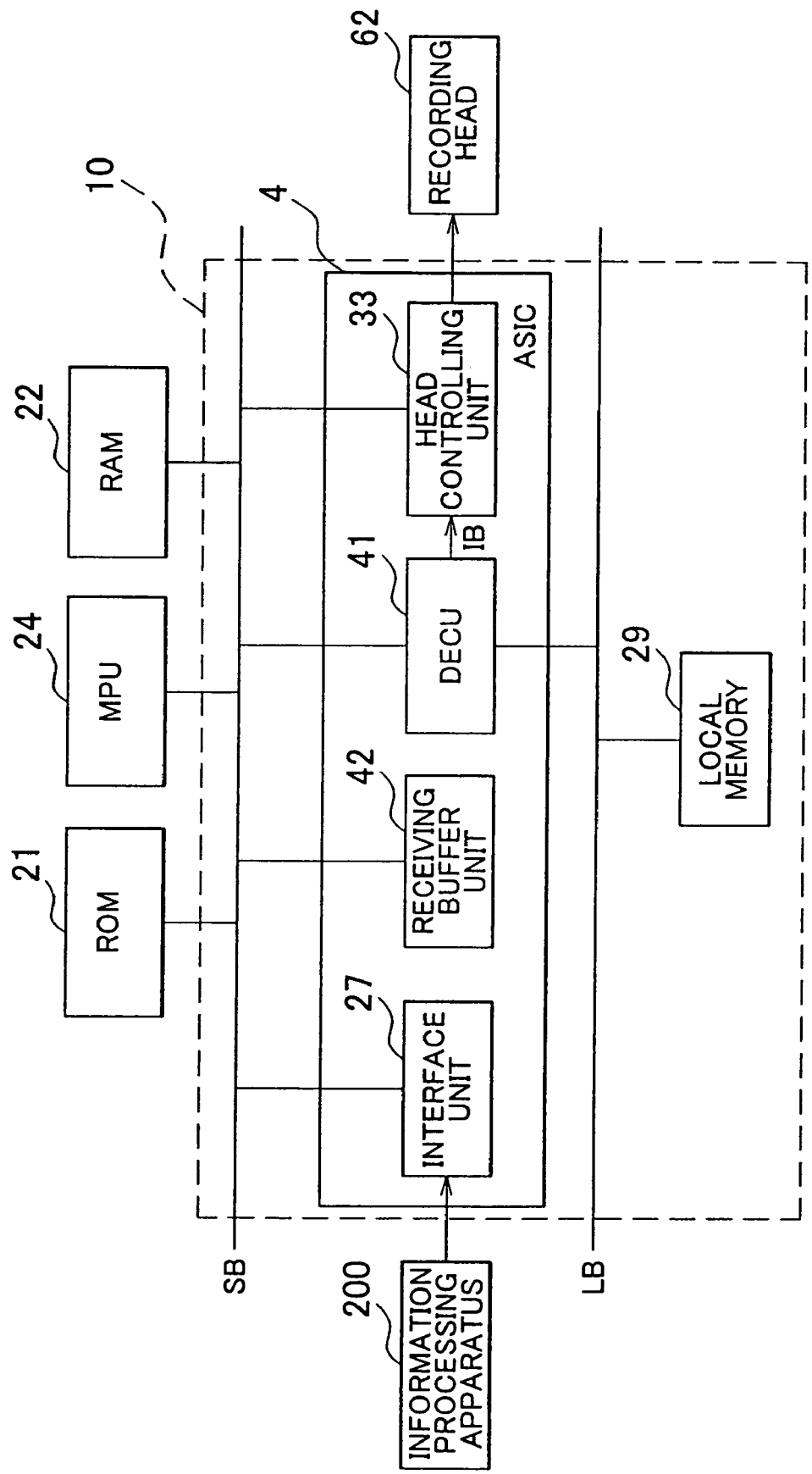
FIG. 4 is a block diagram showing the configuration of a data transferring apparatus relating to the present invention.
Figure 5:
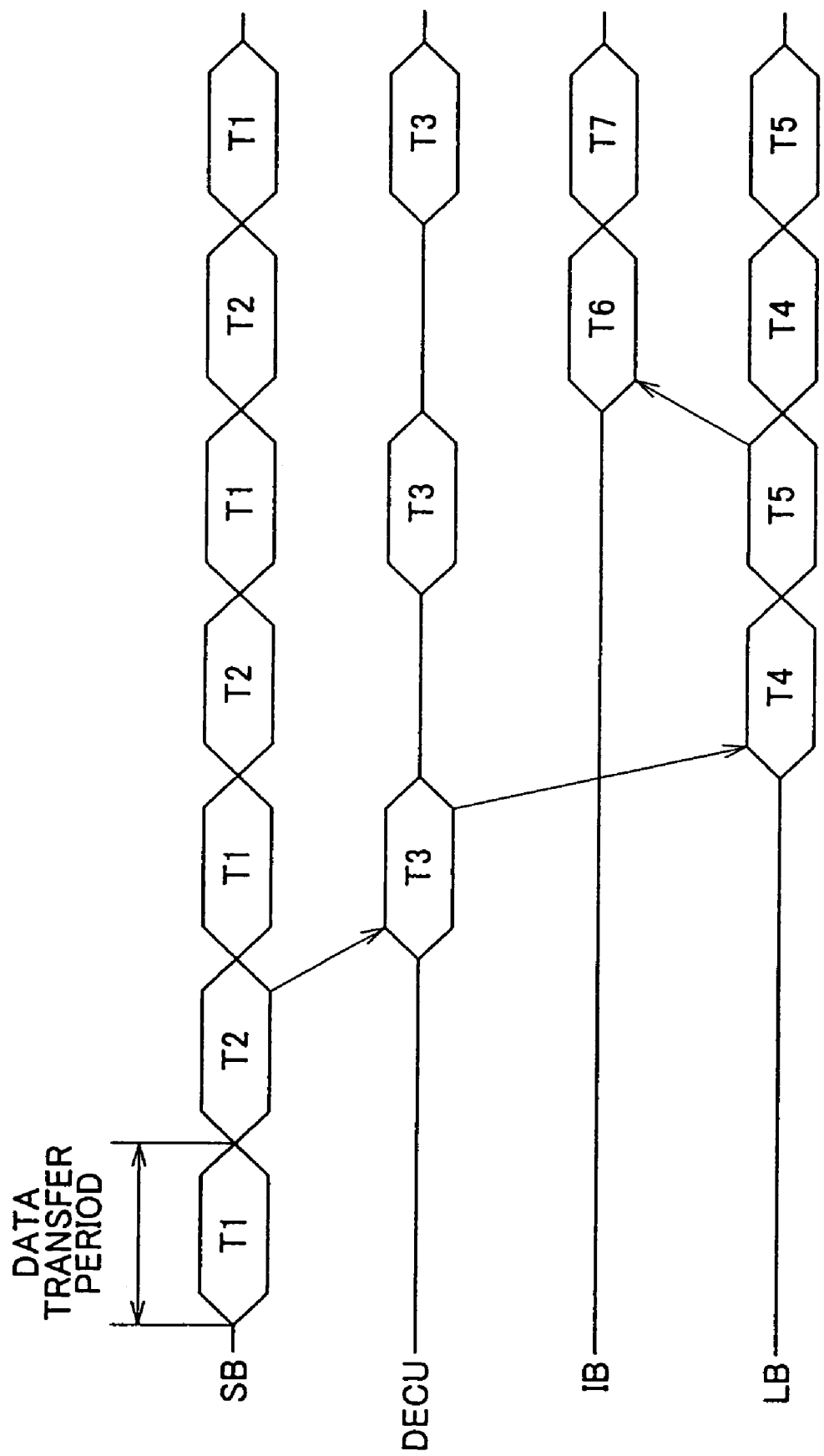
FIG. 5 is a timing chart showing the flow of recording data.

FIG. 4 is a block diagram showing the configuration of a data transferring apparatus 10 as a "data transferring apparatus for transferring liquid ejection data" relating to the present invention. FIG. 5 is a timing chart schematically showing the flow of recording data in a data transferring apparatus 10.

The recording controlling unit 100 has an ASIC (Application Specific Integrated Circuit) 4, and the ASIC 4 includes the interface unit 27 described above, the head controlling unit 33 described above, a receiving buffer unit 42 and a DECU 41 as a "decode unit" relating to the present invention. The DECU 41 includes the decode circuit 28 described above, the line buffer 281 and a "DMA transferring means" (It will be described in detail.). And, the system bus SB and the local bus LB are 16 bits buses, and thus it is possible to transfer data of 1 word (2 bytes) per a predetermined data transfer period. Hereinafter, with reference to the timing chart shown in FIG. 5, the flow of recording data in regard to the data transferring apparatus 10 will be described.

The compressed recording data is DMA-transferred from the information processing apparatus 200 to the receiving buffer unit 42 as a "main memory" via the interface unit 27 through the system bus SB one word each (symbol T1). As described above, the DMA transfer is such transfer method as once addresses of a transfer source and a transfer destination or the number of transfer are set in a register then the data transfer can be performed at high speed by hardware without the MPU 24. Next, data is DMA-transferred from the receiving buffer unit 42 to the DECU 41 via the system bus SB (symbol T2). Continuously, in the DECU 41, the compressed data of 1 word is hardware-developed by the decode circuit 28, and the developed recording data is stored in the line buffer 281 (symbol T3).

The recording data developed and stored in the line buffer 281 is DMA-transferred to a bitmap area in the local memory 29 via the local bus LB with non-synchronization to the data transfer through the system SB when the recording data stored in the line buffer 281 has reached a predetermined amount (symbol T4). Continuously, the recording data as bitmap data stored in the bitmap area of the local memory 29 is DMA-transferred again to the DECU 41 via the local bus LB (symbol T5), then DMA-transferred from the DECU 41 to the head controlling unit 33 via an internal bus IB (symbol T6), then stored in a register in the head controlling unit 33 and then DMA-transferred to the recording head 62 (symbol T7)

In this way, the data transfer from the receiving buffer unit 42 (the main memory) to the decode circuit 28, the data transfer from the decode circuit 28 to the local memory 29 and the data transfer from the local memory 29 to the recording head 62 may be performed by the DMA transfer, and thus data transfer at higher speed can be achieved, which is more preferable. In addition, since the "main memory" which stores the compressed data is configured to be the same block as the DECU 41 in the ASIC 41 as the receiving buffer unit 42, high DMA transfer can be achieved so as to transfer data particularly with one clock. Moreover, a part of the RAM 22 may be used for the "main memory" without providing the receiving buffer unit 42 to the ASIC 41.

Figure 6:
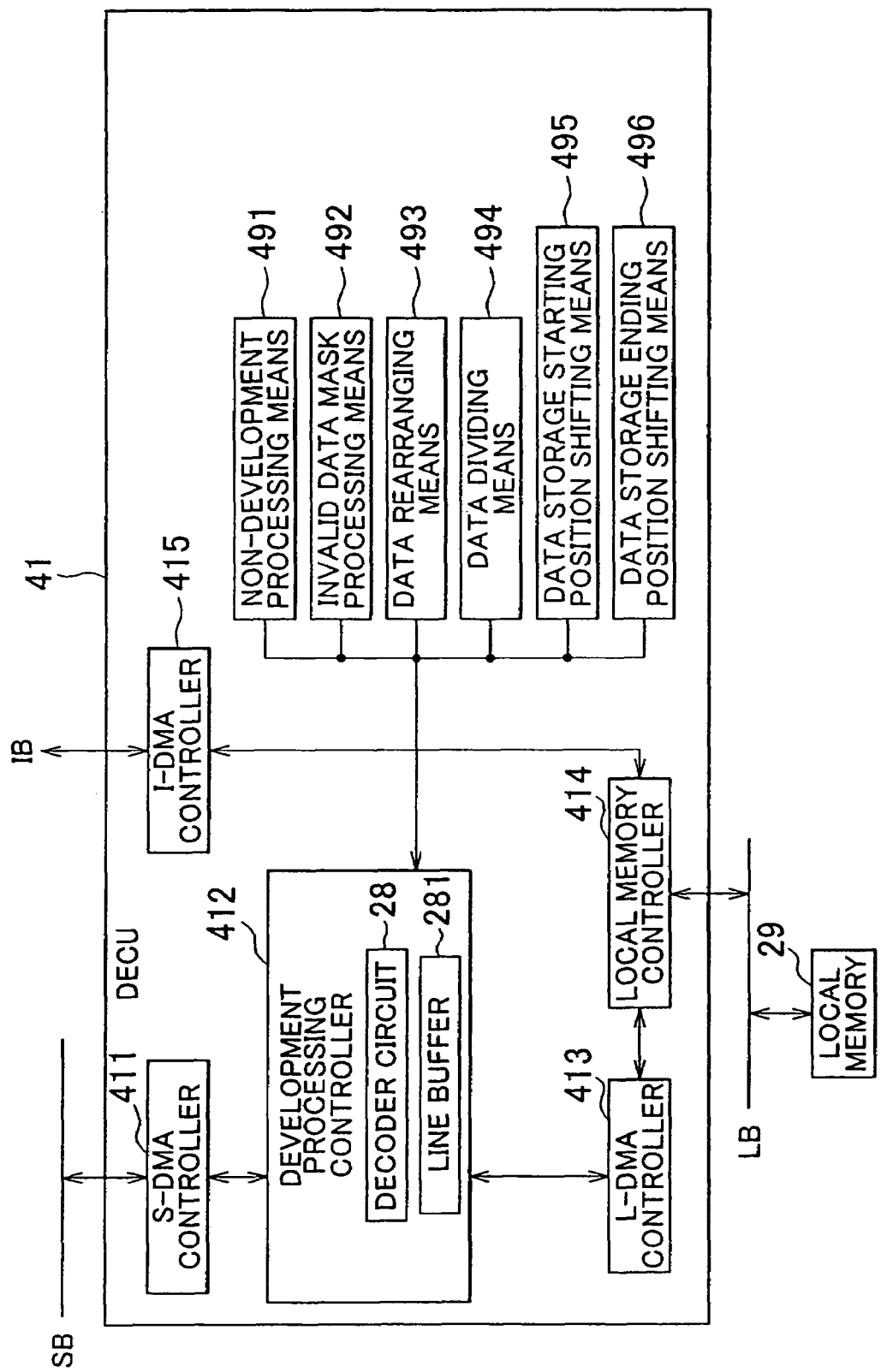
FIG. 6 is a block diagram showing the configuration of the DECU relating to the present invention.

FIG. 6 is a block diagram showing the configuration of the DECU 41 as the "decode unit" relating to the present invention.

An S-DMA controller 411 as the "DMA transferring means" described above is a controller for DMA transfer through the system bus SB. By the S-DMA controller 411, the compressed recording data stored in the receiving buffer unit 42 is DMA-transferred to the development processing controller 412 one word each. The development processing controller 412 includes the decode circuit 28 and the line buffer 281 described above. The compressed recording data DMA-transferred one word each by the S-DMA controller 411 from the receiving buffer unit 42 is hardware-developed by the decode circuit 28 one word each, and the developed recording data is accumulated in the line buffer 281.

In the same way, an L-DMA controller 413 as the "DMA transferring means" is a controller for DMA transfer through the local bus LB. In addition, a local memory controller 414 retrieves data from the local memory 29 coupled to the local bus LB and controls writing in it. And, when developed recording data of predetermined bytes has been accumulated in the line buffer 281, it is DMA-transferred to the local memory 29 through the local bus LB via the local memory controller 414 by the L-DMA controller 413 as not synchronized with the DMA transfer through the system bus SB. The recording data developed and DMA-transferred to the local memory 29 is stored in the predetermined bitmap area of the local memory 29.

In the same way, an L-DMA controller 415 controls the DMA transfer through the internal bus IS which is an dedicated bus between the DECU 41 in the ASIC and the head controlling unit 33. The developed recording data stored in the bitmap area of the local memory 29 is DMA-transferred to the head controlling unit 33 through the local bus LB and the internal bus IB via the local memory controller 414 by the I-DMA controller 415, then stored in a register in the head controlling unit 33 and then DMA-transferred to the recording head 62.

In addition, the DMA transfer from the line buffer 281 to the local memory 29 is transfer in burst by the L-DMA controller 413, and the DMA transfer from the local memory 29 to the recording head 62 is transfer in burst by the I-DMA controller 415. As described above, the burst transfer is such data transfer method as, when the continuous data is transferred, the data is transferred occupying a bus until all data of a predetermined data block is completely transferred by omitting a part of a sequence such as an address designation. The L-DMA controller 413 transfers in burst the developed recording data of predetermined bytes accumulated in the line buffer 281 one word each, occupying the local bus LB until the DMA-transfer to the local memory 29 is completed. The I-DMA controller 415 transfers in burst the developed recording data stored in the bitmap area of the local memory 29 one word per a data block of predetermined bytes, occupying the local bus LB until all of one data block has been completely DMA-transferred to the recording head 62.

And, in case the burst transfer from the line buffer 281 to the local memory 29 and the burst transfer from the local memory 29 to the recording head 62 compete each other, the burst transfer from the local memory 29 to the recording head 62 has priority, and thus during the burst transfer from the local memory 29 to the recording head 62 the burst transfer from the line buffer 281 to the local memory 29 is temporarily stopped, so that the ink ejecting operation from the nozzle arrays of the recording head 62 based on the recording data from the local memory 29 to the recording head 62 is not interrupted.

In addition, the DEDU 41 has a non-development processing means 491, an invalid data mask processing means 492, a data rearranging means 493, a data dividing means 494, a data storage starting position shifting means 495 and a data storage ending position shifting means 496, which are will be described below.

In this way, by transferring data while occupying the local bus LB until all data of a predetermined data block is completely sent in regard to the recording head 62, such problem as data transfer by the request of the MPU 24 through the system bus SB cannot be performed does not occur, and thus it is possible to perform data transfer of recording data to the recording head 62 at high speed.

Figure 7:
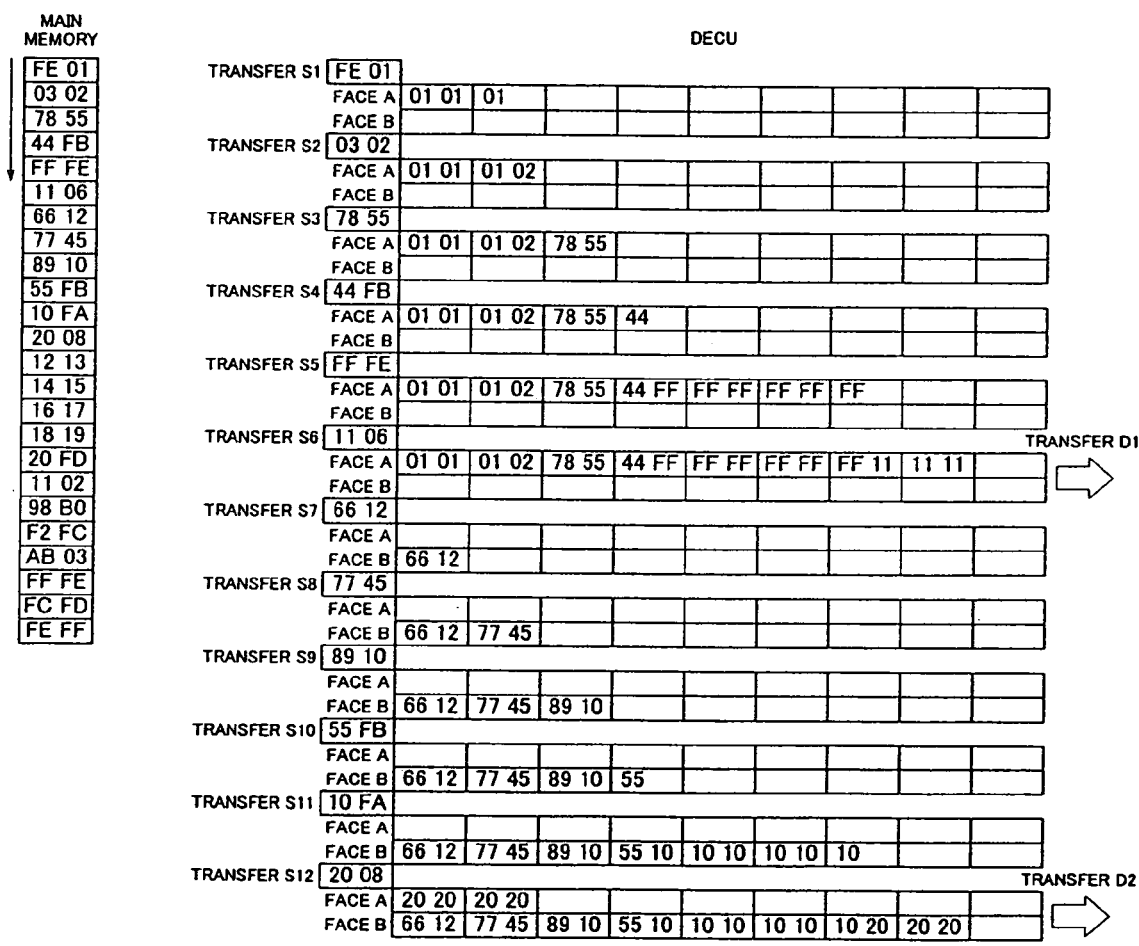
FIG. 7 is a diagram showing such flow as compressed recording data is developed.

FIG. 7 and FIG. 8 are diagrams schematically showing the state until compressed recording data is hardware-developed in the decoded circuit 28 and stored in the line buffer 281 in the DECU 41. In addition, FIG. 9 is a diagram schematically showing the state until the developed recording data is transferred and stored from the line buffer 281 to the local memory 29.

In this embodiment, the compressed recording data has been compressed by a run length compression method. The run length compression method is a well-known data compression method and it will be briefly described below. The run length compressed data is compressed data of byte boundary, and has a set of count (1 byte) and data (1 byte or bytes). In other words, the run length compressed data is configured to first have the count and then necessarily have the data. If the value of the count is more than 128 (a negative constant), that is, more than 80H, that means repeatedly developing the next data of 1 byte, and thus the data of 1 byte following the count is repeatedly developed as many times as 257 from which the value of the count subtracted. On the other hand, if the value of the count is less than 127, that is, less than 7FH, that means continuing data to be developed as it is without repeating after the count, and thus the data following the count is developed as it is without repetition as many times as the value of the count to which one is added.

Next, the configuration of the line buffer 281 will be described. The line buffer 281 has two faces of data storing areas of 9 words that combine storing areas of 8 words (16 bytes) and preliminary storing areas of 1 word (2 bytes), and each of faces is A face and B face respectively. The recording data developed by the decode circuit 28 one word each is stored in one of the A face and the B face of the line buffer 281 one word each in turn, and the data is turned to be stored into the other face after the developed data has been accumulated to be a predetermined amount, in the present embodiment, 16 bytes. In addition, the accumulated and developed data of 16 bytes, as described above, is stored in a predetermined bitmap area of the local memory 29, In this way, the line buffer 281 has two faces of buffer areas which are capable of storing the recording data after development of 16 bytes, and stores the recording data which has been developed by the decode circuit 28 in a first face of the buffer areas. And, after 16 bytes have been accumulated, while the developed recording data of the first face is transferred per word unit by a DMA transferring means, the recording data developed by the decoded circuit 28 can be stored in a second face of the buffer areas, so that it is possible to perform development process of compressed recording data and data transfer process in parallel.

Continuously, run length compressed data taken for example, the flow of recording data will be described, wherein the compressed data is developed by the decode circuit 28, stored in the line buffer 281 and stored from the line buffer 281 to the local memory 29.

In the receiving buffer unit (main memory) 42, the run length compressed recording data of 24 words (48 bytes) which begins from FEH is stored. The run length compressed recording data is DMA-transferred to the decode circuit 28 via the system bus SB one word each, namely, two bytes each, hardware-developed and stored in the line buffer 281. In the present embodiment, the data starting address of the run length compressed data is an even address, and the data starting address of the bitmap data (image data) in the local memory 29 is an even address. And, the number of bytes of the data block DMA-transferred from the line buffer 281 to the local memory 29 (the number of bytes of 1 line) is 16 bytes.

Further, in the main memory, the line buffer 281 in the DECU 41 shown in FIG. 7 and the local memory 29 shown in FIG. 9, the left top is an even address, and addresses gets to be upper addresses in order from the left to the right, which will be the same with that of drawings below.

Hereinafter, one word each will be described in order. First, the compressed recording data of initial 1 word (FEH, 01H) DMA-transferred from the receiving buffer unit 42 to the decode circuit 28 in the DECU 41 (Transfer S1). The FEH is the count, and the 01H is the data. Since the value of the count of FEH is 254, that is, larger than 128 and 257−254=3 times, the data of 01H is repeatedly developed and 1 byte each is stored in order in the A face of the line buffer 281. Next, the run length compressed data DMA-transferred to the decode circuit 28 is 03H and 02H (Transfer S2). The 03H is the count, and the 02H is the data. Since the value of the count of 03H is 3, that is, smaller than 127 and 3+1=4 bytes, the data following the count gets developed without repletion. That is, the data of 02H, 78H, 55H and 44H following the count 03H is developed as it is without repetition, and stored in order in the A face of the line buffer 281 (Transfers S2 to S4). The FBH, which is the upper part (odd address part) of the DMA-transferred word data in the Transfer S4, is the count, and the next data of 1 byte is repeatedly developed 6 times (257−251=6).

Continuously, the compressed recording data DMA-transferred to the decode circuit 28 is 10H and FEH (Transfer S5). The lower address (even address) of FFH is the data, besides the data of the previous count of FBH. Therefore, FFH is repeatedly developed 6 times, and stored in order in the A face of the line buffer 281. And, the upper address (odd address) of FEH is the count, and the next data of 1 byte is repeatedly developed 3 times (257−254=3). Continuously, the compressed recording data DMA-transferred to the decode circuit 28 is 11H and 06H (Transfer S6). The lower address (even address) of 11H is the data, besides the data of the previous count of FEH. Therefore, 11H is repeatedly developed 3 times, and stored in the A face of the line buffer 281. And, the upper address (odd address) of 06H is the count, and the next data (66H, 12H, 77H, 45H, 89H, 10H and 55H) of 7 bytes (6+1=7) is developed as it is without repetition, and stored in order in the B face of the line buffer 281 (Transfers S7 to S10).

In the mean time, when the developed recording data has been accumulated to be the number of bytes of 1 line in the A face of the line buffer 281, namely, 16 bytes (at the Transfer S6), the 16 bytes are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is stored 1 word each in order in the predetermined bitmap area of the local memory 29 at the first of the even address from the lower-address (FIG. 9A).

Continuously, the compressed recording data DMA-transferred to the decode circuit 28 is 10H and FAH (Transfer S11) The lower address (even address) of 10H is the data, besides the data of the previous count of FBH. Therefore, 10H is repeatedly developed 6 times, and stored in order in the B face of the line buffer 281. And, the upper address (odd address) of FAH is the count, and the next data of 1 byte is repeatedly developed 7 times (257−250=7). Continuously, the compressed recording data DMA-transferred to the decode circuit 28 is 20H and 08H (Transfer S12). The lower address (even address) of 20H is the data, besides the data of the previous count of FAH. Therefore, 20H is repeatedly developed 7 times, and stored in the B face of the line buffer 291, and when the accumulated data in the B face has reached 16 bytes the remaining data gets stored in order in the A face. And, the upper address (odd address) of 08H is the count, and the next data (12H, 13H, 14H, 15H, 16H, 17H, 18H, 19H and 20H) of 9 bytes (8+1=9) is developed as it is without repetition, and stored in order in the A face of the line buffer 281 (Transfers S13 to S17 in FIG. 8).

In the mean time, when the developed recording data has been accumulated to be the number of bytes of 1 line in the B face of the line buffer 281, namely, 16 bytes (at the Transfer S12), the 16 bytes are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D2). The recording data of 1 line transferred to the local memory 29 is stored 1 word each in order in the predetermined bitmap area of the local memory 29 at the first of the even address from the lower address (FIG. 9B).

Continuously, the compressed recording data DMA-transferred to the decode circuit 28 is 11H and 02H (Transfer S18). The lower address (even address) of 11H is the data, besides the data of the previous count of FDH. Therefore, 11H is repeatedly developed 3 times (257−254=3), and stored in the A face of the line buffer 281, and when the accumulated data in the A face has reached 16 bytes the remaining data gets stored in order in the B face. And, the upper address (odd address) of 02H is the count, and the next data (98H, B0H and F2H) of 3 bytes (2+1=3) is developed as it is without repetition, and stored in order in the B face of the line buffer 281 (Transfers S19 to S20).

In the mean time, when the developed recording data has been accumulated to be the number of bytes of 1 line in the A face of the line buffer 281, namely, 16 bytes (at the Transfer S18), the 16 bytes are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D3). The recording data of 1 line transferred to the local memory 29 is stored 1 word each in order in the predetermined bitmap area of the local memory 29 at the first of the even address from the lower address (FIG. 9C).

Continuously, the compressed recording data DMA-transferred to the decode circuit 28 is ABH and 03H (Transfer S21). The lower address (even address) of ABH is the data, besides the data of the previous count of FCH (the upper address of the Transfer S20). Therefore, ABH is repeatedly developed 5 times (257−252=5), and stored in order in the B face of the line buffer 281. And, the upper address (odd address) of 03H is the count, and the next data (FFH, FEH, FCH and FDH) of 4 bytes (3+1=4) is developed as it is without repetition, and stored in order in the B face of the line buffer 281 (Transfers S22 to S23).

Continuously, the compressed recording data DMA-transferred to the decode circuit 28 is FEH and FFH (Transfer S24). The lower address (even address) of FEH is the data, besides the data of the count of FEH. Therefore, FFH is repeatedly developed 3 times (257−254=3), and stored in order in the B face of the line buffer 281. When the developed recording data has been accumulated to be the number of bytes of 1 line in the B face of the line buffer 281, namely, 16 bytes (at the Transfer S24), the 16 bytes are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D4).

The recording data of 1 line transferred to the local memory 29 is stored 1 word each in order in the predetermined bitmap area of the local memory 29 at the first of the even address from the lower address (FIG. 9D). And, when the recording data of the bitmap data for ejecting ink with one main scanning pass has been stored in the local memory 29, data is DMA-transferred from the local memory 29 to the recording head 62. At this time, the I-DMA controller 415 (FIG. 6) transfers data in burst, occupying the local bus LB until all the recording data of the bitmap data for ejecting ink with one main scanning pass is completely DMA-transferred to the head controlling unit 33.

In this way, it is possible to perform the development process of the compressed recording data at high speed by hardware-developing the compressed recording data, which used to be software-developed by the conventional program, in the decode circuit 28. In addition, since the compressed recording data, which used to be developed one byte each by the conventional program, is developed per word unit (two bytes), it is possible to perform the development process of the compressed recording data at high speed. And, by the configuration to have two independent buses, namely, the system bus SB and the local bus LB and the local memory 29 which is coupled to the local bus LB, it is possible to perform the data transfer to the from the local memory 29 to the recording head 62 through the local bus LB not synchronized with the system bus SB. Owing to this, it is prevented that the data transfer to the recording head 62 gets interrupted by the access from the MPU 24 to the RAM 22 so that the recording performance speed gets low because the data transfer delay of recording data occurs. Further, higher data transfer can be achieved by the DMA transfer.

Accordingly, since it is possible to realize the development process of the compressed data at high speed and the data transfer to the recording head 62 at high speed, it is possible to increase the liquid ejection speed of the inkjet type recording apparatus 50 considerably compared with that of the prior art. By the way, the data transfer speed to the recording head 62, which was 1 Mbytes/sec in the prior art, can be high up to 8 to 10 Mbytes/sec by the data transferring apparatus 10 relating to the present invention. Further, if the data processing capacity of the recording head 62 is low, no matter how fast the data transfer is performed, only the recording performance speed corresponding to the data processing capacity of the recording head 62 is obtained, and thus it is surely necessary to provide a recording head 62 which has enough process speed.

Next, as a second embodiment of the inkjet type recording apparatus 50 relating to the present invention, added to the first embodiment described above, when the developed recording data DMA-transferred from the DECU 41 to the local memory 29 is stored in the predetermined bitmap area, the data of 1 line is not stored in order from the lower address of the bitmap area (stored in a horizontal direction) but is changed and stored in a vertical direction to be well-arranged for the recording head 62 by the data rearranging means 493 (FIG. 6) described above.

FIGS. 10A, 10B, 10C and 10D are diagrams which schematically show the states until the developed recording data is transferred and stored from the line buffer 281 to the local memory 29, and show the states in which the data of 1 line is changed and stored in a vertical direction.

In the bitmap area of the local memory 29 which is the DMA transfer destination, the transfer destination address is individually set for each word of the developed recording data stored in the line buffer 281 by the data rearranging means 493 (FIG. 6) in the DECU 41 in order that the data of 1 line is stored to be arranged in a vertical direction. And, the L-DMA controller 413 (FIG. 6) in the DECU 41 sets this individual transfer destination address as the transfer destination address of the DMA transfer, and DMA-transfers the developed recording data stored in the line buffer 281 to the local memory 29 one word each.

In this way, when the recording data of 1 word (16 bytes) is DMA-transferred from the line buffer 281 to the local memory 29, it is possible to perform rearrangement of the necessary recording data instantly by performing rearrangement of the recording data developed in the DECU 41, comparing it with performing rearrangement of data in a memory 1 byte each in order by the conventional program, and thus it is possible to perform rearrangement of recording data at high speed.

Further, as a third embodiment of the inkjet type recording apparatus 50 relating to the present invention, in regard to the first or second embodiment described above, in case the data starting address of the run length compressed recording data stored in the receiving buffer unit 42 is an odd address, the invalid data mask processing means 492 described above nullifies the head data of 1 byte of word data including the head data of the run length compressed data DMA-transferred from the receiving buffer unit 42 to the decode circuit 28.

Figure 11:
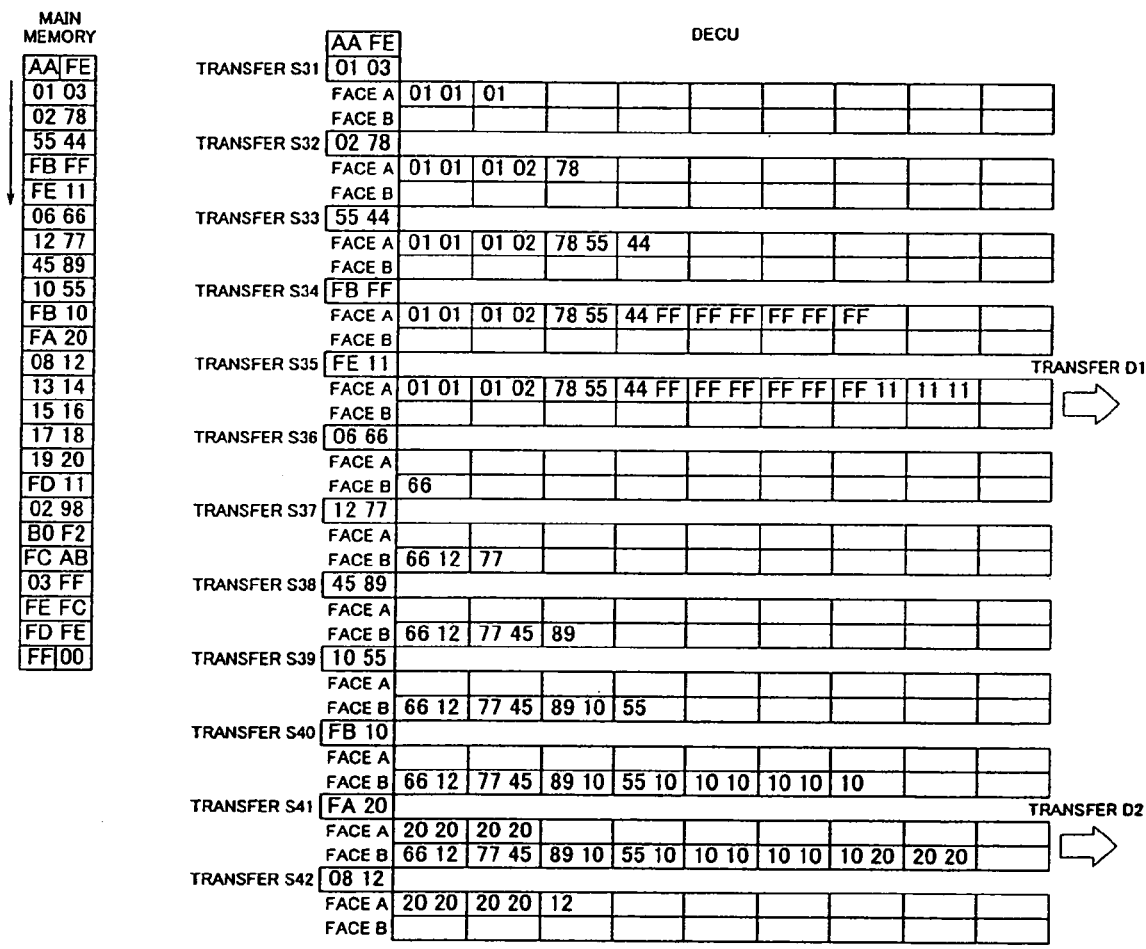
FIG. 11 is a diagram showing such flow as compressed recording data is developed.

FIG. 11 and FIG. 12 are diagrams schematically showing the state until the compressed recording data is hardware-developed in the decode circuit 28 and stored in the line buffer 281, in case the data starting address of the compressed recording data is an odd address.

The head byte data (FEH) of the run length compressed recording data stored in the receiving buffer unit 42 (main memory) is stored in the upper address (odd address) of the head word data. That is, in the lower address (even address) of the word data including this head byte data, the data irrelevant to the recording data (AAH) is stored. However, if one word each is DMA-transferred from the receiving buffer unit 42 to the decode circuit 28, the even address cannot help but be initially transferred. Therefore, if the head word data of the run length compressed recording data is hardware-developed as it is by the decode circuit 28, the development is performed in the state where the data irrelevant to the recording data is included, and thus it is impossible to surely develop the compressed recording data.

Here, before the decode circuit 28 develops data in the development processing controller 412 (FIG. 6), the invalid data nullifying means 492 nullifies the irrelevant byte data at the lower address (even address) of the word data including the head byte data of the compressed recording data by masking. Further, when head data of 1 word is developed by the decode circuit as it is, AAH becomes the count, and FEH becomes the data, so that FEH can be correctly developed as the count by nullifying AAH which is the irrelevant data.

Next, the compressed recording data DMA-transferred to the decode circuit 28 is 01H and 03H (Transfer S31). The lower address (even address) of 01H is the data, besides the data of the previous count of FEH. Therefore, 01H is repeatedly developed 3 times (257−254=3), and stored in order in the A face of the line buffer 281. And, the upper address (odd address) of 03H is the count, and the next data (02H, 78H, 55H and 44H) of 4 bytes (3+1=4) is developed as it is without repetition, and stored in order in the A face of the line buffer

281 (Transfers S32 to S33). Then, in the same order as that of the first embodiment, the run length compressed recording data is developed one word each and stored in order in the line buffer 281 (Transfers S32 to S54), and when the developed recording data has been accumulated to be 1 line bytes (16 bytes) the data is DMA-transferred to the local memory 29 (Transfers D1 to D4). Further, it is preferable to judges whether the data starting address of the run length compressed recording data stored in the receiving buffer unit 42 is an odd address or not by, for example, a firmware program which is performed by the MPU 24.

In this way, although the data starting address of the run length compressed recording data stored in the receiving buffer unit 42 is an odd address, it is possible to accurately perform hardware development on data from the first of the run length compressed recording data in the decode circuit 28.

Further, as a fourth embodiment of the inkjet type recording apparatus 50 relating to the present invention, in regard to the first to third embodiments described above, the number of bites of 1 line is an odd number.

FIG. 13 and FIG. 14 are diagrams schematically showing the state until the compressed recording data is hardware-developed in the decode circuit 28 and stored in the line buffer 281, in case the quantity of 1 line is 15 bytes in regard to the first or second embodiment described above. In addition, FIGS. 15A to 15D are diagrams schematically showing the state until the developed recording data is transferred and stored from the line buffer 281 to local memory 29 to be vertically rearranged in line in regard to the fourth embodiment, and FIGS. 16A to 16D are diagrams schematically showing the state until the developed recording data is stored without being vertically rearranged in line.

As described above, since the developed recording data is DMA-transferred one word each from the line buffer 281 to the local memory 29, the storage of the developed recording data in the bitmap area of the local memory 29 is performed 1 word each, and thus the recording data of odd bytes cannot be DMA-transferred from the DECU 41 to the local memory 29. Here, the data storage ending position shifting means 496 (FIG. 6), in regard to the development processing controller 412 (FIG. 6), sets the number of bytes of 1 line of the line buffer to be an odd number, in the present embodiment, 15 bytes, and DMA-transfers it to the local memory 29 after the developed recording data is accumulated to be 15 bytes in the A or B face of the line buffer 281. Therefore, the upper address part (odd address part) of the word data including the recording data of 15 bytes gets DMA-transferred in the state of 00H.

Transfers S61 to S64 will not be described because they are the same as the Transfers S1 to S4 in the first embodiment (FIG. 7). Continuously, the compressed recording data DMA-transferred to the decode circuit 28 is FFH and FEH (Transfer S65). The lower address (even address) of FFH is the data, besides the data of the count of FBH. Therefore, FFH is repeatedly developed 6 times (257−251=6), and stored in order in the A face of the line buffer 281. And, the upper address (odd address) of FFH is the count, and the next data is repeatedly developed 2 times (257−255=2) and stored in order in the A face of the line buffer 281.

Continuously, the compressed recording data DMA-transferred to the decode circuit 28 is 11H and 06H (Transfer S66). The lower address (even address) of 11H is the data, besides the data of the previous count of FFH. Therefore, FFH is repeatedly developed 2 times, and stored in order in the A face of the line buffer 281. And, the upper address (odd address) of 06H is the count, and the next data (66H, 12H, 77H, 45H, 89H, 10H and 55H) of 7 bytes (6+1=7) is developed as it is without repetition, and stored in order in the B face of the line buffer 281 (Transfers S67 to S70).

In the mean time, when the developed recording data has been accumulated to be the number of bytes of 1 line in the A face of the line buffer 281, namely, 15 bytes (at the Transfer S66), the 15 bytes are DMA-transferred to the local memory 29 one word each as a data block of the 1 line. At that time, the L-DMA controller 413 (FIG. 6) transfers data in burst, occupying the local bus LB until all the recording data after 1 line development is completely OMA-transferred to the local memory 29 (Transfer D1). The recording data of 1 line transferred to the local memory 29 is vertically rearranged in line by the data rearranging means described above and stored 1 word each in order in the predetermined bitmap area of the local memory 29 at the first of the even address from the lower address (FIG. 15A). In addition, if the data is not vertically rearranged in line, then it is stored in order as it is (FIG. 16A). Then, in the same way, the run length compressed recording data is hardware-developed by the decode circuit 28 (Transfers S71 to S84), and when the recording data developed in the line buffer 281 has been accumulated to be 1 line bytes (15 bytes) the data is DMA-transferred to the local memory 29 (Transfers D2 to D4).

FIG. 17 and FIG. 18 are diagrams schematically showing the state until the compressed recording data is hardware-developed in the decode circuit 28 and stored in the line buffer 281, in case the quantity of 1 line is 15 bytes in regard to the third embodiment described above.

Transfers S91 to S94 will not be described because they are the same as the Transfers S31 to S34 in the second embodiment (FIG. 11). Continuously, the compressed recording data DMA-transferred to the decode circuit 28 is FFH and 11H (Transfer S95). The lower address (even address) of FFH is the count, and the upper address (odd address) of 11H is the data. Therefore, 11H is repeatedly developed 2 times (257−255=2), and stored in order in the A face of the line buffer 281.

And, when the developed recording data has been accumulated to be the number of bytes of 1 line in the A face of the line buffer 291, namely, 15 bytes (at the Transfer S95), the 15 bytes are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is vertically rearranged in line by the data rearranging means described above and stored 1 word each in order in the predetermined bitmap area of the local memory 29 at the first of the even address from the lower address (FIG. 15A). In addition, if the data is not vertically rearranged in line by the data arranging means 493, then it is stored in order as it is (FIG. 16A). Then, in the same way, the run length compressed recording data is hardware-developed by the decode circuit 28 (Transfers S71 to S84), and when the recording data developed in the line buffer 281 has been accumulated to be 1 line bytes (15 bytes) the data is DMA-transferred to the local memory 29 (Transfers D2 to D4).

In this way, since the recording data is DMA-transferred to the local memory 29 after the recording data developed in the line buffer 281 has been accumulated to be odd bytes, the transfer is performed while the upper address of the last word data is 00H, and thus the developed recording data can be stored in the bitmap area of the local memory 29 in order that the last 1 byte of 1 line is 00H and the recording data of 1 line is odd bytes as the data starting address is an even address as shown in FIG. 15D and FIG. 16D.

Further, as a fifth embodiment of the inkjet type recording apparatus 50 relating to the present invention, added to the second to fourth embodiments described above, the recording data is stored in the bitmap area of the local memory 29 in order that the recording data of 1 line is odd bytes as the data starting address is an even address.

In the nozzle arrays arranged in numbers and provided on the recording head 62, the colors of ink which is ejected are determined for each of the nozzle arrays. In the mean time, the recording data stored in the bitmap area of the local memory 29 becomes the data for each of the colors of ink corresponding to each of the nozzle arrays of each line. And, in regard to a means for correcting the lag of the ink ejecting timing caused by the nozzle arrays, there is a case that it is necessary to store the recording data of 1 line in the bitmap area of the local memory 29 letting the head address be an odd address.

However, as described above, by DMA-transferring one word each from the receiving buffer unit 42 to the decode circuit 28, the recording data developed in the bitmap area of the local memory 29 is stored while an even address is always positioned at the first, and thus in this state the recording data cannot be stored while an odd address is positioned at the first. Here, the data storage starting position shifting means 495 (FIG. 6) described above, when storing the recording data developed in the decode circuit 28 in the line buffer 281, in regard to the development processing controller 412 (FIG. 6), stores it from the first byte of the line buffer 281 in the state where the 0-th byte is vacant. That is, when the developed recording data is stored in the line buffer 281 after the compressed recording data is developed in the decode circuit 28, it is stored from the first byte of the line buffer 281 in the state where the 0-th byte is vacant, and the developed recording data stored in the line buffer 281 is DMA-transferred to the bitmap area of the local memory 29 from the 0-th byte of the line buffer 281.

Figure 19:
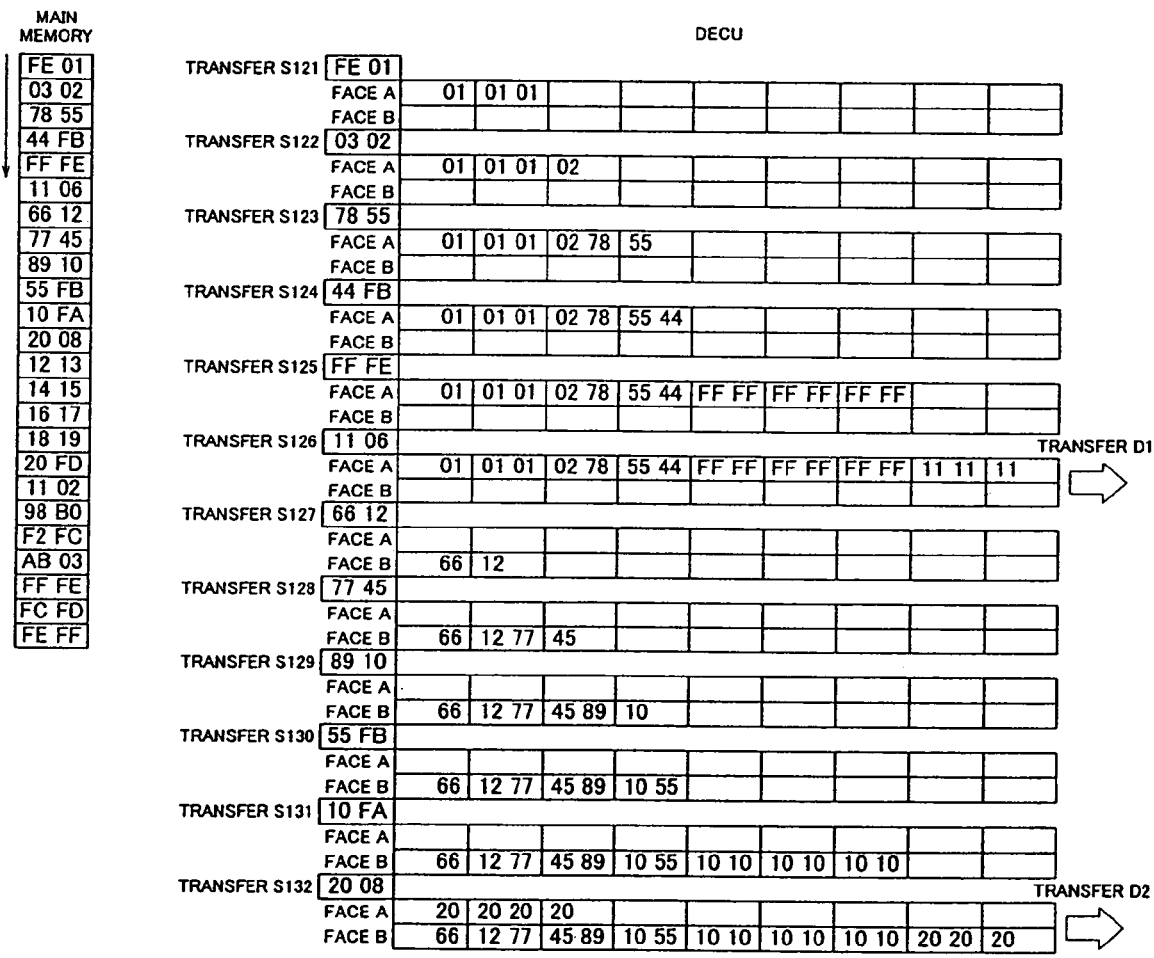
FIG. 19 is a diagram showing such flow as compressed recording data is developed.

FIG. 19 and FIG. 20 are diagrams schematically showing the state until the compressed recording data is hardware-developed in the decode circuit 28 and stored in the line buffer 281, in case the recording data is developed by the data storage starting position shifting means 495 from the first byte of the line buffer 281 in the state where the 0-th byte is vacant in regard to the second embodiment described above. In addition, FIGS. 21A to 21D are diagrams schematically showing the state until the developed recording data of 1 line, 16 bytes, is transferred from the line buffer 281 to the local memory 29, and vertically rearranged in line by the data rearranging means 493 and stored while an odd address comes first.

As described above, the line buffer 281 has a reserve storage area of 1 word (2 bytes) which is added to the storage area of 8 words (16 bytes) for both of the A and B faces. The recording data developed 1 word each in the decode circuit 28 is stored from the first byte in the state where the 0-th byte of the A face of the line buffer is vacant. And, the 16-th byte of the recording data, which cannot help but be forced out from the storage area as the 0-th byte is made vacant, gets stored in the reserve storage area.

When the developed recording data has been accumulated to be 16 bytes in the A face of the line buffer 281, the 18 bytes (9 words) of the recording data in total, that is, the 16 bytes in the storage area and the data in the reserve storage area are DMA-transferred to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer D1). The recording data of 1 line transferred to the local memory 29 is vertically rearranged in line by the data rearranging means 493 described above and stored 1 word each in order in the predetermined bitmap area of the local memory 29 at the first of the even address from the lower address (FIG. 21A). Therefore, since data to which the vacant data of 1 byte at the first is added is DMA-transferred to the local memory 29 and stored at the even address of the bitmap area, the head data of the recording data of 1 line gets to be stored from the even address.

Then, in the same way, the run length compressed recording data is hardware-developed by the decode circuit 28, and when the recording data developed in the line buffer 281 has been accumulated to be 1 line bytes, 16 bytes, the data is DMA-transferred to the local memory 29 (Transfers D2 to D4). Further, transfers S121 to S144 will not be described because they are the same as the Transfers S1 to S24 shown in FIG. 7.

In this way, since the recording data developed one word each in the decode circuit 28 is stored by the data storage starting position shifting means 495 from the first byte of the line buffer 281 in the state where the 0-th byte of the A face of the line buffer 281 is vacant, and it is DMA-transferred to the local memory 29 after the developed recording data of 16 bytes has been stored, the transfer is performed while the lower address of the first word data is 00H, and thus the developed recording data can be stored in the bitmap area of the local memory 29 in order that the first 1 byte of 1 line is 00H and the recording data of 1 line is odd bytes as the data starting address is an even address as shown in FIG. 21D.

FIG. 22 and FIG. 23 are diagrams schematically showing the state until the compressed recording data is hardware-developed in the decode circuit 28 and stored in the line buffer 281, in case the recording data is developed from the first byte of the line buffer 281 in the state where the 0-th byte is vacant in regard to the fourth embodiment described above. In addition, FIGS. 24A to 24D are diagrams schematically showing the state until the developed recording data of 1 line, 15 bytes, is transferred from the line buffer 281 to the local memory 29, and vertically rearranged in line and stored while an odd address comes first.

In this way, the number of 1 line bytes can be 15 bytes, that is, odd bytes. Therefore, as shown in FIG. 24D, the storage in the bitmap area of the local memory 29 can be performed in order that the first 1 byte of 1 line is 00H and the data starting address of the recording data of 1 line, 15 bytes, is an even address.

Figure 25:
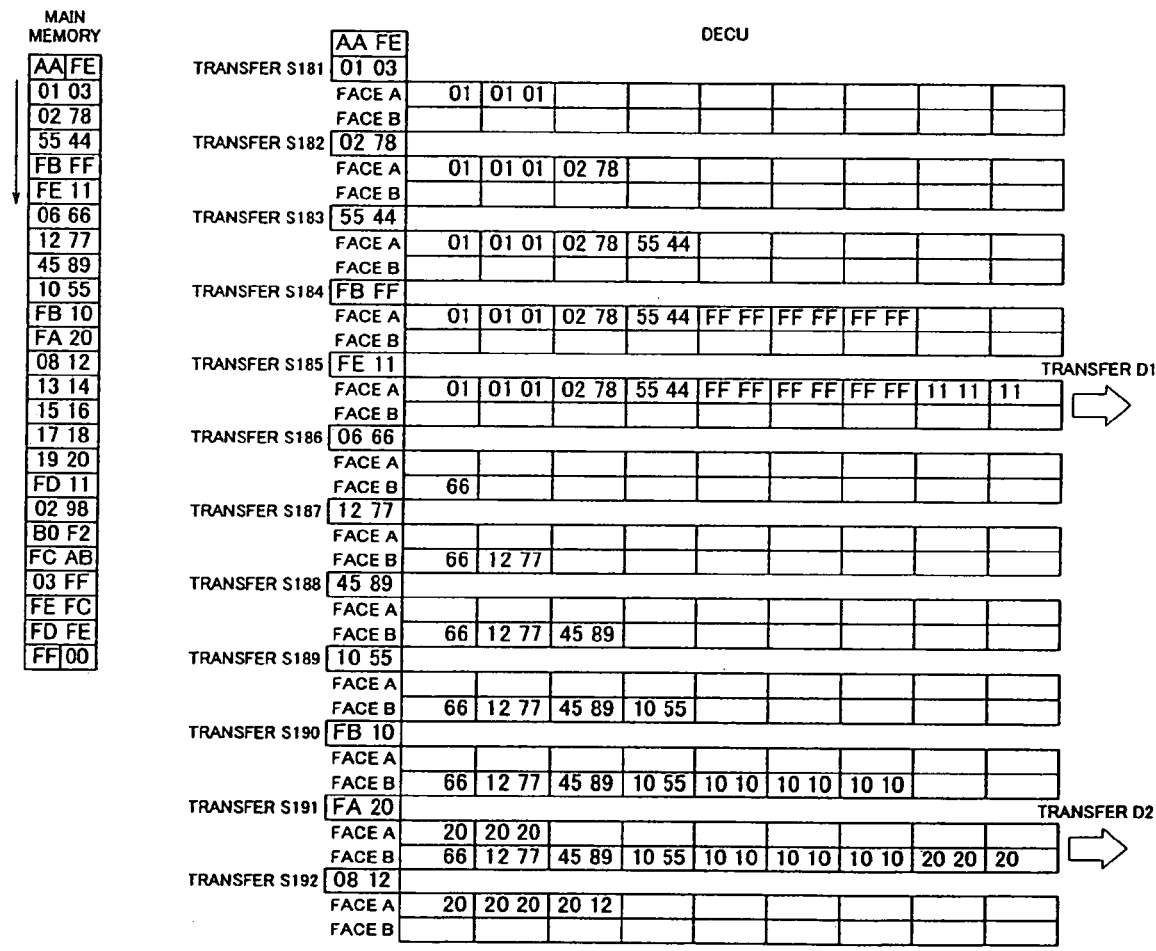
FIG. 25 is a diagram showing such flow as compressed recording data is developed.
Figure 27:
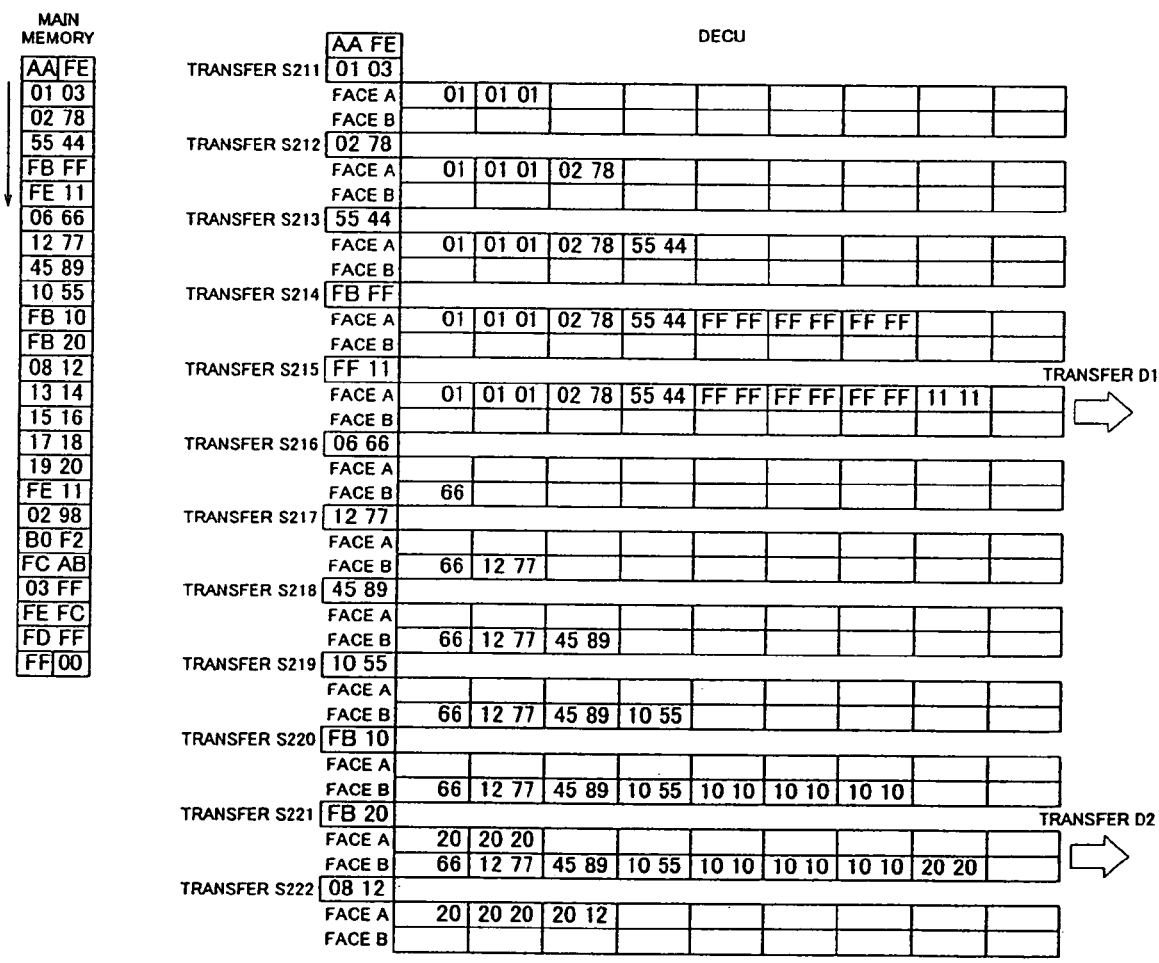
FIG. 27 is a diagram showing such flow as compressed recording data is developed.
Figure 36:
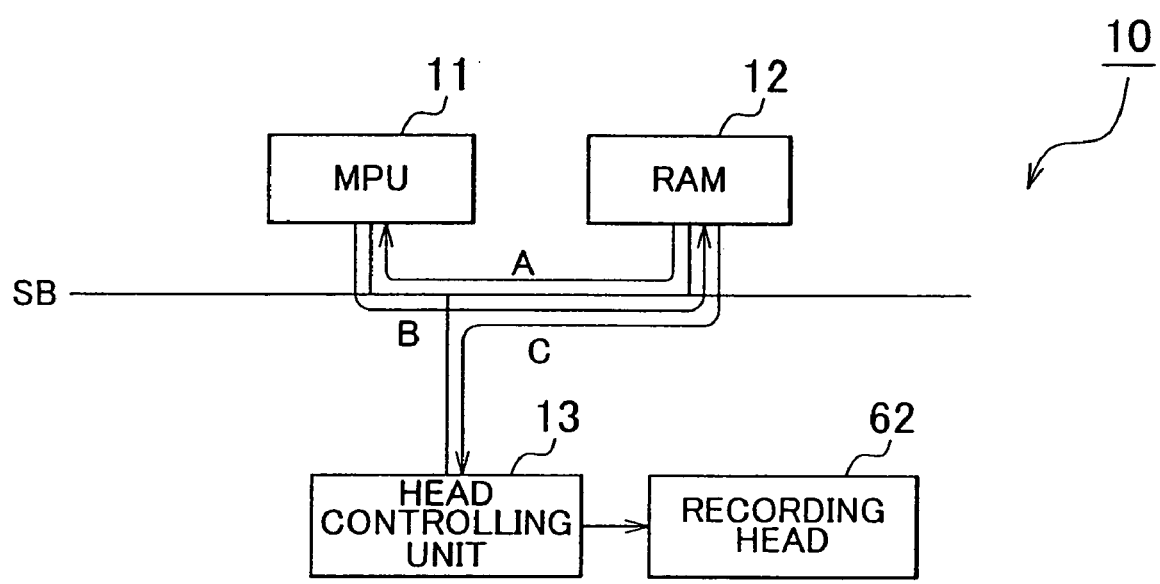
FIG. 36 is a block diagram showing a data transferring apparatus in regard to the prior art.

In addition, FIG. 25 and FIG. 26 are diagrams schematically showing the state until the compressed recording data is hardware-developed in the decode circuit 28 and stored in the line buffer 281, in case the recording data is developed from the first byte of the line buffer 281 in the state where the 0-th byte is vacant in regard to the third embodiment described above and the recording data of 1 line is 16 bytes. In the same way, FIG. 27 and FIG. 28 shows ones in case the recording data is developed from the first byte of the line buffer 281 in the state where the 0-th byte is vacant in regard to the third embodiment described above and the recording data of 1 line is 15 bytes.

In this way, after the compressed recording data stored in the receiving buffer unit 42 while an odd address comes first is developed in the decode circuit 28, the recording data of 1 line, 15 or 16 bytes, can be stored in the bitmap area of the local memory 29 while an odd address comes first.

Further, as a sixth embodiment of the inkjet type recording apparatus 50 relating to the present invention, added to any of the first to fifth embodiments described above, the developed recording data is stored in two different bitmap areas of the local memory 29. FIGS. 29A to 29D are diagrams schematically showing the state until the developed recording data of 1 line, 16 bytes, is transferred from the line buffer 281 to the local memory 29, and vertically rearranged in line and stored in the two different bitmap areas while an even address comes first.

If a dot interval of the sub scanning direction Y in regard to the developed bitmap data is smaller than an interval of the nozzle arrays adjacent to the sub scanning direction Y, the ink dots adjacent to the sub scanning direction Y cannot be formed simultaneously by one main scan, and thus it is formed during a different main scanning operation. However, since the bitmap data developed in the decode circuit 28 has a data configuration by which the ink ejection data formed to be adjacent to the sub scanning direction Y is continuously arranged, recording cannot be performed while the developed bitmap data is transferred to the recording head 62 as it is. For this reason, it is necessary to divide the developed bitmap data in order that the ink dot data adjacent to the sub scanning direction Y can be transferred to the recording head 62 during a different main scanning operation while it is stored in a different bitmap area.

In this regard, two different bitmap areas are provided in the local memory beforehand. In this embodiment, they are represented by image 1 and image 2 respectively. In regard to the bitmap area of the local memory 29 which is the DMA transfer destination, the data dividing means 494 described above sets the transfer destination addresses individually for each one word of the developed recording data stored in the line buffer 281 by the development processing controller 41 (FIG. 6) in order that the data of 1 line is stored in the image 1 and the image 2 in turn. And, the L-DMA controller 413 (FIG. 6) in the DECU 41 sets the individual transfer destination address to be the transfer destination address of DMA transfer, and DMA-transfers the developed recording data stored in the line buffer 281 to local memory 29 one word each.

First, when the developed recording data has been accumulated in the A face of the line buffer 281 to be 1 line of 16 bytes, the recording data of 1 line is DMA-transferred to the local memory 29 (Transfer D1), and stored in the image 1 (FIG. 29A. Continuously, after the developed recording data has been accumulated in the B face of the line buffer 281 to be 1 line of 16 bytes, the recording data of 1 line is DMA-transferred to the local memory 29 (Transfer D2), and stored in the image 2 (FIG. 29B. Continuously, when the developed recording data has been accumulated in the A face of the line buffer 281 to be 1 line of 16 bytes, the recording data of 1 line is DMA-transferred to the local memory 29 (Transfer D3), and stored in the image 1 (FIG. 29C. Continuously, after the developed recording data has been accumulated in the B face of the line buffer 281 to be 1 line of 16 bytes, the recording data of 1 line is DMA-transferred to the local memory 29 (Transfer D4), and stored in the image 2 (FIG. 29D).

In this way, the developed recording data stored in the line buffer 281 after the compressed recording data is developed is DMA-transferred to the different bit map areas of the local memory 29 one line each in order that each of the ink dots adjacent to the sub scanning direction Y is formed during the different main scanning operations respectively. Owing to this, the development process of the compressed recording data (in the decode circuit 28) and the division of the developed recording data (in the development processing controller 412) can be performed at high speed by a hardware process. In addition, FIGS. 30A to 30D are diagrams schematically showing the state until the developed recording data of 1 line, 16 bytes, is transferred from the line buffer 281 to the local memory 29, and stored in the two different bitmap areas, while an even address comes first, as it is without being vertically rearranged in line.

In addition, FIGS. 31A to 31D are diagrams schematically showing the state until the developed recording data of 1 line, 16 bytes, is transferred from the line buffer 281 to the local memory 29, and vertically rearranged in line and stored in the two different bitmap areas, while an even address comes first. FIGS. 32A to 32D are diagrams schematically showing the state until the developed recording data of 1 line, 15 bytes, is transferred from the line buffer 281 to the local memory 29, and stored in the two different bitmap areas, while an even address comes first, as it is without being vertically rearranged in line.

In this way, the developed recording data of odd bytes, as the number of bytes of 1 line is an odd number, is DA-transferred to the local memory 29 after it has been stored in the line buffer 281, and thus the recording data of 1 line is transformed while the upper address of the last word data is 00H. Therefore, the developed recording data stored in the bitmap area of the local memory 29 is stored in the two different bitmap areas, the images 1 and 2, for each line in order that the last 1 byte of 1 line is 00H and the recording data of 1 line is odd bytes as the data starting address is an odd address.

In addition, FIGS. 33A to 33D are diagrams schematically showing the state until the developed recording data of 1 line, 16 bytes, is transferred from the line buffer 281 to the local memory 29, and vertically rearranged in line and stored in the two different bitmap areas, while an odd address comes first. FIGS. 34A to 34D are diagrams schematically showing the state until the developed recording data of 1 line, 15 bytes, is transferred from the line buffer 281 to the local memory 29, and vertically rearranged in line and stored in the two different bitmap areas, while an odd address comes first.

In this way, since the recording data developed one word each in the decode circuit 28 is stored from the first byte of the line buffer 281 in the state where the 0-th byte of the A face of the line buffer 281 is vacant, and it is DMA-transferred to the local memory 29 after the developed recording data of 16 bytes has been stored, the transfer is performed while the lower address of the first word data is 00H, and thus the recording data can be stored in each of the two different bitmap areas, the image 1 and the image 2, of the local memory 29 in order that the first 1 byte of 1 line is 00H and the data starting address of the recording data of 1 line is an odd address.

Further, as a seventh embodiment of the inkjet type recording apparatus 50 relating to the present invention, in regard to any of the first to sixth embodiments described above, if the recording data stored in the receiving buffer unit 42 is uncompressed data, it is stored in the bitmap area without development process. FIG. 35 is a diagram schematically showing the state where the uncompressed recording data is stored in the line buffer 281 as it is, and DMA-transferred to the local memory 29.

In this way, if the recording data transferred from the information processing apparatus 200 to the receiving buffer unit 42 is uncompressed data, it is stored in the line buffer 281 one word each by the non-development processing means 491 described above as it is without development process by the decode circuit 28. And then, like the case that the compressed recording data is developed by the decode circuit 28, in regard to the development processing controller (FIG. 6), the recording data can be, as shown by the second to sixth embodiments described above, stored in the two different bitmap areas by being rearranged by the data rearranging means 493 or being stored in the local memory 29 as the head address is an odd address by the data dividing means 494, the data storage starting position shifting means 495 and the data storage ending position shifting means 496, while 1 line bytes are set to be 16 or 15 bytes.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A data transferring apparatus for transferring liquid ejection data, comprising:
    a decode unit comprising a decode circuit capable of performing hardware development on a liquid ejection data, which is DMA-transferred per word unit from a main memory via a system bus, compressed to be capable of line development;
    a line buffer for storing liquid ejection data developed by said decode circuit per word unit and a DMA-transferring means for DMA-transferring liquid ejection data compressed to be capable of line development from said main memory to said decode circuit; and
    DMA-transferring liquid ejection data developed in said line buffer to a local memory per word unit and DMA-transferring developed liquid ejection data stored in said local memory to a register of a liquid ejecting head sequentially,
    wherein said decode unit comprises a data rearranging means for storing data in an array direction of a bitmap for said liquid ejecting head in said local memory, when data developed in said line buffer is DMA-transferred to a bitmap area of said local memory per word unit.

2. A data transferring apparatus for transferring liquid ejection data as claimed in claim 1, wherein said decode unit comprises a data dividing means for storing data in bitmap areas which are different per predetermined words, when data developed in said line buffer is DMA-transferred to a bitmap area of said local memory per word unit.

3. A data transferring apparatus for transferring liquid ejection data as claimed in claim 2, wherein said data dividing means sets the number of bitmap areas to be divided in accordance with a ratio of the resolution of liquid ejection data and the resolution of said liquid ejecting head.

4. A data transferring apparatus for transferring liquid ejection data as claimed in claim 3, wherein said data transferring apparatus comprises an invalid data mask processing means for nullifying data from head data, as many bytes as a remainder resulting from dividing a value of a data starting address of compressed liquid ejection data by the number of data bytes which said system bus can transfer per one data transfer, with respect to word data including head data of compressed data DMA-transferred from said main memory to said decode circuit.

5. A data transferring apparatus for transferring liquid ejection data as claimed in claim 3, wherein said data transferring apparatus comprises an invalid data mask processing means for nullifying head data of one byte in case data starting address of compressed data stored in said main memory is an old address, with respect to word data including head data of compressed data DMA-transferred from said main memory to said decode circuit.

6. A data transferring apparatus for transferring liquid ejection data as claimed in claim 5, wherein said decode unit comprises a data storage starting position shifting means for storing liquid ejection data developed by said decode circuit from a first byte of said line buffer in a state where a 0-th byte of said line buffer is vacant.

7. A data transferring apparatus for transferring liquid ejection data as claimed in claim 6, wherein said decode unit comprises a data storage ending position shifting means for transferring developed liquid ejection data stored in said line buffer to said liquid ejecting head each time developed data of said predetermined words from which one byte has been subtracted is stored in said line buffer.

8. A data transferring apparatus for transferring liquid ejection data as claimed in claim 7, wherein said data transferring apparatus comprises two independent buses which are said system bus and a local bus, said main memory coupled to said system bus, capable of transferring data and said local memory coupled to said local bus, capable of transferring data, and said decode unit is coupled to said system bus and local bus in order to transfer data therebetween.

9. A data transferring apparatus for transferring liquid ejection data as claimed in claim 8, wherein an ASIC comprises registers of said main memory, said decode unit and said liquid ejecting head as a circuit block respectively, and registers of said decode unit and said liquid ejecting head are coupled through a dedicated bus in said ASIC.

10. A data transferring apparatus for transferring liquid ejection data as claimed in claim 9, wherein said line buffer comprises two faces of buffer areas capable of storing developed data of predetermined words, liquid ejection data developed data of predetermined words, liquid ejection data developed by said decode circuit is sequentially stored in a first face of said buffer areas while liquid ejection data developed by said decode circuit is sequentially stored in a second face of said buffer areas when developed data of predetermined words has been accumulated, and developed data is DMA-transferred to said local memory per predetermined words when developed data of predetermined words has been accumulated.

11. A data transferring apparatus for transferring liquid ejection data as claimed in claim 10, wherein data transfers with respect to said local bus from said decode circuit to said local memory and from said local memory to a register of said liquid ejecting head are performed in a burst transfer.

12. A data transferring apparatus for transferring liquid ejection data as claimed in claim 11, wherein said compressed liquid ejection data is run length compressed data, and said decode circuit can perform hardware development on run length compressed data.

13. A data transferring apparatus for transferring liquid ejection data as claimed in claim 12, wherein said decode unit comprises a non-development processing means for storing uncompressed liquid ejection data DMA-transferred from said main memory in said line buffer without hardware development by said decode circuit.

14. A liquid ejecting apparatus comprising a data transferring apparatus for transferring liquid ejection data comprising:
    a decode circuit capable of performing hardware development on liquid ejection data, which is DMA-transferred per word unit from a main memory via a system bus, compressed to be capable of line development;
    a line buffer for storing liquid ejection data developed by said decode circuit per word unit;

a DMA-transferring means for DMA-transferring liquid ejection data compressed to be capable of line development from said main memory to said decode circuit, DMA-transferring liquid ejection data developed in said line buffer to a local memory per word unit and DMA-transferring developed liquid ejection-data stored in said local memory to a register of a liquid ejecting head sequentially; and a data rearranging means for storing data in an array direction of a bitmap for a liquid ejecting head corresponding to a nozzle array of a liquid ejecting head in said local memory, when data developed in said line buffer is DMA-transferred to a bitmap area of said local memory per word unit.

* * * * *